United States Patent
Robinson

(10) Patent No.: US 6,832,884 B2
(45) Date of Patent: Dec. 21, 2004

(54) SHOPPING CART COLLECTION VEHICLE AND METHOD

(76) Inventor: Coy J. Robinson, 782 N. Fork Rd., Damascus, AR (US) 72039

( * ) Notice: Subject to any disclaimer, the term of this patent is extended or adjusted under 35 U.S.C. 154(b) by 59 days.

(21) Appl. No.: 10/219,411

(22) Filed: Aug. 14, 2002

(65) Prior Publication Data

US 2003/0059288 A1 Mar. 27, 2003

Related U.S. Application Data

(63) Continuation-in-part of application No. 09/540,450, filed on Mar. 31, 2000, now Pat. No. 6,435,803, which is a continuation-in-part of application No. 09/109,559, filed on Jul. 2, 1998, now Pat. No. 6,168,367.

(51) Int. Cl.[7] .................................................. B60P 3/06
(52) U.S. Cl. ...................................... 414/539; 414/785
(58) Field of Search .......................... 414/27, 434, 435, 414/436, 539, 551, 642, 662, 785, 789.7; 280/33.991, 33.992, 33.996, 33.997, 33.998

(56) References Cited

U.S. PATENT DOCUMENTS 1,868,562 A * 7/1932 Chubb et al. ............... 414/620
2,477,167 A * 7/1949 Bliss .......................... 414/663
4,902,188 A * 2/1990 Page .......................... 414/495
6,168,367 B1 * 1/2001 Robinson .................... 414/539
6,435,803 B1 * 8/2002 Robinson .................... 414/539

FOREIGN PATENT DOCUMENTS

DE        2350308     *  4/1975
DE        2450692     *  4/1976

* cited by examiner

Primary Examiner—James W. Keenan
(74) Attorney, Agent, or Firm—Head, Johnson and Kachigian

(57) ABSTRACT

A new and improved shopping cart collection vehicle is disclosed for use in collecting, transporting, and storing various types of carts and carriers. The vehicle may additionally include hydraulic lifters, lights, a slip clutch, an extendable carrying arm, carrying boom, a carrying ram, secondary support rods, rear cart retrieval, holding pins, holding bumps, holding numbs, roll bars, a windshield, an operator weather cover, removable cover, doors, side windows, and back window, and/or the like. In another embodiment of the invention, a cart trailer includes a floor, side rails, loading ramp, holding pin, trailer hitch, and chain lock connector. An improved method of collecting shopping carts is disclosed wherein a shopping cart collection vehicle is used to pickup the shopping carts and return them to the store.

8 Claims, 88 Drawing Sheets

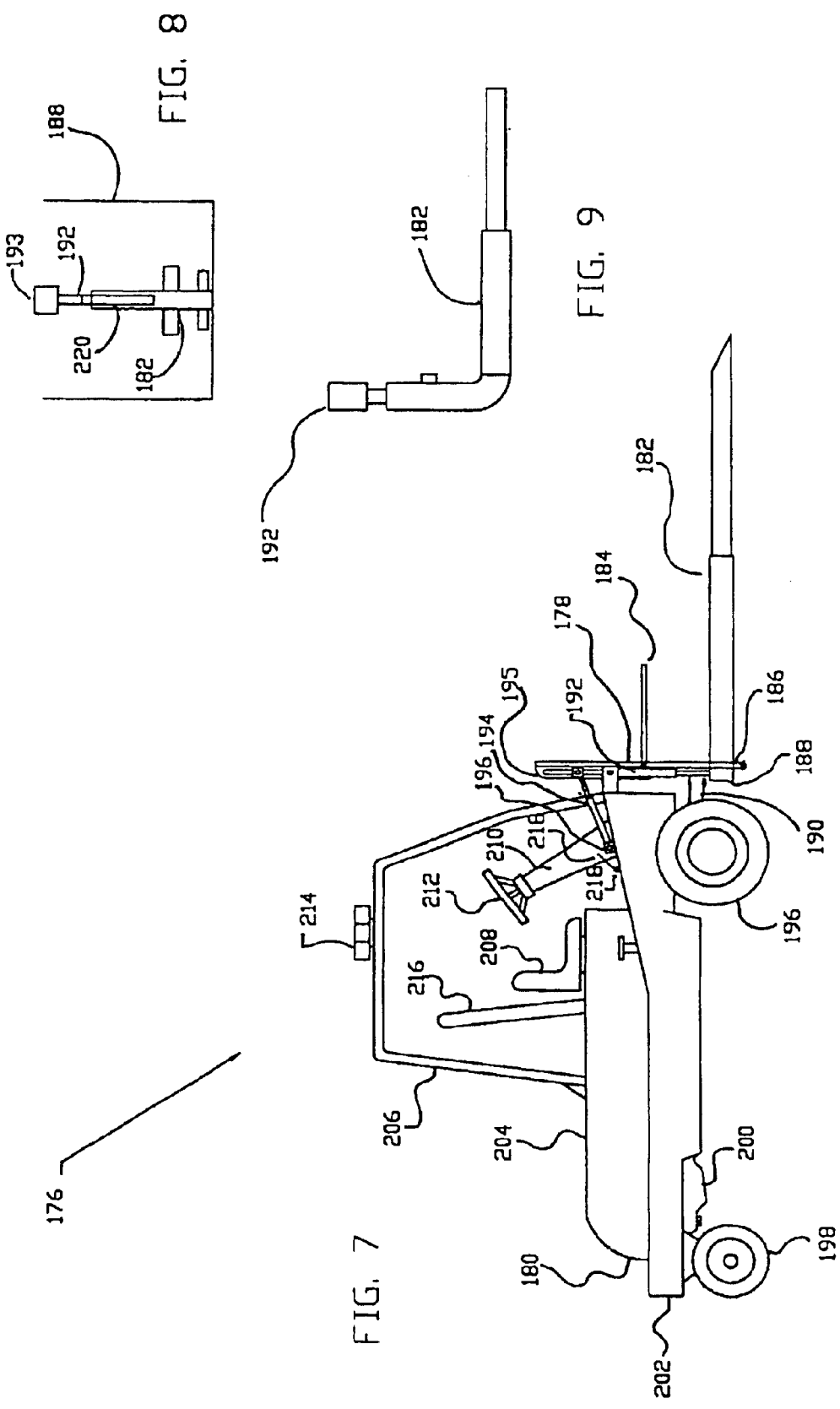

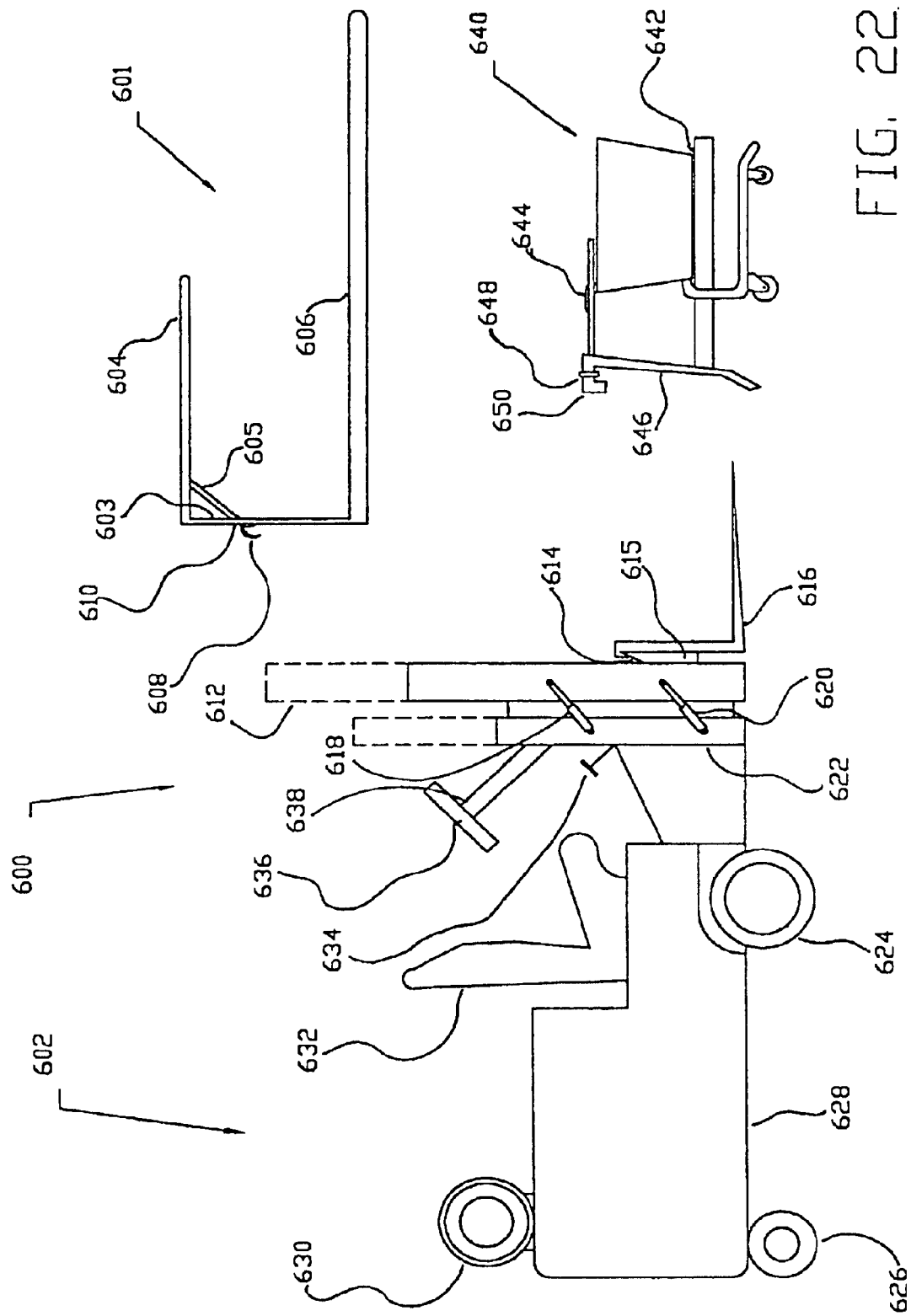

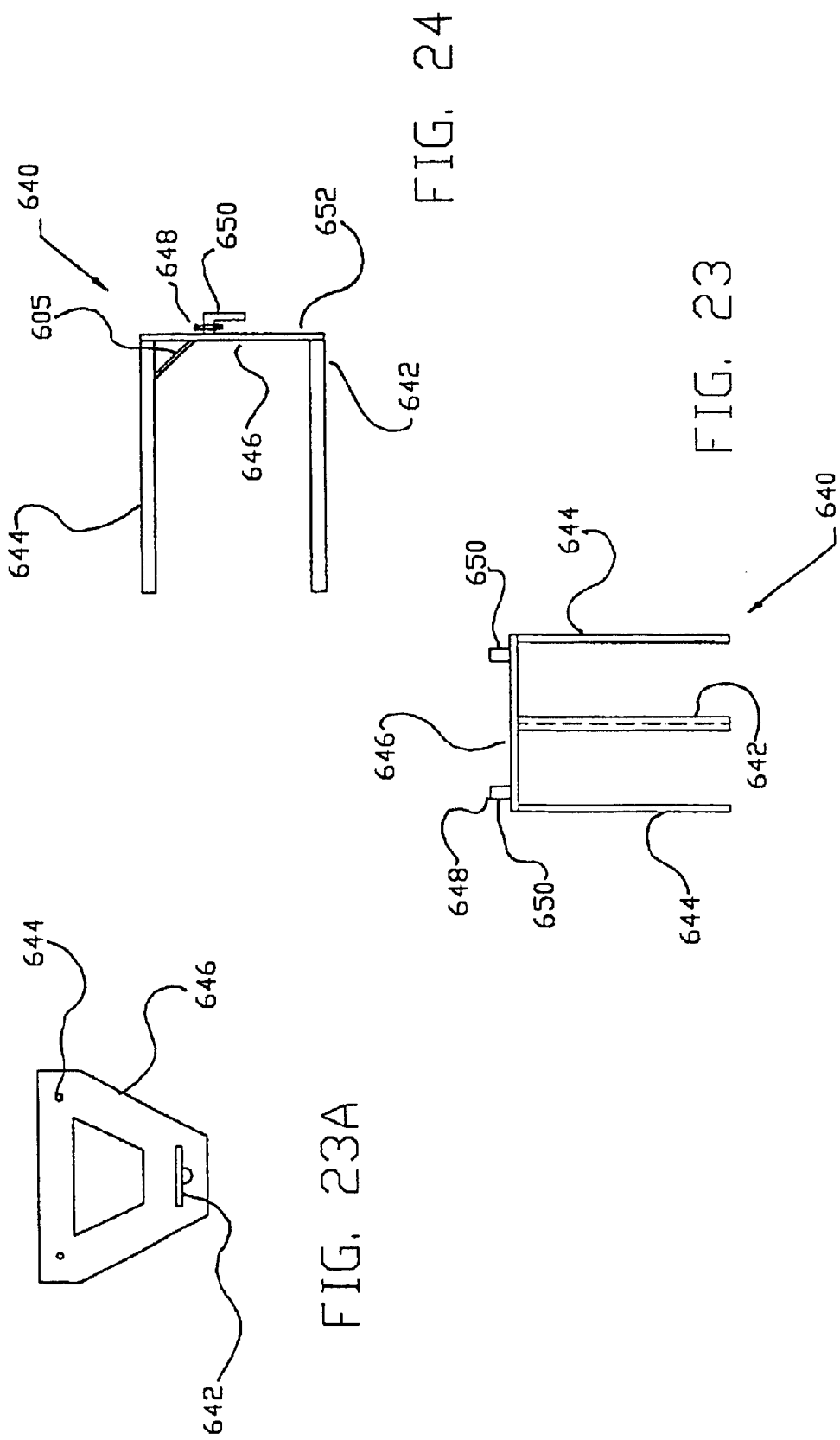

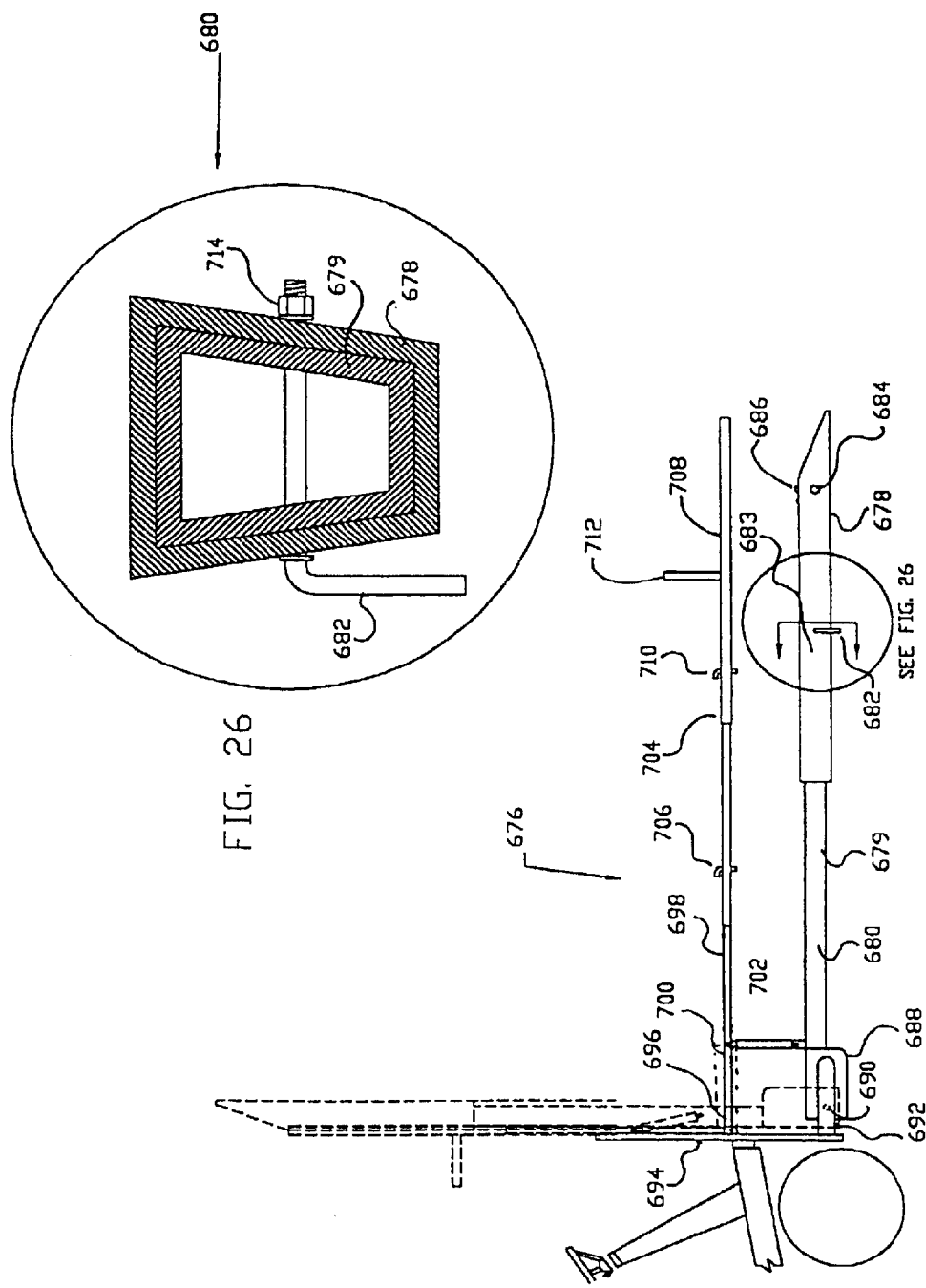

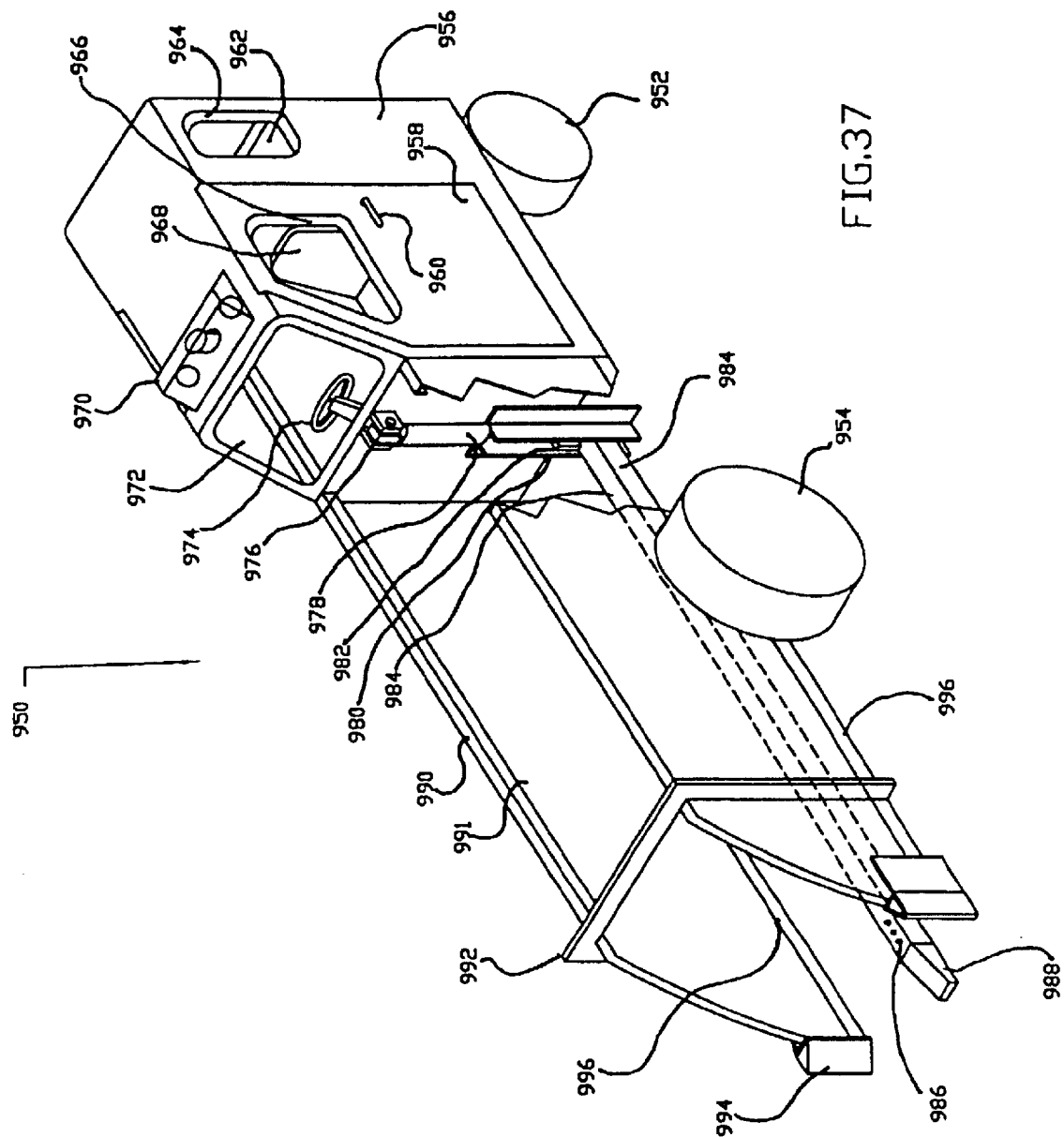

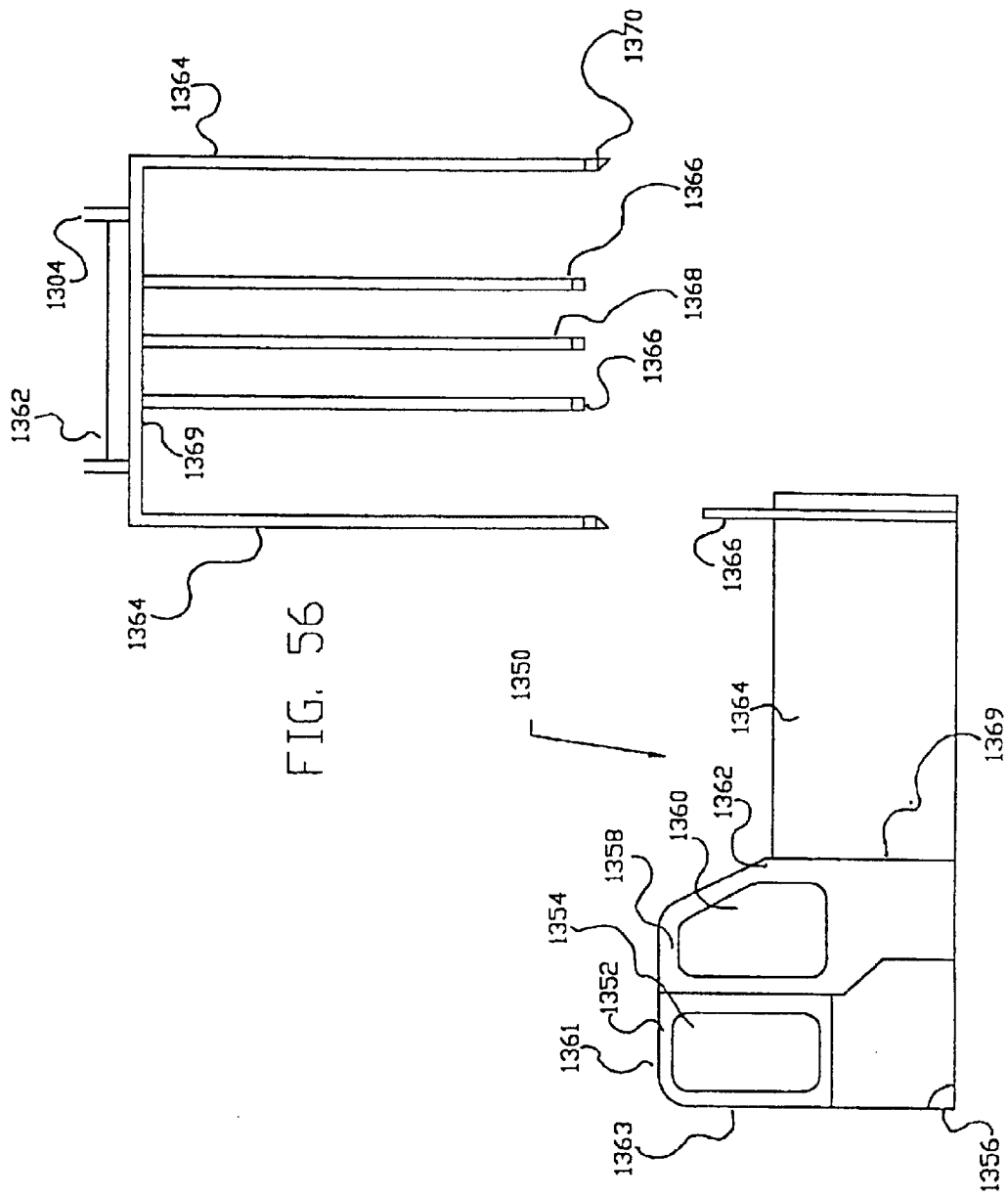

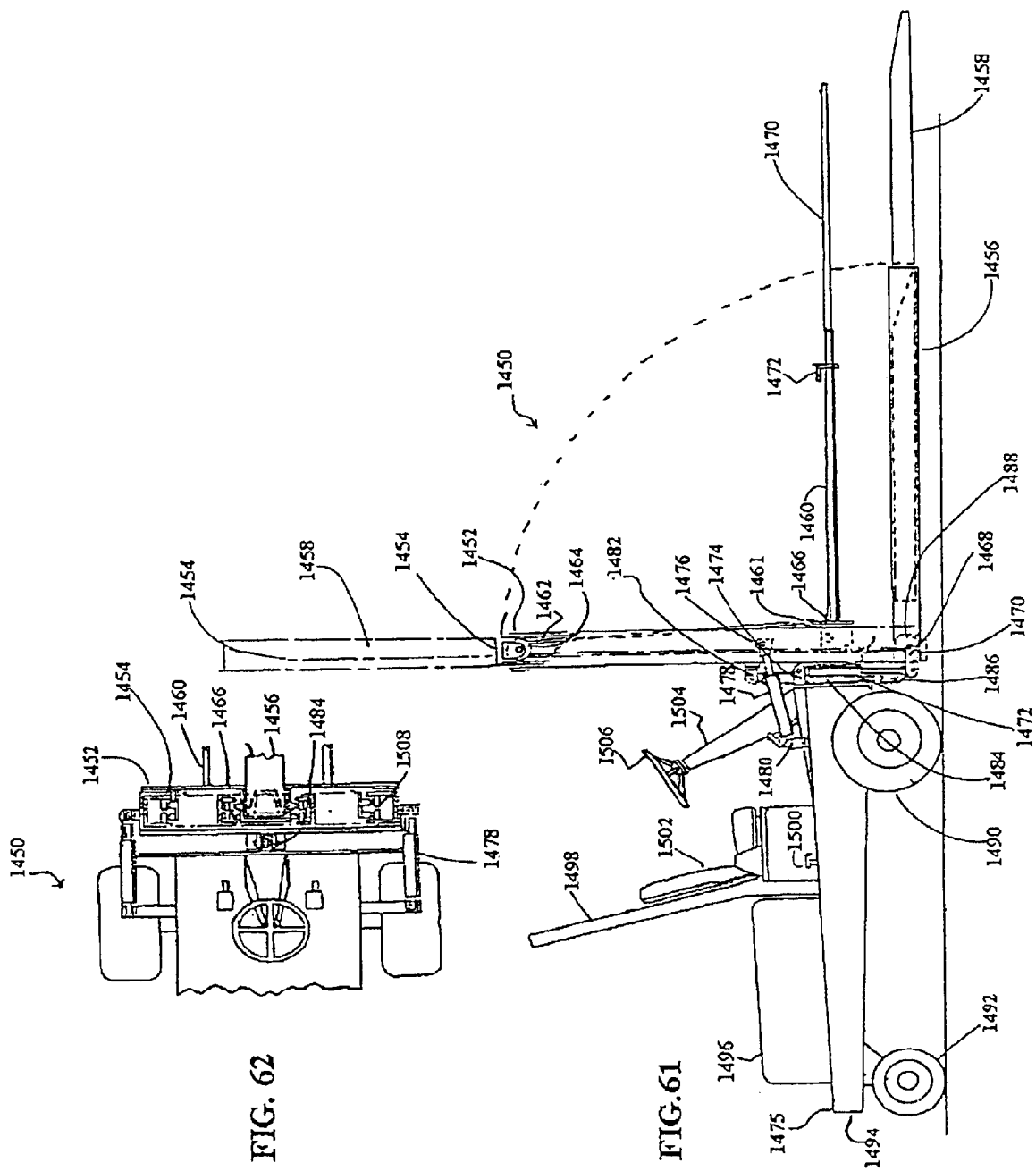

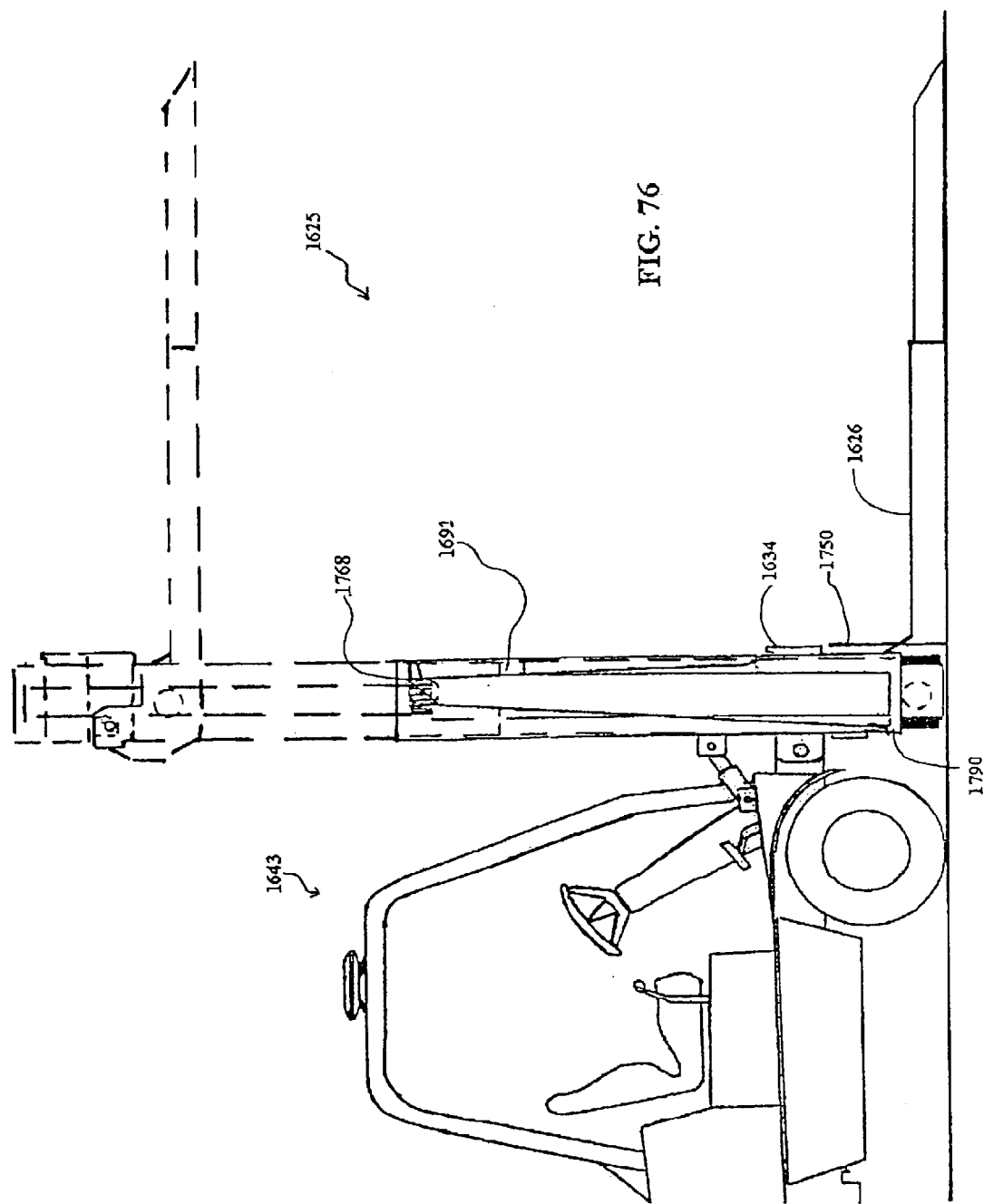

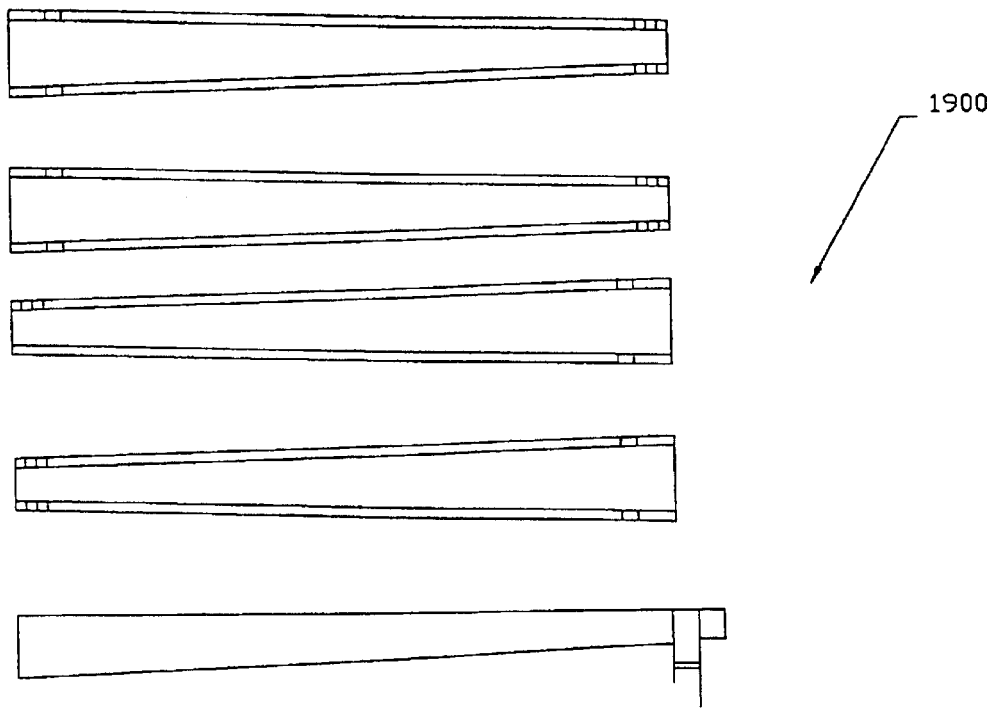
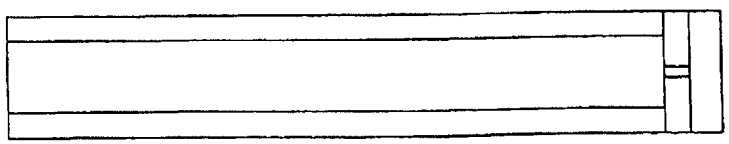
FIG.82

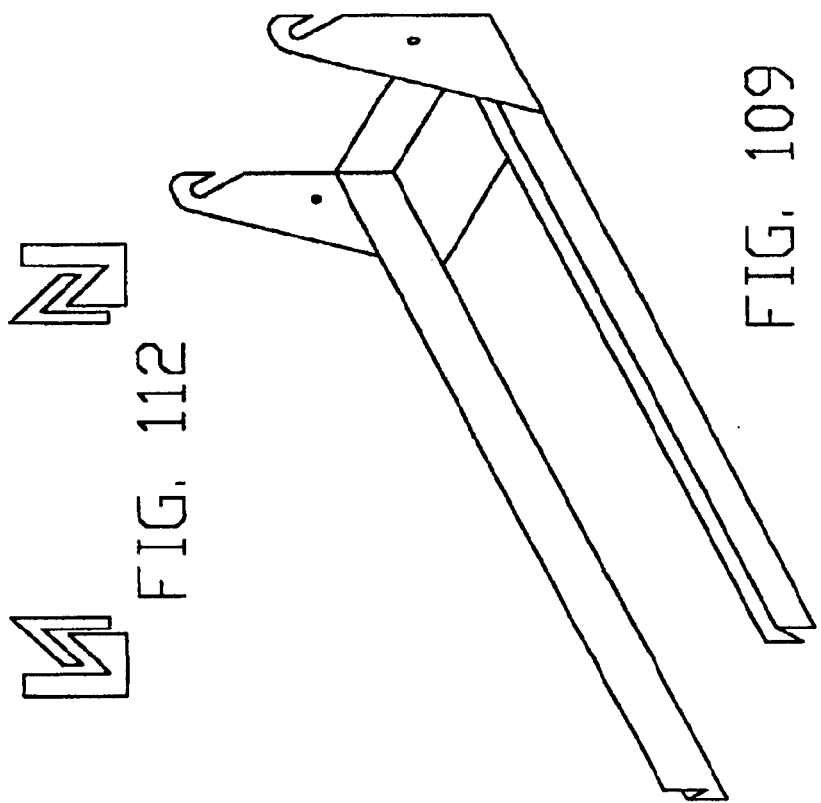
FIG. 109
FIG. 112
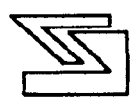
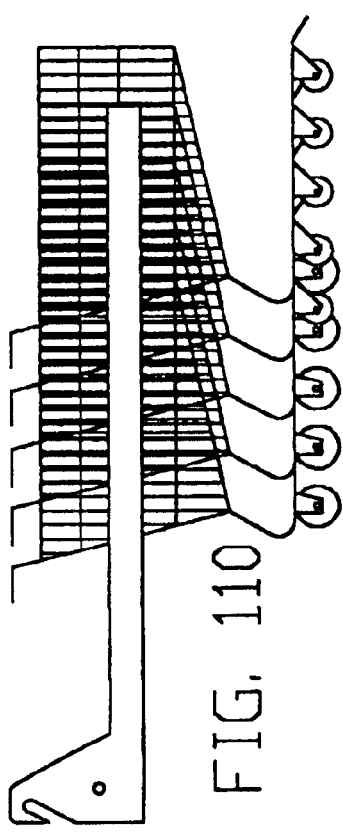
FIG. 110
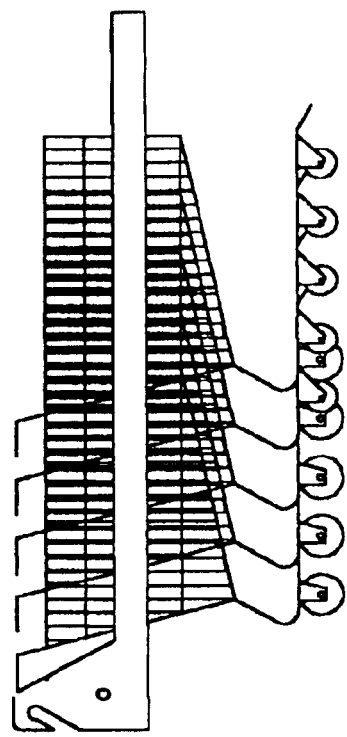
FIG. 111

SHOPPING CART COLLECTION VEHICLE AND METHOD

CROSS-REFERENCE TO RELATED APPLICATIONS

This application is a continuation-in part of U.S. patent application Ser. No. 09/540,450 filed Mar. 31, 2000, issued as U.S. Pat. No. 6,435,803, which is a continuation-in part of U.S. patent application Ser. No, 09/109,559, filed Jul. 2, 1998, issued as U.S. Pat. No. 6,168,367, and hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method of collecting and transporting shopping carts and a shopping cart collection vehicle, adapter or device for use in collecting various types of carts, goods carriers, or the like. The vehicle may additionally include hydraulic lifters, lights, a slip clutch, extendable carrying arm, carrying boom, boom support plate, carrying ram, secondary support rod, rear cart retrieval, holding pins, holding bumps, holding nubs, roll bars, windshield, operator weather cover, removable cover, doors, side windows, back window, forklift, and/or the like. In one embodiment of the invention, the apparatus includes a cart trailer with loading tongue, holding pin, trailer hitch, and chain lock connector.

Typically, shopping carts, goods carriers, or the like are used to facilitate the shopping process by allowing a shopper to move throughout a grocery or department store and successively place selected goods in the cart for purchase. Also, shopping carts are used to convey the purchased goods or items to the shopper's vehicle, automobile, car, truck, or the like. Once the consumer or shopper is done with the cart or other goods carrier, they either leave the cart sitting in the parking lot, place the cart in a temporary storage area in the parking lot, or return the cart to the inside of the grocery or department store.

"Baggers" or other store employees must go out into the parking lot and collect the used carts and move them to the store for reuse by new customers or shoppers. Such collection and movement of shopping carts is conventionally done manually and may require a particular store employee to move anywhere from one to one hundred carts from the parking lot to the store. Such manual movement of shopping carts is labor intensive, unsafe, and may lead to damage of the carts and/or their wheels.

Although attempts have been made at devising mechanisms to assist in the movement of large numbers of shopping carts from the parking lot to the store, such devices are usually used to drag or pull large numbers of manually collected and stacked shopping carts from the parking lot to the store.

Shopping cart moving apparatus are described, for example, in U.S. Pat. Nos. 5,573,078, 5,439,069, 5,322,306, and 5,082,074.

U.S. Pat. No. 5,439,069 to Beeler discloses a nested cart pusher wherein the pusher vehicle latches onto vertical posts at the rear of a shopping cart by means of latch members. The cart pusher then assists a user in pushing a train of nested shopping carts.

U.S. Pat. No. 5,322,306 to Coleman discloses a vehicle for conveying trolleys or carts and the use of a spool and a pair of cables or lines which are respectively coupled at one end to an eyelet on the handle of the device and at another end to an anchoring point, preferably on the end of the lead cart or trolley. By utilizing the cables connected onto the lead of the forwardmost cart or trolley, the Coleman apparatus may be used in either a forward or reverse mode to maneuver the train of shopping carts.

U.S. Pat. No. 5,573,078 to Stringer et al. discloses a steerable, self-powered shopping cart towing apparatus. The Stringer et al. device is a three-wheeled, motorized towing device for affixing to the bottom front crossbar of the frontmost shopping cart in a line of shopping carts. The Stringer et al. device uses a strap reel with a strap and hook to secure a plurality of shopping carts to the device.

U.S. Pat. No. 5,082,074 to Fischer discloses a transport vehicle for positioning behind a plurality of shopping carts and that uses a driving wheel and motor to assist the user in relocating the shopping carts. The apparatus has steering yokes or handles with actuating buttons for the mobile drive. The Fischer transport device also includes a hook that can be engaged into the front of a shopping cart to be transported. The hook is connected to the transport vehicle by a cable tensioned by a cable drum. The hook and cable couple the shopping carts firmly to the transport vehicle so that the vehicle can travel in the tractioned direction and can tow the shopping carts behind it.

Weller (German 2,450,292) is directed to a remote controlled fork stacking truck which pushes trolleys back to a shopping center. More particularly, Weller '692 is directed to a remote controlled forklift truck which collects and pushes a row of trolleys back to the shopping center and has remote control via a cable or radio control. With reference to the figure of Weller '692, the operator does not sit in the vehicle while the carts are collected and returned to the shopping center, the carts are pushed along the ground, the carts are not raised off the ground by an elongate shopping cart supporting device, and the Weller '692 remote controlled forklift truck does not have side rails for keeping the carts from tipping from side to side while supported on an elongate shopping cart support device.

The Weller '692 remote controlled forklift truck suffers from the drawbacks of causing possible harm to the operator standing on the ground, damaging the carts by pushing the carts with their wheels in contact to the parking lot, does not raise the carts up off the ground, does not support each cart on an elongate shopping cart support device, does not include an articulated and/or extendable or retractable shopping cart support device, and the like.

Gerdau et al. (EP 346,292) is directed to a three-wheeled transporter for supermarket trolleys having a pyramid-shaped nose section to locate inside the rearmost trolley. The Gerdau et al. '308 self-propelled transporter merely pushes the supermarket trolleys along the ground. Gerdau et al. '308 does not disclose a shopping cart collection vehicle having an elongate shopping cart support device (boom, arm, shaft, or the like) which supports each of the stacked shopping carts, lifts the carts up off the ground during transport, prevents damage to the wheels during transport, prevents the carts from being jammed tightly together, and the like.

Magni '292 is directed to a self-propelled lift truck for handling palletized loads. Magni '292 is directed to a forklift for handling palletized loads with a typical fork assembly (8) mounted on the end of a boom (4) adapted to reach into trailers, containers, or trucks having rear access only. Magni '292 is not directed to a shopping cart collection transport or storage vehicle. Magni '292 does not disclose an extensible boom adapted to support a plurality of shopping carts thereon with each cart supported on the boom.

Hence, there is a need for an improved method and apparatus for collecting, transporting and moving used shopping carts from the parking lot to the store.

BRIEF SUMMARY OF THE INVENTION

In accordance with an exemplary embodiment of the present invention, a new and improved shopping cart collection vehicle, adapter, and/or device is disclosed for use in collecting, transporting, and/or storing various types of carts, carriers, or the like. The vehicle may include hydraulic lifters, lights, slip clutches, extendable carrying arms, a carrying boom, carrying ram, secondary support rod, rear cart retrieval, holding pins, holding bumps, holding numbs, roll bars, a windshield, operator weather cover, removable cover, doors, side windows, back window, forklift, and/or the like.

In accordance with one embodiment of the invention, a cart trailer includes a floor, side rails, loading ramp, holding pin, trailer hitch, chain lock connector, and the like.

In accordance with the present invention an improved method of collecting shopping carts is disclosed wherein a shopping cart collection vehicle, adapter, or device is used to pick up the shopping carts and return them to the store. In accordance with one embodiment, the collection vehicle includes a multi-wheeled, self-propelled base vehicle adapted for connection to a front lifting and collection system disclosed herein.

In at least one embodiment, the invention is directed to a shopping cart return vehicle for collecting and moving shopping carts in and from parking lot areas of a shopping complex. The shopping cart collection vehicle includes either single or multiple shopping cart storage racks for simultaneously collecting, moving and storing multiple shopping carts. The vehicle includes one or more elongated lifts or booms which raise the shopping carts off the ground so that the wheels of the carts are not damaged or worn and so that the carts are not jammed together and damaged during collection and movement. In the preferred embodiment, the shopping cart collection vehicle is motor-driven and preferably has a rear steerable wheel. The front area of the vehicle serves to collect and store the carts and may either be open or have mesh or solid sides.

A principal object of the present invention is the provision of a shopping cart collection vehicle that is used to easily and safely collect and retrieve the shopping carts left in parking lots by store customers.

Another object of the present invention is a shopping cart collection trailer which can be used as a shopping cart collection area in a parking lot. The full trailer may be replaced with an empty trailer in the parking lot while being emptied. The full trailer and the collected carts contained therein are moved to the store and the carts are emptied therefrom. Thus, the collected carts my be used by future customers, and the empty cart trailer is returned to the parking lot so that customers can return their used shopping carts to a convenient and easily used storage area.

Another object of the present invention is an interchangeable forklift system or adapter to allow a standard forktruck or forklift to be used both as a forktruck and as a shopping cart collection vehicle.

Another object of the present invention is the provision of a replaceable, extendable, and/or retractable shopping cart collection arm, lift, or boom to allow for the efficient collection of a number of shopping carts, while being easily driven with a shorter length arm when carts are not being carried.

Another object of the present invention is the provision of a shopping cart collection vehicle having a protective roll bar and weather cover for the employee or operator collecting the shopping carts.

Other objects and further scope of the applicability of the present invention will become apparent from the detailed description to follow, taken in conjunction with the accompanying drawings wherein like parts are designated by like reference numerals.

BRIEF DESCRIPTION OF THE SEVERAL VIEWS OF THE DRAWING

FIGS. 7 and 8 are respective side and front view illustrations of a shopping cart collection vehicle in accordance with yet another embodiment of the present invention.

FIG. 9 is a side view representation of the articulated boom of FIGS. 7 and 8.

FIGS. 17–24 are directed to a forklift-type shopping cart collection vehicle or modified forklift having a collection system, device, or adapter attached to the front of the forklift in place of forklift forks.

More particularly, FIG. 17 is a side view illustration of a forklift-type shopping cart collection vehicle in accordance with an exemplary embodiment of the present invention.

FIG. 18 is an enlarged partial view of FIG. 17.

FIGS. 19 and 20 are respective top and front view illustrations of the forklift-type shopping cart collection vehicle of FIGS. 17 and 18.

FIG. 21 is a side view illustration of a conventional forklift with a shopping cart collection adapter, system, device, attachment, or the like adapted to be attached in place of conventional forklift forks.

FIGS. 22, 23 and 24 are respective schematic representations of the side, top and other side view of a forklift system, device, attachment, or adapter.

FIG. 25 is a side view illustration of a shopping cart collection vehicle in accordance with still another embodiment of the present invention, wherein the shopping cart collection boom and support rails are manually adjusted and raised.

FIG. 26 is a cross-section illustration taken along line 26—26 in FIG. 25.

FIG. 27 is a schematic perspective view illustration of a collection system.

FIG. 28 is a schematic perspective view illustration of an alternative collection boom.

FIG. 29 is a partial schematic perspective view illustration of a cantilever boom structure with the boom in the lower cart collecting operative position.

FIG. 30 is a schematic perspective view illustration of the system of FIG. 29 with the boom in a substantially vertical raised position and extended.

FIG. 31 is a side view representation of the device of FIG. 30 with forklift forks attached to the fork bar.

FIG. 32 is a schematic perspective assembly view of the boom of FIGS. 29 and 30.

FIG. 33 is a front view illustration of a shopping cart collection vehicle having a cantilever boom such as shown in FIG. 32.

FIG. 37 is a perspective view representation of a shopping cart collection vehicle in accordance with still yet another embodiment of the present invention.

FIGS. 55 and 56 are respective side and partial top view illustrations of a shopping cart collection vehicle body and collection system in accordance with yet another embodiment of the present invention.

FIGS. 61, 62 and 63 are respective side, partial top and front view illustrations of a convertible shopping cart collection and forklift vehicle in accordance with yet another embodiment of the present invention.

FIGS. 64–76 are directed to a convertible or dual purpose shopping cart collection and forklift vehicle in accordance with still another embodiment of the present invention.

FIGS. 64 and 65 are respective side view illustrations of a light duty and heavy duty dual purpose shopping cart collection vehicles.

FIGS. 66 and 67 are respective front view illustrations of the boom and fork assembly of the vehicle of FIG. 65 with a first boom and fork bar connection.

FIGS. 68 and 69 are respective side and top view illustrations of the boom and fork assembly of FIG. 65.

FIGS. 70 and 71 are respective front view representations of the fork bar and boom assemblies of the vehicle of FIG. 65.

FIG. 72 is a front view illustration of the vehicle of FIG. 65 with a second boom and fork bar connection.

FIG. 73 is a front view illustration of the fork bar and boom of FIG. 72 with the boom locked into the fork bar.

FIG. 74 is a side view illustration of the fork bar and boom of FIGS. 72 and 73 separated from one another.

FIG. 75 is a perspective view illustration of the fork bar of FIGS. 72–74.

FIG. 76 is a side view illustration of the vehicle of FIG. 65.

FIG. 77 is a side view illustration with the boom in a raised substantially vertical position and forks attached to the fork bar.

FIG. 78 is a side view illustration with the boom in a lowered substantially horizontal operative position.

FIG. 79 is a side view illustration with a raised substantially vertical boom which is extended and retracted to raise and lower forks attached to a fork bar.

FIG. 80 is a perspective view representation with the boom lowered to an operative position and extended.

FIG. 81 is a schematic perspective view illustration of the assembly of FIG. 80 with the boom raised in a substantially vertical position and shown extended and with the forks raised.

FIG. 82 is schematic side and top view representations of frame members and a frame for the self-propelled vehicle in accordance with one example of the shopping cart collection vehicle of the present invention.

FIG. 109 is a perspective view representation with the boom lowered to an operative position and extended.

FIG. 110 is a side view representation of a shopping cart collection vehicle in accordance with another embodiment of the present invention.

FIG. 111 is a side view representation of a shopping cart collection vehicle in accordance with another embodiment of the present invention.

FIG. 112 is a partially fragmented front elevational view of the cart and boom of the vehicle of FIG. 89.

DETAILED DESCRIPTION OF THE INVENTION

Figure 1:
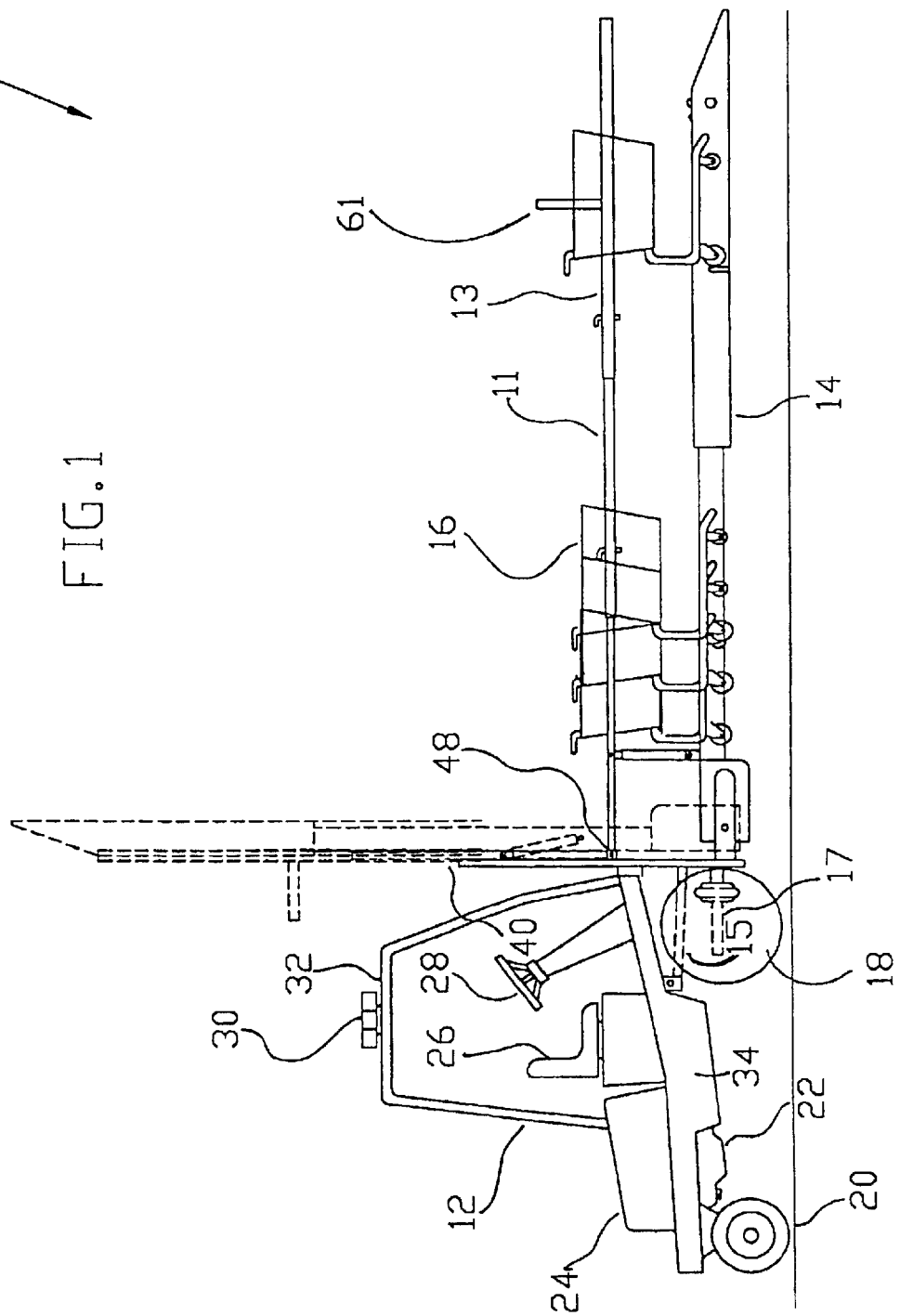
FIGS. 1, 2 and 3 are respective side, top and front view illustrations of a new and improved shopping cart collection vehicle in accordance with one embodiment of the present invention.

Grocery and convenience stores supply shopping carts for the use of their customers in collecting and moving their goods to the purchasing area for purchasing the items and then moving the items to the customer's vehicle. As a convenience to customers, these stores often allow the customers to leave the carts in a rack located in the parking lot which is a more convenient location as it is closer to the customer's vehicle and more convenient to the customer than having the customer return the cart to the store. The store then has an employee retrieve the carts from the parking lot and return them to the store for use by other customers. Conventional methods for retrieving shopping carts are manually labor intensive. The standard method for retrieving shopping carts is for a store employee to walk out into the parking lot area, collect the loose carts to a central area and telescopically connect the carts into a long interconnected train of carts. The carts are then pushed by one or more employees back to the store for use by other customers. In an improved conventional method of collecting carts, the employee attaches a cable or cord to the first shopping cart of the interconnected shopping cart arrangement to better retain, control, and steer the line of shopping carts. The conventional method for collecting shopping carts does not protect the employee collecting the shopping carts from the weather or other drivers in the parking lot.

Conventional parking lot storage racks for carts are permanently located in the parking lot and require manual retrieval of the shopping carts.

Further, conventional forklifts and forklift forks are not suitably designed for, are not the right size or in the right position for the proper collection of shopping carts in accordance with the present invention. Conventional forklift carrying systems are not of a sufficient length to allow for the collection of an efficient number of shopping carts.

In accordance with an exemplary embodiment of the present invention, a new and improved shopping cart collection vehicle or device is disclosed for use in collecting, transporting, storing, and the like various types of shopping carts, carriers, or the like. The vehicle contains a conventional gas, electric or liquid fueled drive system and transmission with the requisite power. For example, 2–50 horsepower. The vehicle should be balanced and counterweighted to be able to stably move one or more stacks, strings or trains of interconnected shopping carts. The vehicle additionally includes hydraulic electric, chain and cable lifters, as well as lights, slip clutches, screw drives, an extendable carrying arm, carrying boom or carrying ram, secondary support rods, rear cart retrieval, holding pins, holding bumps, holding numbs, roll bars, a windshield, operator weather cover, removable cover, doors, (which can be canvas, fiberglass, metal, plastic vinyl or cloth) side windows, back window, low profile emergency or warning lights, headlights, screw drives and/or the like.

Preferably, the vehicle includes a lifting system usually attached to the front of the vehicle and including a raisable and extendable boom or arm. This allows for the boom to be raised or lowered in order to pick up or set down the shopping carts. Preferably, the boom or arm is extendable and/or articulated to allow the vehicle to be readily maneuverable in tight locations with the boom or arm retracted, but still allow for the vehicle to carry a large number of shopping carts when the boom or arm is extended.

The vehicle boom or arm may be fitted with one or more elements or assemblies for retaining the shopping carts being carried. For example, a top rail, side rails, and/or a small nub, bumps or a retaining pin can be fitted onto the free end of the boom or arm in order to ensure that the shopping carts are restrained during the transportation of the carts. A rollcage or protective covering can be provided for the operator of the vehicle to protect the operator from rollovers, falling objects or in the event of an accident while operating the vehicle. Furthermore, a weather protective covering and air conditioning unit can be installed to protect the vehicle operator from adverse weather conditions.

In operation, the shopping cart collection vehicle is driven into the parking lot with the boom raised, then the boom is lowered to either spear a group of shopping carts or to pick up each cart individually. To pick up a cart, the vehicle operator places the boom under the main storage crate and through the shopping cart, and then raises the boom to lift the shopping cart off the ground. To add additional shopping carts, the boom is lowered to spear or pass through the appropriate location on the next shopping cart, and then raised to lift the additional cart off of the ground for transportation. To remove a cart or carts from the boom, the boom is lowered until the shopping carts are no longer supported by the carrying boom and then the boom is withdrawn from the shopping carts. If the boom has cart retaining nubs or bumps to retain the shopping carts, the boom should be lowered sufficiently to allow the boom to be removed without interference from the retaining elements.

If a retaining pin is used, once the operator picks up a shopping cart or carts and is ready to transport the carts to another location, a retaining pin is placed into position to block the carts from coming off of the supporting boom. This pin must be removed in order to unload the carts as described above.

If there is a large number of carts to be transported, the boom or arm can be extended lengthwise to allow for the addition of more carts to the boom. The boom or arm is limited in its maximum length so that when it is fully loaded with shopping carts, the load will not exceed the safe balancing, carrying capacity, or maneuverability of the transporting vehicle.

Figures 35, 36:
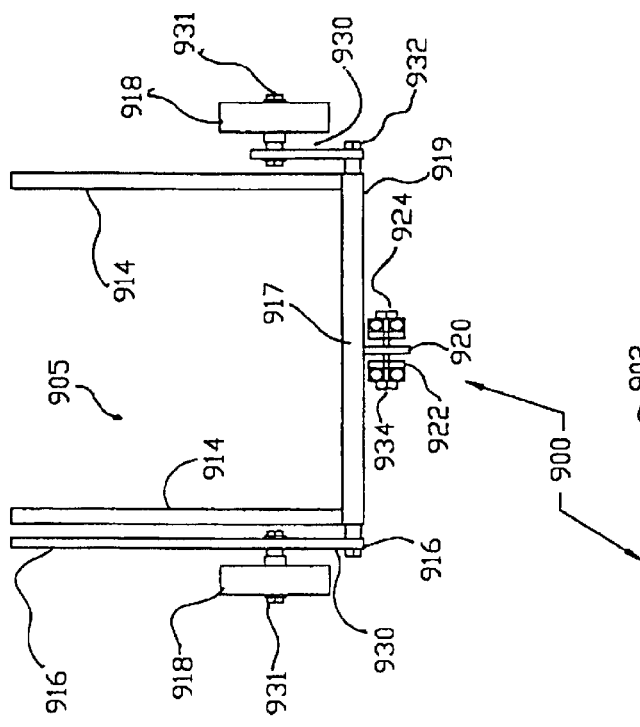
FIGS. 35 and 36 are respective side and partial top view illustrations of a shopping cart collection trailer in accordance with an exemplary embodiment of the present invention.

In accordance with another embodiment of the present invention, a shopping cart trailer for collecting, storing and transporting shopping carts includes a floor, side rails, a loading ramp, a holding pin, a trailer tongue hitch, and a chain lock connector. This trailer is designed so that a shopping cart can be moved up the ramp and telescopically interconnected with any existing carts already loaded into the trailer. The carts are held on the trailer by a retaining fence of side and front rails. One end of the trailer has a set of movable wheels so that when the wheels are in the up position, the wheels no longer support the trailer and the trailer is maintained in a relatively stable, non-transportable position. When the wheels are rotated into the down position, the wheels support the weight of one end of the trailer and any of the carts loaded onto the trailer. Thus with the wheels in the down position, the trailer is easily movable to transport the shopping carts (FIGS. 35 and 36).

The trailer may be held into place by a chain lock connector which can be secured so that the trailer is locked into a particular location while it is either located in the parking lot for shopping cart retrieval, or while in storage. Prior to movement of the loaded trailer, the ramp is raised to form a gate which blocks the front of the trailer and retains the carts within the trailer during movement of the loaded trailer. Also, raising of the ramp allows access to a trailer hitch or tongue which is adapted to be attached to a motor driven vehicle for movement of the trailer from the parking lot to the store.

In accordance with another embodiment of the present invention, a conventional forklift may be converted to a shopping cart collection vehicle by attaching a shopping cart collection system or adapter to the forklift in place of the regular forklift or forktruck forks. The adapter may either have a solid boom or an extendable boom (FIGS. 21–24).

In accordance with yet another embodiment of the present invention, a convertible shopping cart collection and forklift vehicle is shown having an extendable and angularly articulatable boom or ram which is lowered to serve as a shopping cart collection boom, arm or system. The vehicle also includes a horizontal fork support member which is adapted to receive conventional forklift forks when the boom is in its raised vertical position and adapted to serve as the hydraulic element for lifting or raising the forks within a vertical frame mounted on the front of the vehicle. Hence, this convertible vehicle can be used as a relatively light duty forklift for, for example, moving pallets filled with goods around in a store, parking lot or garden area and with the forklift forks removed can be used as a shopping cart collection vehicle (FIGS. 27–30, 59–81, 83 and 84).

The shopping cart collection vehicle of the present invention may have a covered or uncovered cab, a covered or uncovered shopping cart collection unit, a front and/or rear collection unit, four wheels, three wheels, or six wheels, a flashing or rotating light or beacon, a hydraulic, electric, or pneumatic telescoping or extending lift, boom, or arm, an articulated shopping cart collection unit, front steering, rear steering, front drive, rear drive, accordion, mesh, or screen sides to the collection unit, a separable collection unit or trailer, a fiberglass, metal, or cloth vehicle cover, side rails or top rails for supporting the collected shopping carts to prevent them from toppling from side to side, and single, dual, triple, or quad shopping collection units allowing side by side collection of rows of carts to increase the number of carts which may be collected, stored, transported, or the like.

With reference to FIG. 1 of the drawings, in accordance with one embodiment of the present invention, a shopping cart collection vehicle or system is generally designated by the numeral 10. The shopping cart vehicle 10 includes a shopping cart collection system or unit 11 and a self-propelled vehicle 12.

The shopping cart collection system 11 includes shopping cart side support arms or rails 13, an articulated and extendable shopping cart bottom support arm or boom 14, and a hydraulic lifting system 15. The shopping cart side support rails 13 and shopping cart bottom support boom 14 are used to collect, hold and transport shopping carts 16. The shopping cart side support rails 13 and shopping cart bottom support boom 14 are controlled, raised, lowered and tilted by the hydraulic lifting system 15. The shopping cart side support rails 13 are horizontally extended and retracted manually and vertically retracted by gravitational force. The shopping cart bottom support boom 14 is extended and retracted by a boom drive 17. The hydraulic lifting system 15 and the boom drive 17 both receive power from the self-propelled vehicle propulsion drive system 22. The shopping cart collection system 11 is mechanically and operatively connected to the self-propelled vehicle 12 via a plate 40, a hydraulic cylinder for powering the hydraulic lifting system 15 and a power take off for the boom drive 17. See FIG. 16 for more detail on the boom drive 17 and hydraulic system 15.

The self-propelled vehicle 12 includes front wheels 18, rear wheels or wheel 20 and a drive system 22. This drive system is preferred to include rear wheel drive and steer and contemplated to be electrical, gas, propane, liquid fuel, combinations thereof, or other common drive sources. The drive system 22 is supported by a self-propelled vehicle frame 34 and is enclosed in a body 24. The frame 34 and body 24 add structure and support to the general assembly of the self-propelled vehicle 12. Furthermore, a safety cage 32 is added into the structure of the self-propelled vehicle 12 and attached to the frame 34 and body 24 to add structure, rigidity and safety for the driver. In addition, the self-propelled vehicle 12 includes a driver's seat 26, a steering wheel 28, and lights 30. The self-propelled vehicle 12 also includes control switches, levers, knobs, buttons, or the like to raise, lower, tilt, extend and retract the boom or arm 14 of shopping cart collection system 11.

The self-propelled vehicle 12 is preferably a custom built unit for this application, but can also be embodied in a modified golf cart such as a gasoline or electric driven Club Car, preferably a 9 hp gasoline powered Carryall I Pickup, tractor system such as a John Deere commercial front mower or greens mower, or utility vehicle such as a Kawasaki Mule 550, 2500 or 2510.

Figure 2:
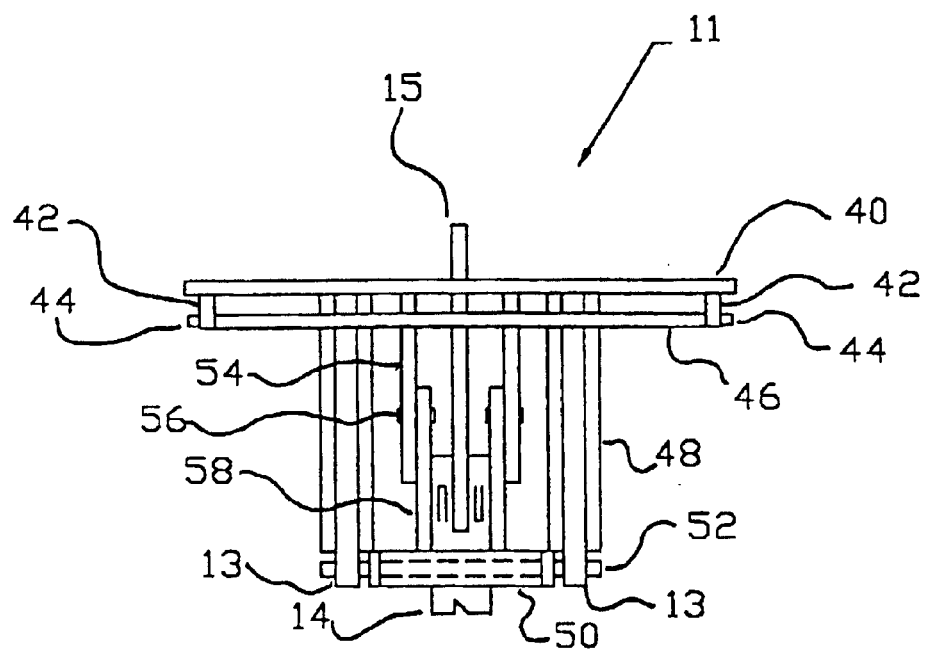

With respect to FIG. 2 of the drawings, a partial top view of the shopping cart collection system 11 is shown. The collection system backing plate 40 forms the base of the shopping cart collection system 11. From this backing plate 40 extends two side rail pivot mounting brackets 42 through which are mounted side rail pivot mounting pins 44 to support a side rail pivot bar 46. The side rail pivot bar 46 is used to support the shopping cart side support rails 13. The side support rails 13 are threaded, welded or otherwise connected to the pivot bar 46 for attachment to the shopping cart collection system 11. The side support rails 13 are supported in the lower position by spaced side rail supports 48. The side rail supports 48 are welded, bolted or otherwise attached to the collection system backing plate 40. The shopping cart side support rails 13 are connected to one another by an extendable side rail cross bar 50 and a cross brace 61. Support rails 13 are connected to the extendable side arm cross bar 50 by side rail cross bar mounting pins 52.

In addition to supporting the side support rails, the collection system backing plate 40 also supports the shopping cart support arm or boom 14. Spaced boom mounting plates 54 are welded, bolted or otherwise attached to the collection system backing plate 40. Supporting boom pivot plates 58 are pivotally attached to the boom mounting plates 54 by boom mounting bolts or pins 56. The supporting boom pivot plates 58 are attached to the side of the shopping cart support arm or boom 14. The end of the shaft of the hydraulic cylinder 15 is pivotally attached to the top of boom 14. In this manner, the shopping cart support boom 14 and the boom pivot plates 58 are pivoted around the mounting bolts 56 by lifting system 15 to raise and lower the shopping cart support boom 14.

Figure 3:
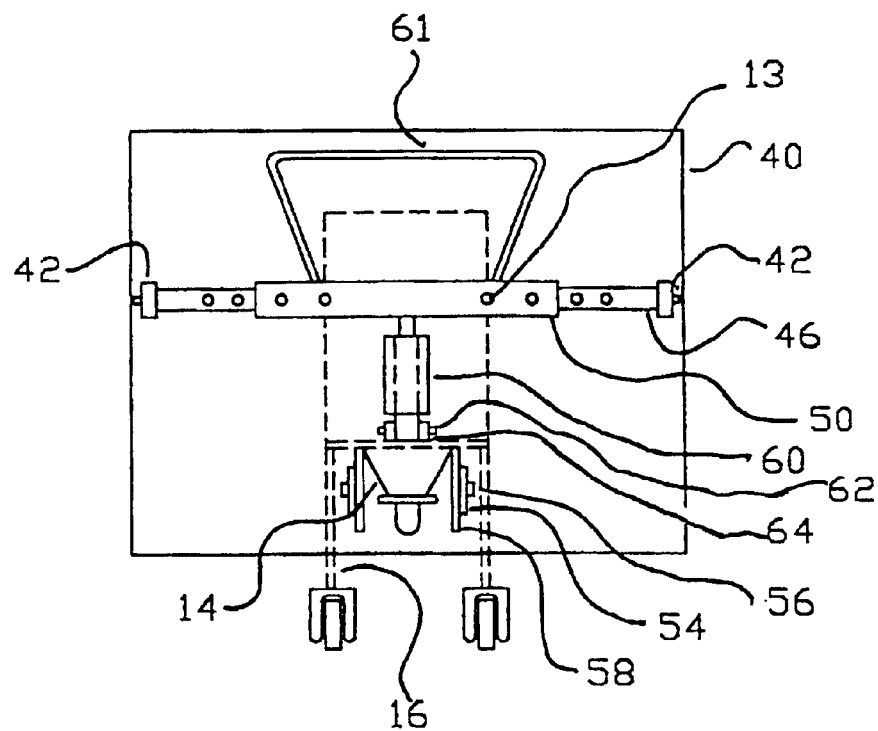

In FIG. 3, a front view of the shopping cart collection system 11 is shown. From this view it can be seen that the extendable side rail cross bar 50 is connected to a cross rail support 60. The cross rail support 60 is connected through a cross rail support pin 62 to a cross rail bracket 64. The cross rail bracket 64 is fixably connected to the shopping cart support boom 14. The cross rail support 60 and the forward rail cross brace 61 operatively connect the shopping cart support boom 14 to the shopping cart side support rails 13 such that when the shopping cart support boom 14 is raised and lowered, the shopping cart side support rails 13 follow and are correspondingly raised and lowered.

Figure 16:
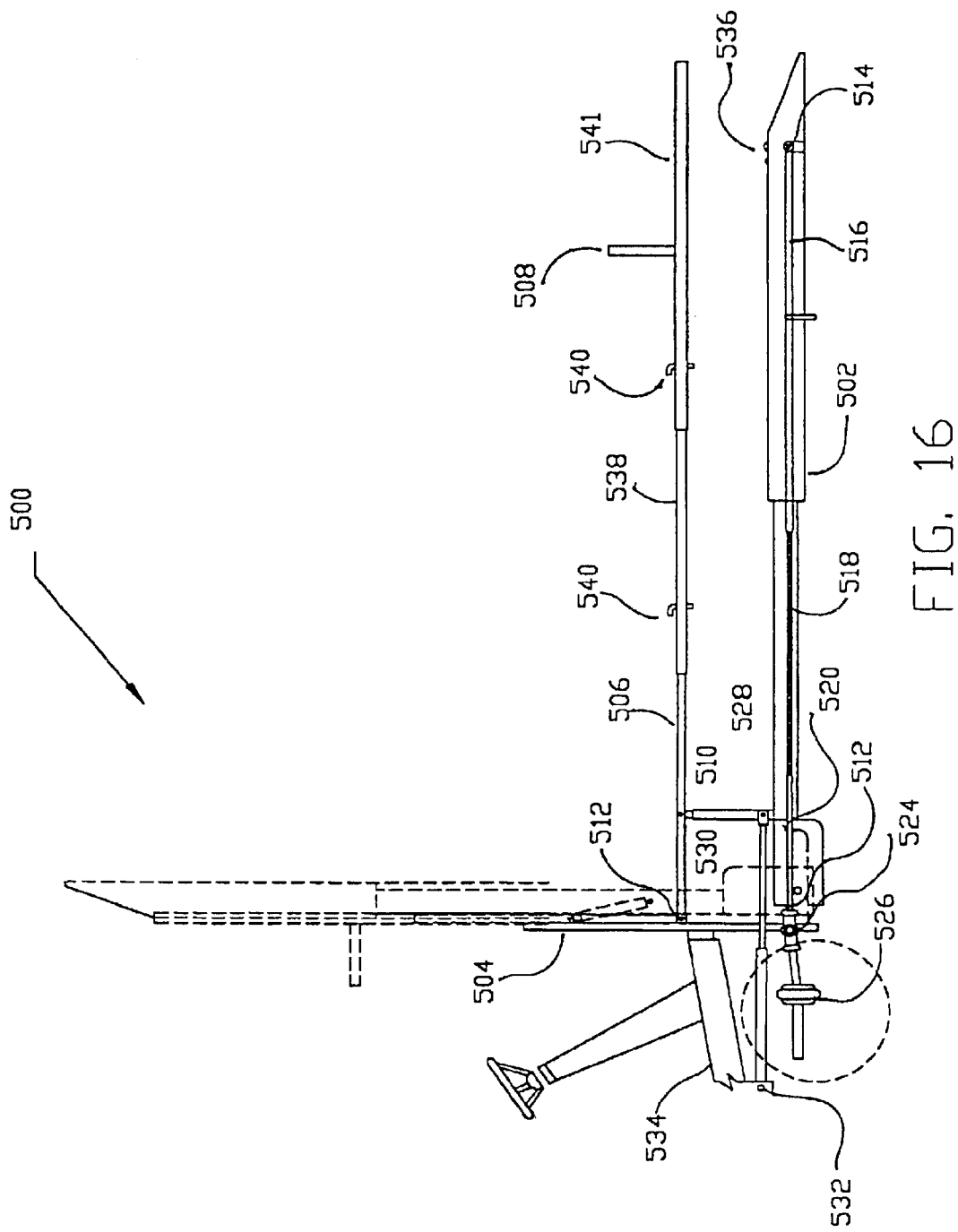
FIG. 16 is a partial side view illustration of a shopping cart collection vehicle in accordance with still another embodiment of the present invention.

The side rails 13 are each formed of three telescoping tubes or shafts which may be pinned in place (FIG. 16). The extendable boom 14 is formed of two or more telescoping members with the outer member extended or retracted by the action of an internal screw drive powered by the Power Take Off or PTO (FIG. 16).

Figure 4:
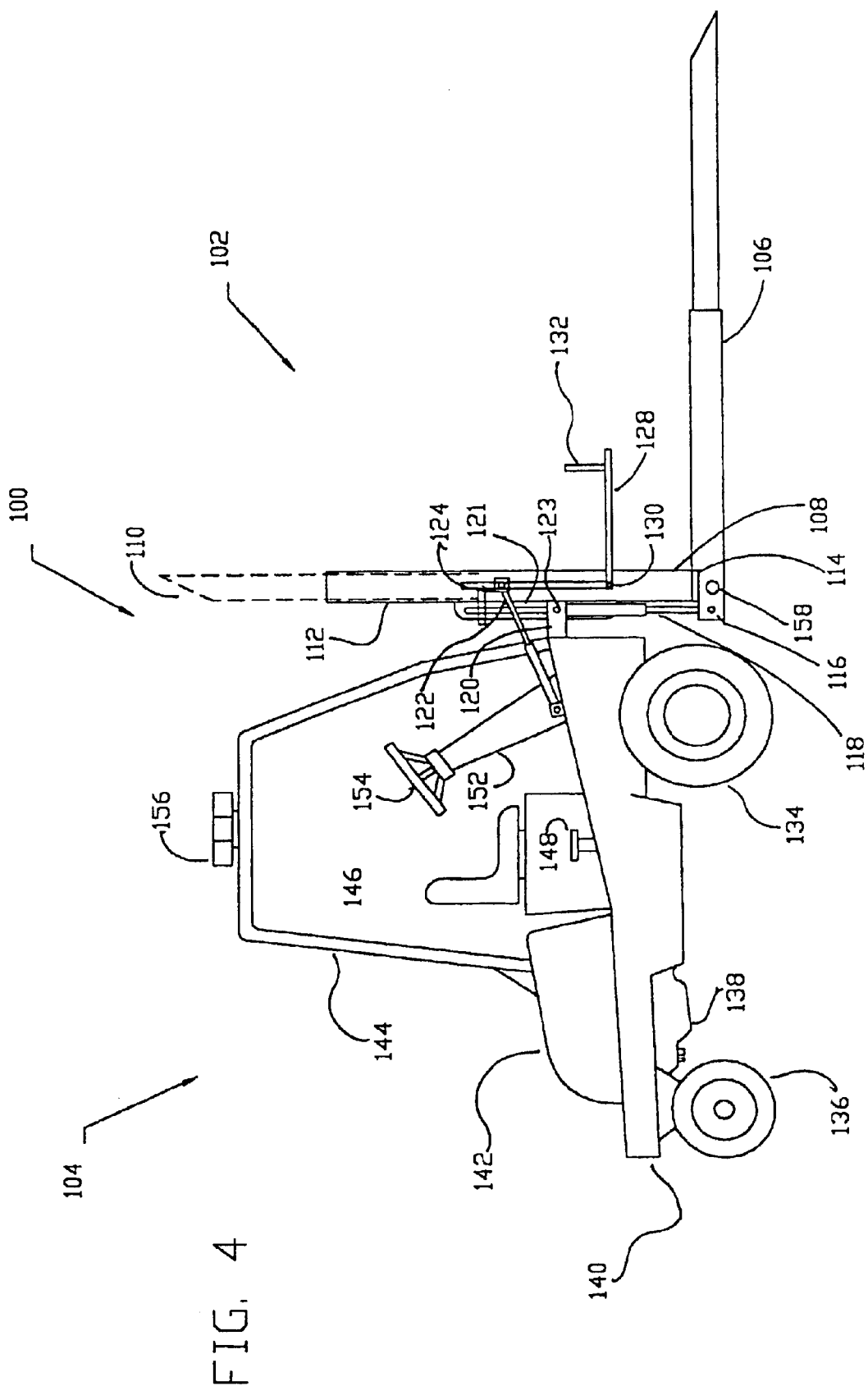
FIGS. 4, 5 and 6 are respective side, front and top view representations of a shopping cart collection vehicle in accordance with another embodiment of the present invention.

With reference to FIG. 4 of the drawings, another embodiment of the shopping cart collection vehicle is generally designated by the numeral 100. This embodiment of the shopping cart collection vehicle 100 includes a shopping cart collection system 102 and a self-propelled vehicle 104.

The collection system 102 includes an articulated and extendable boom 106, an internal frame 110, and an external frame 112 which is operatively attached to the self-propelled vehicle 104. The extendable boom 106 is preferably extended by an internal hydraulic cylinder but may be extended by either a screw drive, cable system, pneumatic system or other means of extending and retracting the boom 106. The extendable boom 106 is attached through boom pivot point 108 to the external frame 112. The internal frame 110 includes spaced channel members 111 which ride vertically within spaced outer channel members 113 of the external frame 112. The extendable boom 106 may be pivoted vertically around the boom pivot point 108 through the use of boom motor 114. The entire boom 106, motor 114 and external frame 112 assembly may be raised and lowered through the use of external frame brackets 116, each of which is connected to the external frame 112. The external frame vertical brackets 116 are pivotally connected to the bottom part of vertical hydraulic cylinders 118. The upper end of each vertical hydraulic cylinder 118 is pivotally connected to the self-propelled vehicle 104 through a vertical cylinder pivot bracket 120. By extending and retracting the vertical hydraulic cylinders 118 the external frame 112 may be raised and lowered. In this manner, the extendable boom 106, internal frame 110, motor 114 and associated equipment may be raised and lowered along with the external frame 112 to raise and lower the shopping carts that have been collected on boom 106.

The external frame 112 is pivotally connected to the self-propelled vehicle 104 by the vertical hydraulic cylinders 118, external frame slotted pivot brackets 121, and tilting cylinders 122. By tilting the external frame 112, the internal frame 110 and extendable boom 106 are thus also tilted. The external frame 112 is tilted by extending and retracting the tilting cylinders 122. Each tilting cylinder is pivotally connected to the external frame 112 by an external frame tilting bracket 124. Each tilting cylinder 122 is also pivotally connected to the self-propelled vehicle 104 by a tilting cylinder vehicle bracket 126. By these attachments, when the tilting cylinders 122 are extended and retracted, the external frame 112 and associated components are tilted forwards and backwards in comparison to the self-propelled vehicle 104 to facilitate the collection and distribution of shopping carts and the use of the inner frame 110 as a forklift unit.

Also shown in this embodiment of the shopping cart collection vehicle 100 as a part of the collection system 102, side support rails 128 are connected to the external frame 112 by side support rail pivot rods 130. The side support rails 128 are connected by a cross bar 132. The side support rails 128 are raised and lowered along with the extendable boom 106 through the use of the motor 114.

By retracting and then raising the extendable boom 106 and the side support rails 128, it may be appreciated that the overall wheel base of the shopping cart collection vehicle is reduced for maneuvering capabilities and to provide a forklift function if desired. Once maneuvered, the extendable boom 106 and side support rails 128 may be lowered and the extendable boom 106 may be extended for the collection of shopping carts. In this manner, it may be appreciated that a short wheel base, highly maneuverable, shopping cart collection vehicle 100 may be extended to collect a large quantity of shopping carts.

The self-propelled vehicle 104 is supported by front wheels 134 and rear wheels or wheel 136 giving a wide base for stability of the self-propelled vehicle 104. The vehicle 104 is powered by a drive system 138 which is operably connected to drive the vehicle 104 through the front wheels 134 and/or rear wheel or wheels 136. The drive system 138, front wheels 134 and rear wheels or wheel 136 are operatively connected to a frame 140. The frame 140 also supports a fuel tank cover or body 142 and a protective cage 144. Located within the protection of the protective cage 144 is a driver's seat 146, collection system controls 148, self-propelled vehicle controls 150, steering column 152, and steering wheel 154. Located on an upper portion of the protective cage 144 is a safety light bar or system 156.

Figure 5:
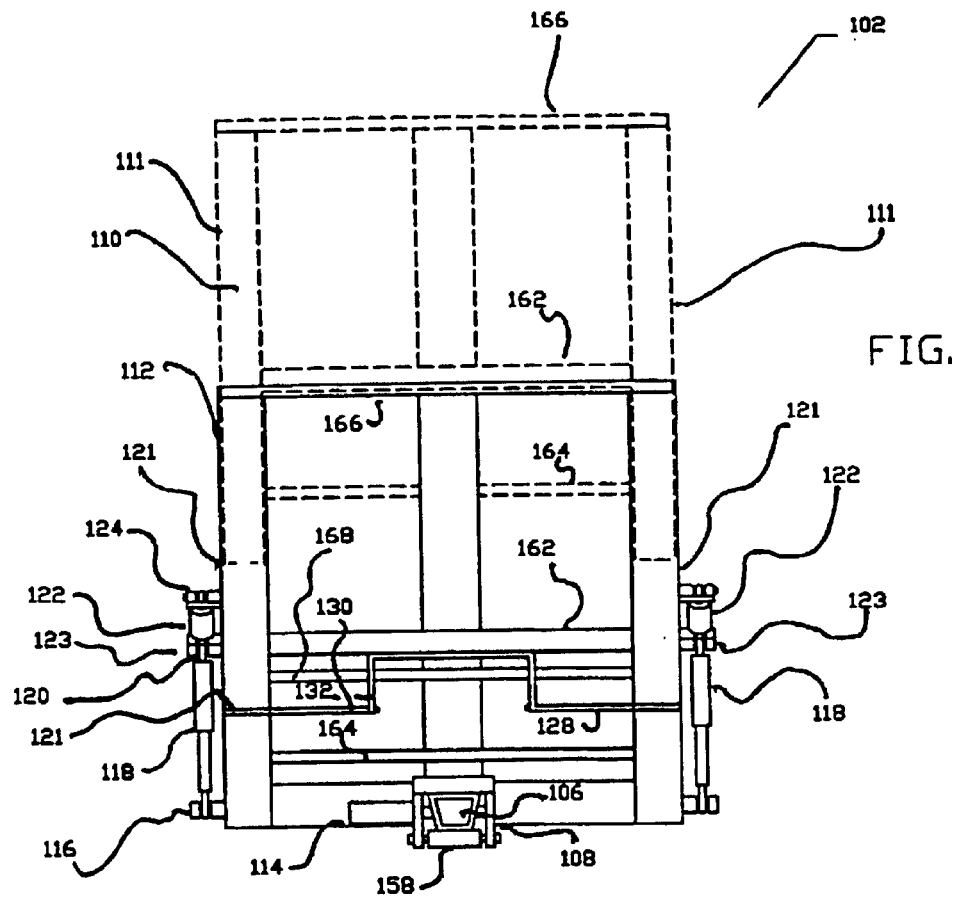

With reference to FIG. 5 of the drawings, a front view of the collection system 102 may be seen. From this view, the relation between the internal frame 110 and external frame 112 may be seen. The internal frame 110 slides within the external frame 112. When the boom is raised to a vertical position inside inner frame 110, the internal frame 110 may be raised and lowered relative to external frame 112 by extending and retracting the boom 106. Thus, when the boom 106 is extended, the boom 106 raises the internal frame 110. The raising and lowering of the external frame 112 is affected by the vertical hydraulic cylinders 118. Because the vertical cylinder pivot bracket 120 is connected to the vehicle 104 and the external frame bracket 116 is connected to the external frame 112, the extension and retraction of the vertical hydraulic cylinders 118 will lower and raise both the external frame 112 and the internal frame 110.

The external frame 112 is tilted forward and backwards by the tilting cylinders 122 and their connection to the external frame tilting bracket 124. The external frame 112 is also connected to the vehicle 104 by means of the external frame slotted pivot bracket 121. Because the tilting cylinders 122 are connected to the external frame 112 at a point above the pivot bracket 120 and each ride on a pin 123 extending therefrom, the extension and retraction of the tilting cylinders 122 will tilt forward and backwards the upper end of external frame 112 about the pin 123 extending from each bracket 120.

Also shown in FIG. 5 is a bottom roller 158. The bottom roller 158 is connected to the external frame 112 below the boom 106. The bottom roller 158 allows for the external frame 112 to be lowered almost to ground level where the bottom roller 158 would hit the ground or pavement. Also, roller 158 provides a rolling support for the lower end of boom 106 as it is raised and lowered by motor 114.

Figure 6:
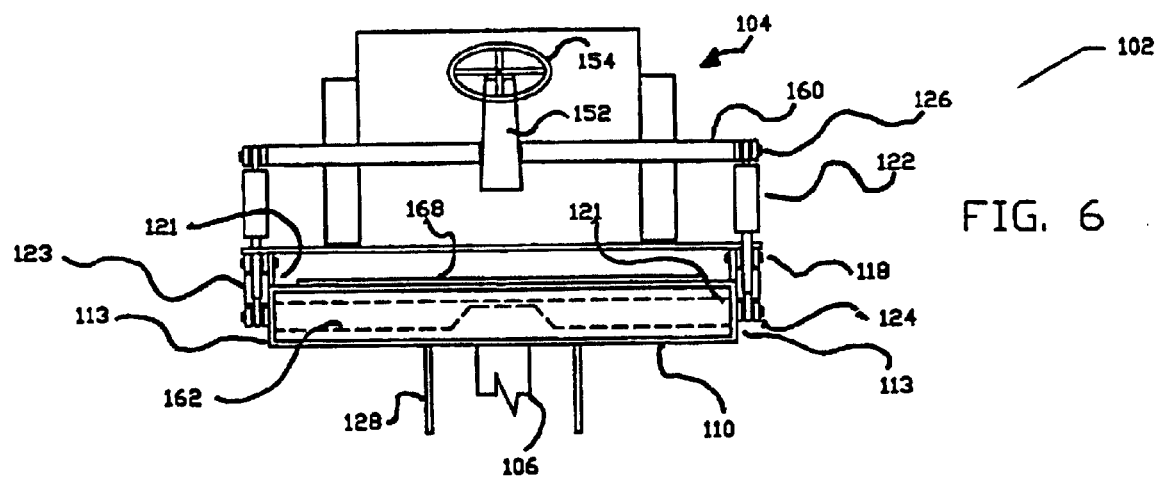

With reference to FIG. 6 of the drawings, the relation between the collection system 102 and the self-propelled vehicle 104 may be seen. The self-propelled vehicle 104 includes extended connection point rods 160 which connect to the tilting cylinder brackets 126. Each tilting cylinder bracket 126 is connected into one tiling cylinder 122 which connects to the external frame 112 by means of the respective external frame tilting bracket 124. Additional connections between the vehicle 104 and the external bracket 112 are facilitated by the slotted external frame pivot brackets 121 located on each side of the external frame 112.

As further shown in FIG. 6, the vertical hydraulic cylinders 118 are located in a parallel relation to the external frame 112 and internal frame 110. The internal frame 110 slides vertically within the external frame 112 and is supported by the extendable boom 106. Also shown on the self-propelled vehicle 104, is the steering column 152 and steering wheel 154.

A forklift bar 162 is attached at each end to the internal frame 110 and has a set back which accommodates the boom 106 in the vertical position. The bar 162 is used to support conventional forklift forks and is preferably used when the boom 106 is in its raised position such that the boom 106 may serve as a drive for raising and lowering inner frame 110 and forklift bar 162.

The internal frame 110 also includes a lower cross support 164 and upper cross support 168. External frame 112 includes back cross braces 168.

With reference to FIG. 7 of the drawings, another embodiment of the shopping cart collection vehicle is generally designated by the numeral 176. The vehicle 176 includes a collection system 178 and a self-propelled vehicle 180.

The collection system 178 has of an extendable boom 182 and top or side support rails 184 connected to a vertical frame 186. This vertical frame 186 is connected to a tiltable plate 188 in a relation that allows the vertical frame 186 to vertically slide up and down in comparison to the tiltable plate 188. This vertical operation is effectuated by connection of the vertical frame 186 through the tiltable frame 188 to a vertical cylinder 192. The vertical cylinder 192 is pivotally connected to a pivot connection 190, thus allowing a fixable location 190 for operation of the vertical frame 186. By extending and retracting the vertical cylinder 192 the vertical frame 186 is moved in relation to the tiltable frame 188 for the lifting and dropping of the extendable boom 182 and the side support rails 184.

The tiltable plate 188 is connected at the pivot connection 190 to the self-propelled vehicle 180. The tiltable plate 188 is tilted by means of a tilting cylinder 194. The tilting cylinder 194 is connected to bracket 195 which is connected to the tiltable plate 188 at a location different than the vertical cylinder 192 such that the two cylinders may operate separately. The tilting cylinder 194 is also connected in a pivotal fashion to the self-propelled vehicle 180 by the vehicle pivot bracket 196.

The self-propelled vehicle 180 has of front wheels 196 and rear wheels or wheel 198 operably connected to a drive system 200 and supported by a frame 202. The frame 202 also supports the body 204 and driver protection cage 206. Located within the frame 202 and inside the protective cage 206 are a driver seat 208, steering column 210 and steering wheel 212. Located on top of the protective cage 206 is a light system 214. Note the addition of a protective rear screen 216. Various controls 218 may also be seen located within the protective cage 206 and within reachable access of the driver while seated in the seat 208.

With reference to FIGS. 8 and 9 of the drawings, the operation of the extendable boom 182, the vertical frame 186, and the tiltable plate frame 188 may be seen. FIG. 8 is a view from the back of the tiltable plate 188 looking towards the vertical frame 186. This view shows the relation of the vertical cylinder 192 connection to the boom 182 through a slot 220 with in the tiltable plate 188. The slot 220 allows the vertical operation of the boom 182 by the vertical cylinder 192 through the tiltable plate 188. The vertical cylinder 192 is pivotally connected to the tiltable plate 188 by bracket 193.

As shown in FIG. 9, the pivotal connection of the boom 182 to the vertical cylinder 192 may be seen. It may also be noted that the extension of boom 182 may be done manually or by hydraulic, electric, pneumatic, or other operating means.

Figure 10:
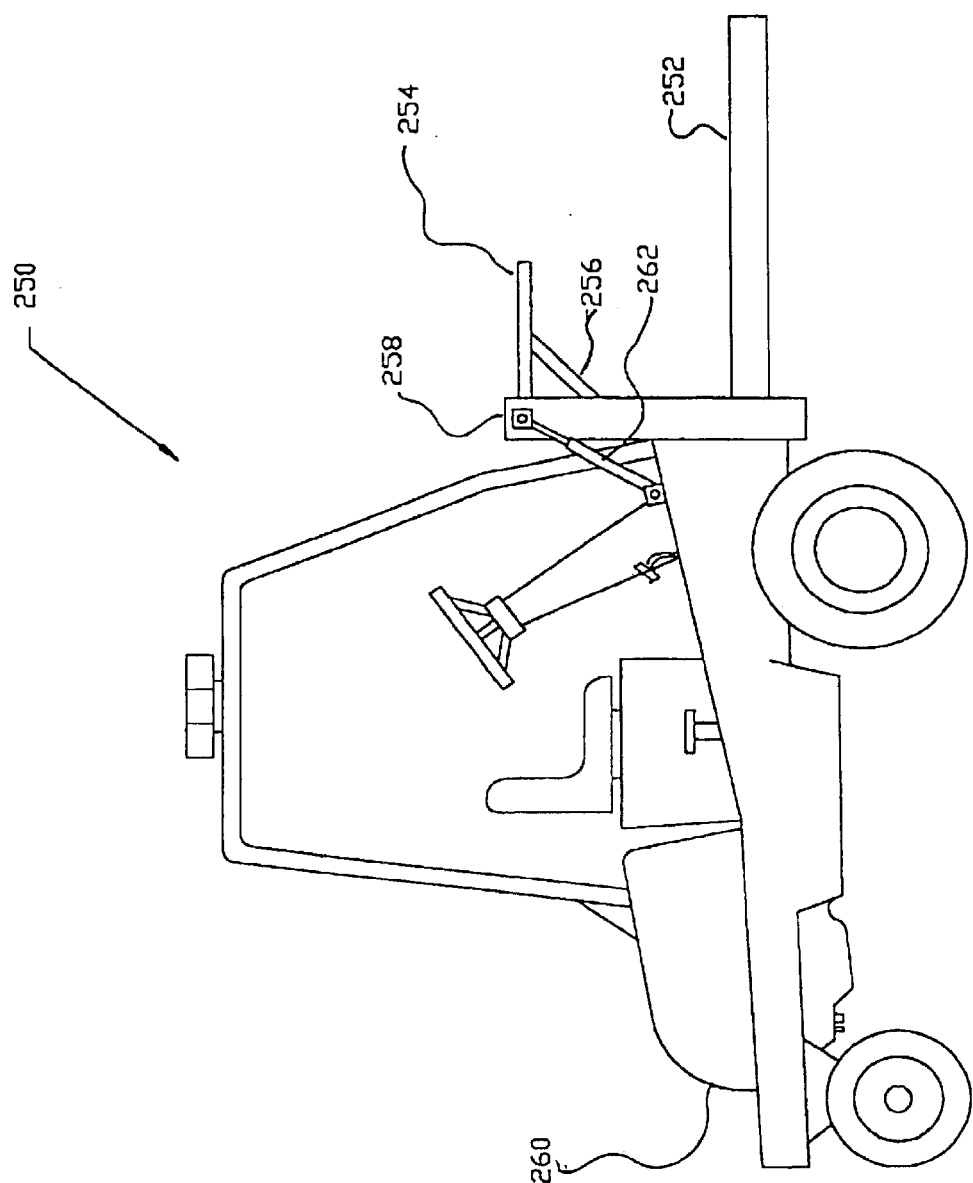
FIG. 10 is a side view illustration of a shopping cart collection vehicle in accordance with another embodiment of the present invention.

With reference to FIG. 10 of the drawings, another embodiment of the vehicle collection system designated 250 may be seen. In this embodiment, boom 252 is not extendable and is in a fixed relation to self-propelled vehicle 260. Side support rails 254, supporting bracket 256, and supporting frame 258 are also in a fixed relation to each other and the boom 252. By fixing the relation of the boom 252 and side support rails 254 to a support frame 258, it may be appreciated that a simple and inexpensive shopping cart collection vehicle may be built. Furthermore, by fixing the relation of the extendable boom 252 and side support rails 254, it may be appreciated that a less complex and lightweight system is developed. Support frame 258 is preferably operatively attached to vehicle 260 by one or more hydraulic cylinders 262 which provide for raising and lowering of frame 258 and a resultant raising and lowering of boom 252.

Figure 11:
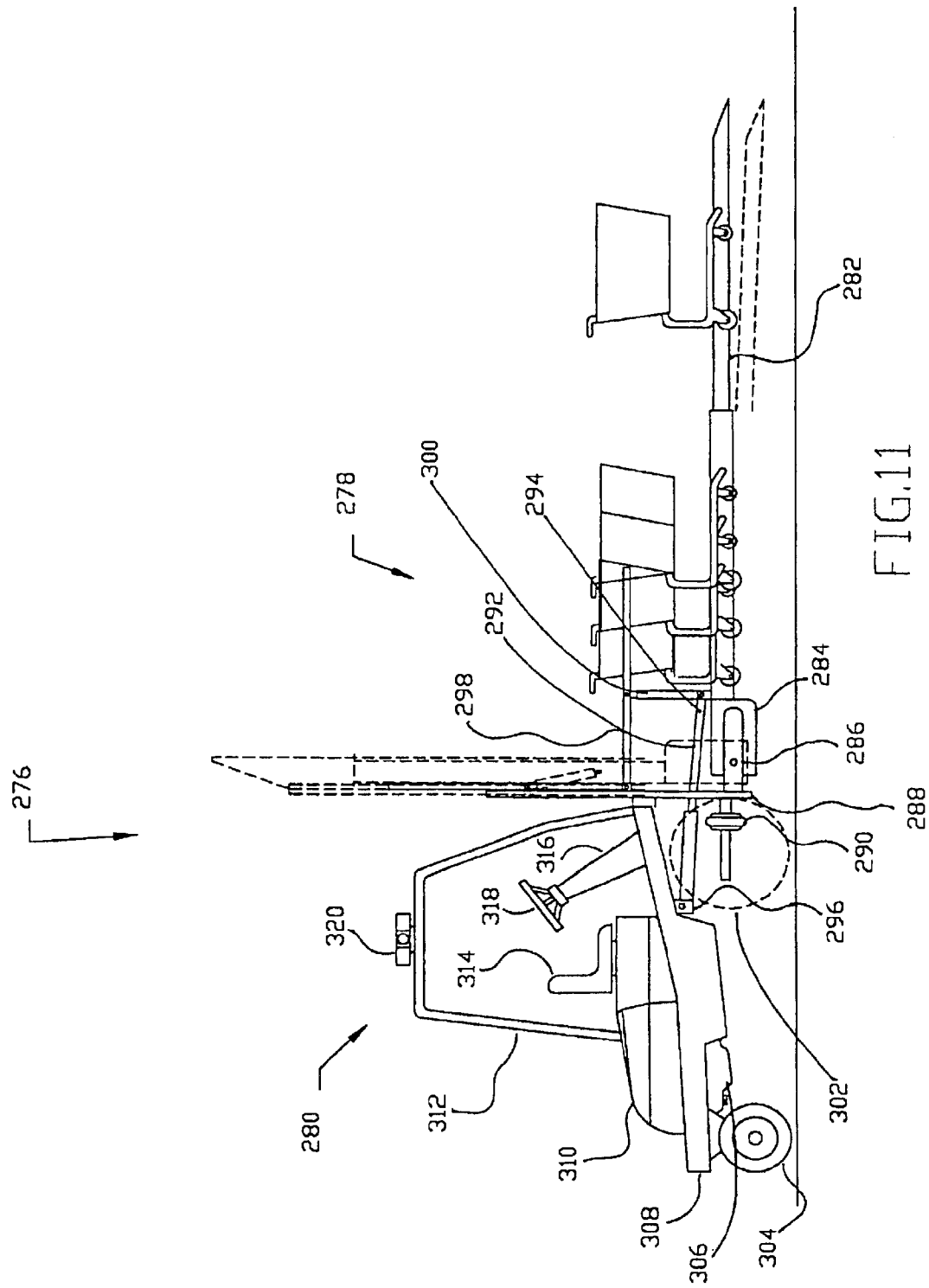
FIG. 11 is a side view representation of a shopping cart collection vehicle in accordance with another embodiment of the present invention.

FIG. 11 shows a side representation of a shopping cart collection vehicle 276, in accordance with another embodiment of the present invention. The shopping cart collection vehicle 276 includes a collection system 278 and a self-propelled vehicle 280.

The collection system 278 has an extendable and articulated boom 282 attached through pivot plates 284 to a pivot point 286. The pivot point 286 is fixably attached to mounting plate 288 which is attached to frame 308 of the self-propelled vehicle 280. Note that an allowance is made in the plate 288 for cylinder 292 and extension drive system 290 for the extendable boom 282.

The extendable boom 282 is raised and lowered about its pivot points 286 in relation to the mounting plate 288 by cylinder 292. The extendable boom 282 may be dropped to ground level or may be raised to a vertical position. The movement of the extendable boom 282 is effectuated by cylinder 292 which is connected to the extendable boom at a mounting bracket 294 and to the vehicle at a vehicle mounting bracket 296. This attachment method allows for the raising and lowering of the end of the extendable boom 282 by the extension and retraction of the hydraulic cylinder 292.

In addition, side support rails 298 are pivotally mounted to the support plate 288 and are fixably located in relation to the extendable boom 282 by means of vertical cross bar 300. Note that the vertical cross bar 300 is extendable and retractable in order to allow the extendable boom 282 and side rails 298 to go into a vertical location.

The mounting frame 288 is attached to the self-propelled vehicle 280. Self-propelled vehicle 280 includes front wheels 302, and rear wheels or wheel 304 operably mounted to a driving system 306. The front wheels 302, rear wheels 304 and drive system 306 are supported on vehicle frame 308. Vehicle frame 308 also supports a body 310 and roll cage 312. Located within the roll cage 312 are driver's seat 314, steering shaft support column 316 and steering wheel 318. Located on an upper portion of the protective cage 312 is a lighting system 320.

Figure 12:
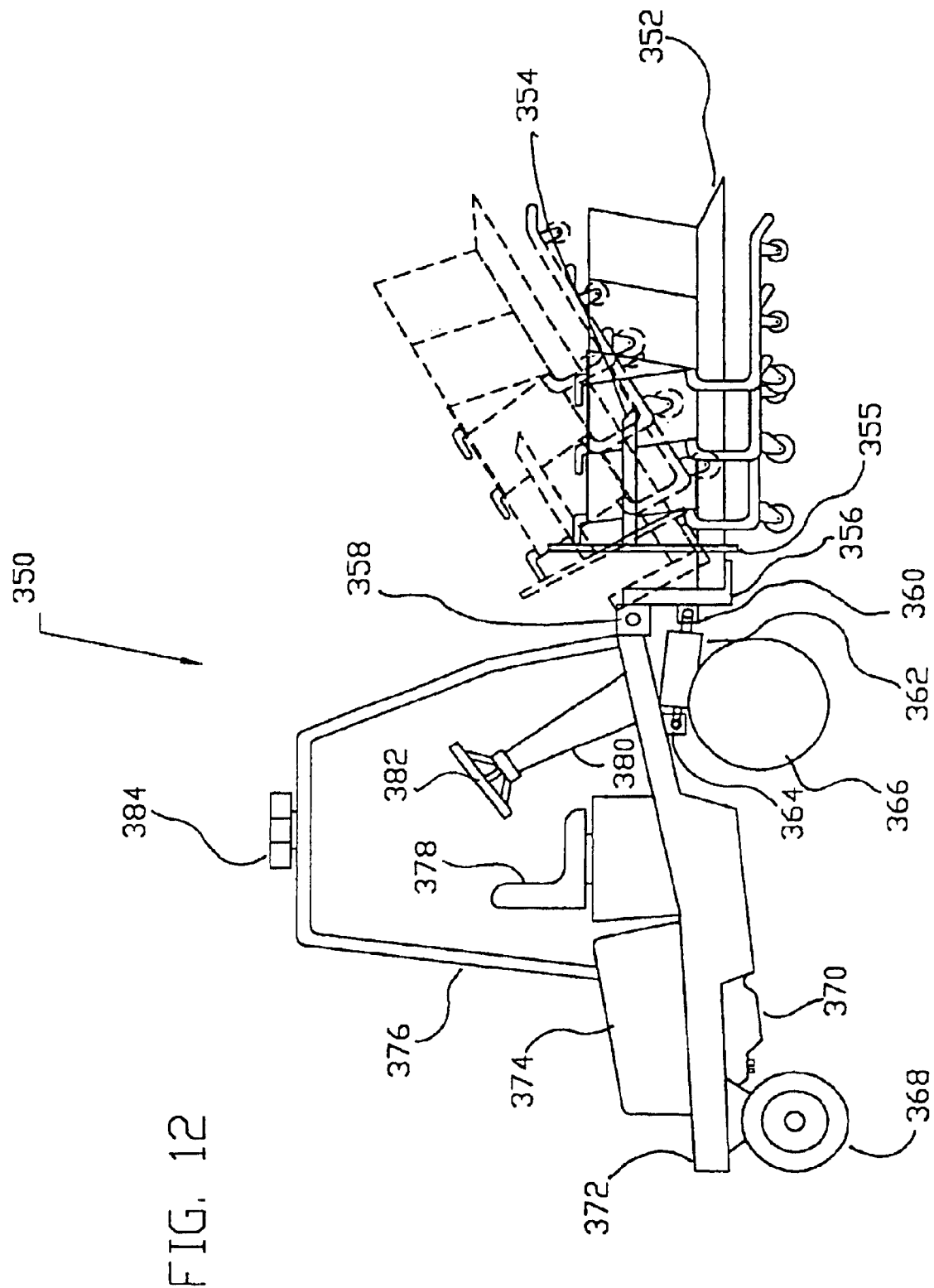
FIGS. 12 and 13 are respective side and top view illustrations of a shopping cart collection vehicle in accordance with still another embodiment of the present invention.
Figure 13:
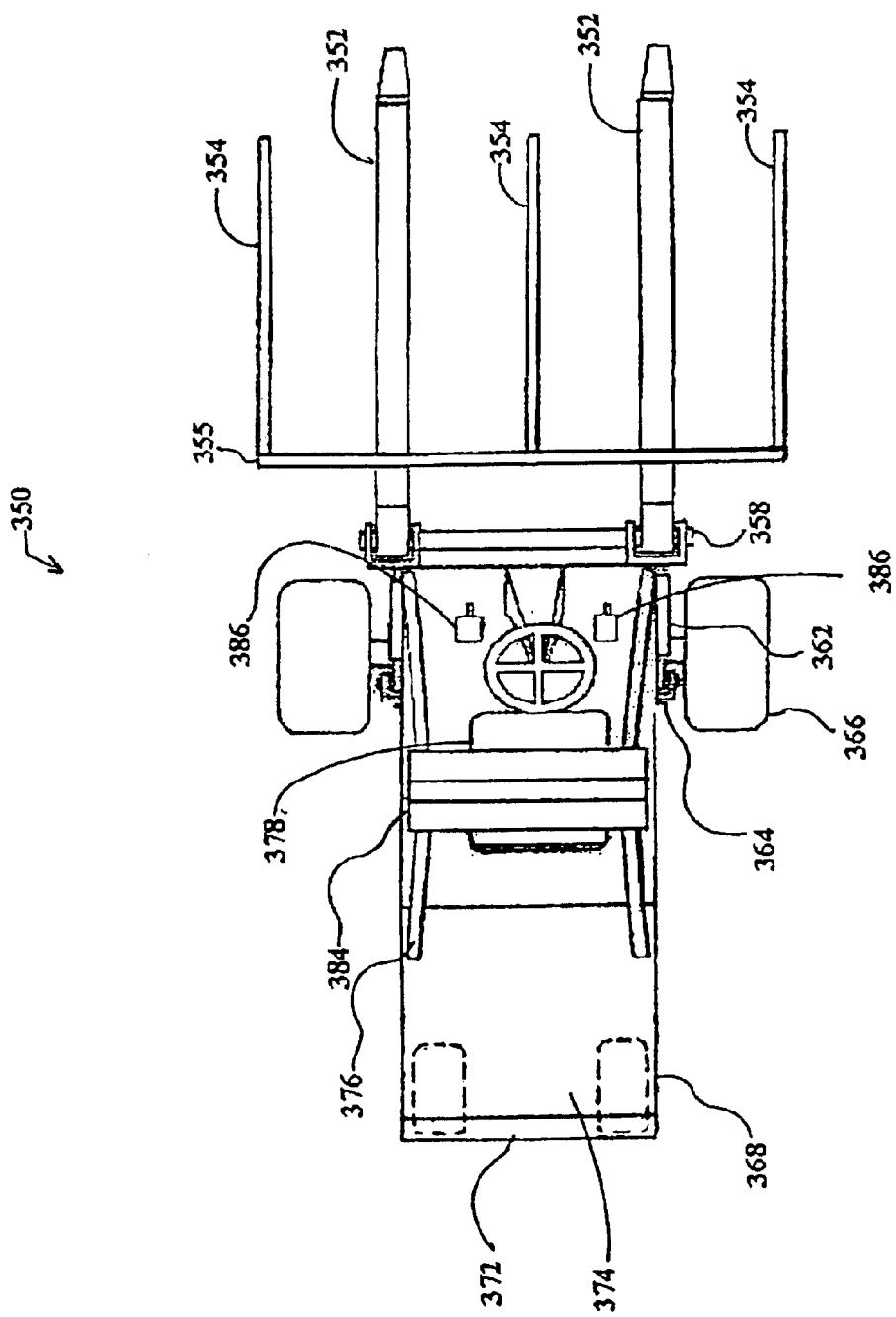

With reference to FIGS. 12 and 13 of the drawings, another exemplary embodiment of the shopping cart collection vehicle is generally designated by the numeral 350. In this embodiment of the invention, support booms 352 support a vertical stock frame 355 and side support rails 354. The nonextendable booms 352 are attached to respective tiltable plates 356. The tiltable plate 356 is hingably connected through a pivot point 358 to self-propelled vehicle frame 372.

The nonextendable booms 352 are tilted by the extension and retraction of hydraulic cylinders 362. Each of the hydraulic cylinders 362 is connected to a plate 356 by a cylinder mounting bracket 360. Each hydraulic cylinder 362 is also connected to the vehicle frame 372 by a vehicle support bracket 364. The tilting action of the booms 352 is performed by the extension of the hydraulic cylinder 362 and thus extends one side of a triangle formed by the hydraulic cylinders 362, vehicle frame 372, and the mounting plates 356. The extension of one side of this triangle is allowed by the pivotable connections at the cylinder connecting points 360 and the frame connection points 358.

The vehicle is supported from the ground by front wheels 366 and rear wheel or wheels 368. Although wheels are shown, tracks or other methods of supporting the vehicle are anticipated. In the shown embodiment, the vehicle wheels or wheel 368 are driven by a drive system 370 which is supported by vehicle frame 372.

The vehicle frame 372 also support a body 374, protective roll cage 376 and a steering support column 380. Located within the protective cage 376 are a driver seat 378, the supporting column 380, and a steering wheel 382. Located on the upper portion of the protective cage 376 is a lighting system 384.

With reference to FIG. 13 of the drawings, note that the top view shown in FIG. 13 shows that there are multiple booms 352 supporting side support rails 354 and frame 355. In addition to the items discussed in FIG. 12, also shown in FIG. 13 are various operator controls 386 for the vehicle system 350.

In accordance with the embodiment of at least FIGS. 12 and 13 of the drawings, the vehicle moves one or two relatively short stacks of shopping carts. The present invention eliminates the need to manually move long trains of shopping carts in a parking lot.

In accordance with one example of the collection vehicle 350 of FIGS. 12 and 13, the vehicle has an overall length of about 90 inches, the collection system 352 has an overall length of about 72 inches, the vehicle has an overall height of about 76 inches, a wheel width of about 46½ inches, and a wheel length of about 86 inches. The booms 352 can range in length from about 5–10 feet. The longer the boom, the more counterweight that should be added in the rear of the vehicle to balance the vehicle when the booms are fully loaded.

Figure 14:
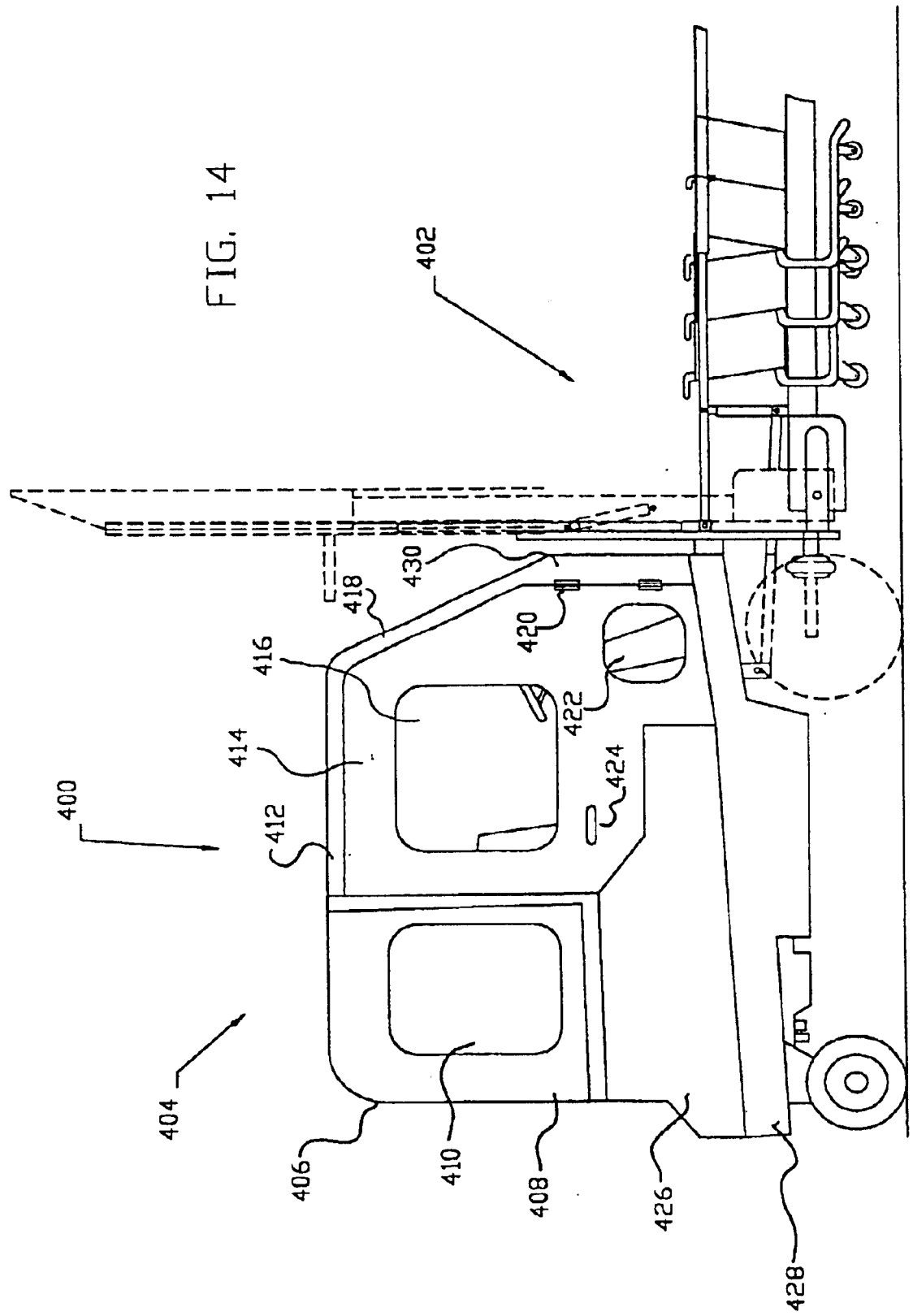
FIGS. 14 and 15 are respective side view representations of shopping cart collection vehicles in accordance with different embodiments of the present invention, each having a modified operator cover.

Another embodiment of the present invention is shown in FIG. 14. FIG. 14 discloses a side view of a shopping cart collection vehicle 400. Vehicle 400 includes a shopping cart collection system 402 and a self-propelled vehicle 404. The self-propelled vehicle 404 in this particular embodiment contains a vehicle protective cover 406.

The vehicle protective cover 406 is mounted on vehicle frame 428. The vehicle protective cover 406 includes a rear protective area 408 and rear windows 410. Over the operator's area the protective cover includes a roof 412 and a windshield 418. The side doors 414 of the protective cover 406 include a side window 416, a lower side window 422, door handle 424 and they also include locks for locking the protective cover 406. The side doors 414 are hingably mounted by hinges 420 to the cover front 430. The shopping cart collection system 402 is similar to ones previously discussed.

Figure 15:
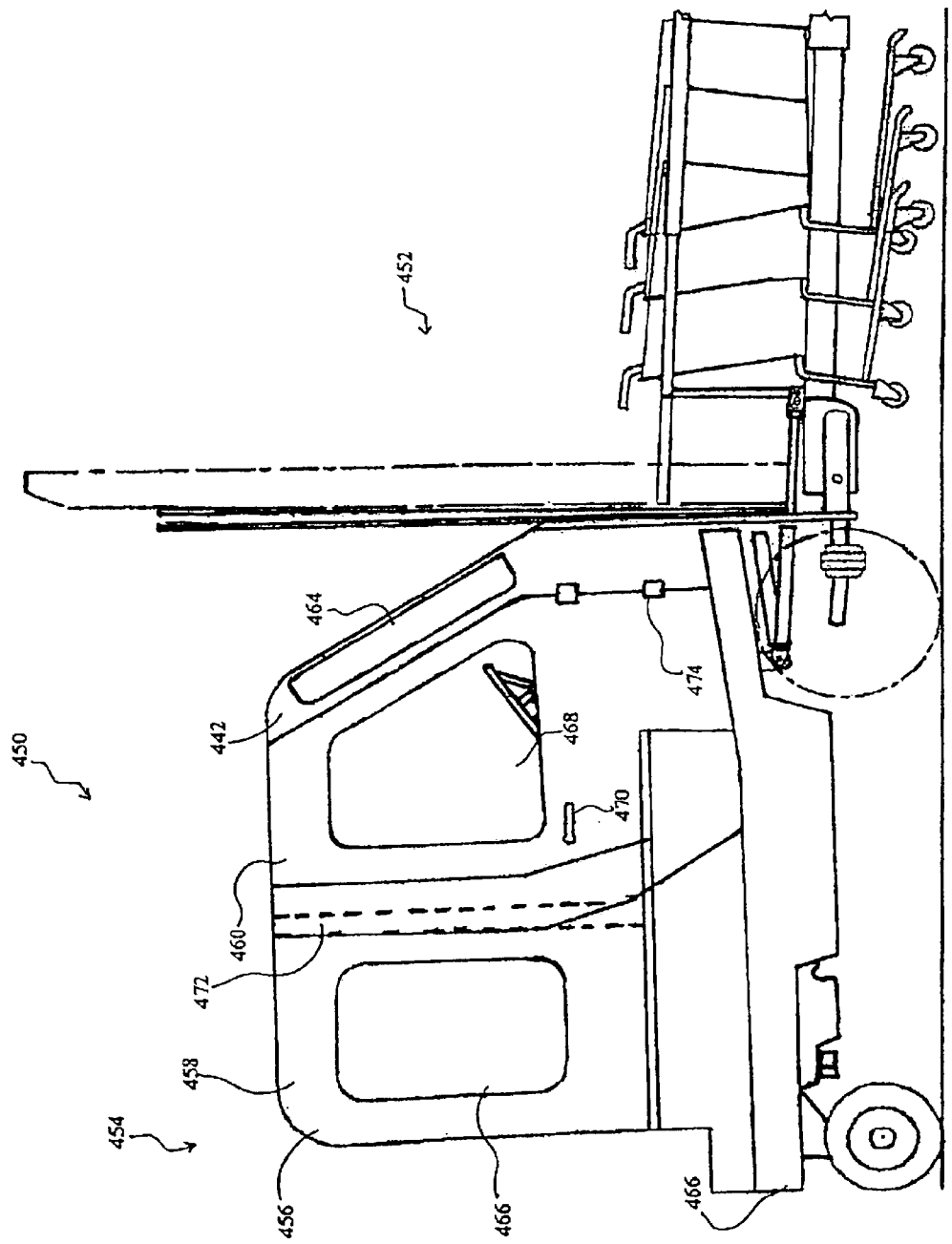

With respect to FIG. 15 of the drawings, another embodiment of a collection vehicle is referenced generally by the numeral 450. The collection vehicle 450 includes a shopping cart collection system 452 and a self-propelled vehicle 454. The self-propelled vehicle 454 includes a protective cover 456. The protective cover 456 is mounted on vehicle frame 466.

The protective cover 456 includes a rear protective area 458, side doors 460, front protective area 442, front windshield 464, rear windows 466, side windows 468, and a side door handle 470. Note that hinges 474 are shown on the doors 460. As shown in dashed lines the vehicle still contains a protective cage 472. The shopping cart collection system 452 may be any of the types disclosed herein.

With reference to FIG. 16 of the drawings, an extendable ram 502 is shown hingably connected to a frame 504. The frame 504 also supports side rails 506 by hingable connections 512. Side rails 506 are supported or connected to each other by a cross member or brace 508. Side rails 506 are connected through a hinged extension shaft 510 to the extendable ram 502. Through the connection of the extendable shaft 510 and crossbrace 508, the raising and lowering of the ram 502 also raises and lowers the side support rails 506.

The extension and retraction of the end of boom or ram 502 is effectuated by a screw drive system. The screw drive system has a support point 514, an internal screw shaft 516, an external screw shaft 518, and a power transfer case 520. By rotating the internal shaft 516 against the external shaft 518 the internal shaft 516 extends and retracts in comparison to the external shaft 518.

Power for the rotation of shaft 516 against shaft 518 is provided by the drive system 520. Drive system 520 is powered by a drive shaft 522 through a U-coupling 524 though a slip shaft coupling 526 and back to a power take off from the self-propelled vehicle.

Raising and lowering of the extendable ram 502 is effectuated by hydraulic cylinder 530. Hydraulic cylinder 530 is pivotally connected to extendable ram 502 by hinge point 528. Hydraulic cylinder 530 is also hingably connected to vehicle frame 534 by vehicle connection point 532. The extension and retraction of the hydraulic cylinder 530 lowers and raises the end of the ram 502.

The end of ram 502 has cart retaining bumps 536 designed to retard the shopping carts from slipping off the end of the ram 502 while being transported. When the end of ram 502 is sufficiently lowered, the bumps 536 will be beneath the level of the shopping cart and the ram may be retracted from the shopping cart or carts.

The side support rails 506 may be extended through extenders or sleeves 538 and 541. The connection between the side support rails 506 and the extenders 538 and 541 may be done by any number of means including the shown connecting pins 540.

With reference to FIGS. 17–20 of the drawings, a shopping cart collection system, unit, device, or adapter 550 is shown mounted on a conventional forklift 552. The shopping cart collection system 550 includes a bottom support boom 554 and may include top or side support rails 556. Bottom support boom 554 and side support rails 556 are mountable to the forklift 552 in place of forks in a standard operating manner. In this way the extending boom or ram 554 and side support rails 556 are interchangeable with standard forklift forks. This allows the use of the forklift 552 for both a forklift and as a shopping cart collection vehicle.

The shopping cart collection system 550 is raised and lowered by a standard forklift operating mechanism. The shopping cart collection system is also tiltable by standard forklift operating systems. In this manner known forklift systems, operations, controls, and design may be used to effectuate a shopping cart collection system. Furthermore, the use of standard forklift controls or operations allows for reduced operator training.

Figure 18:
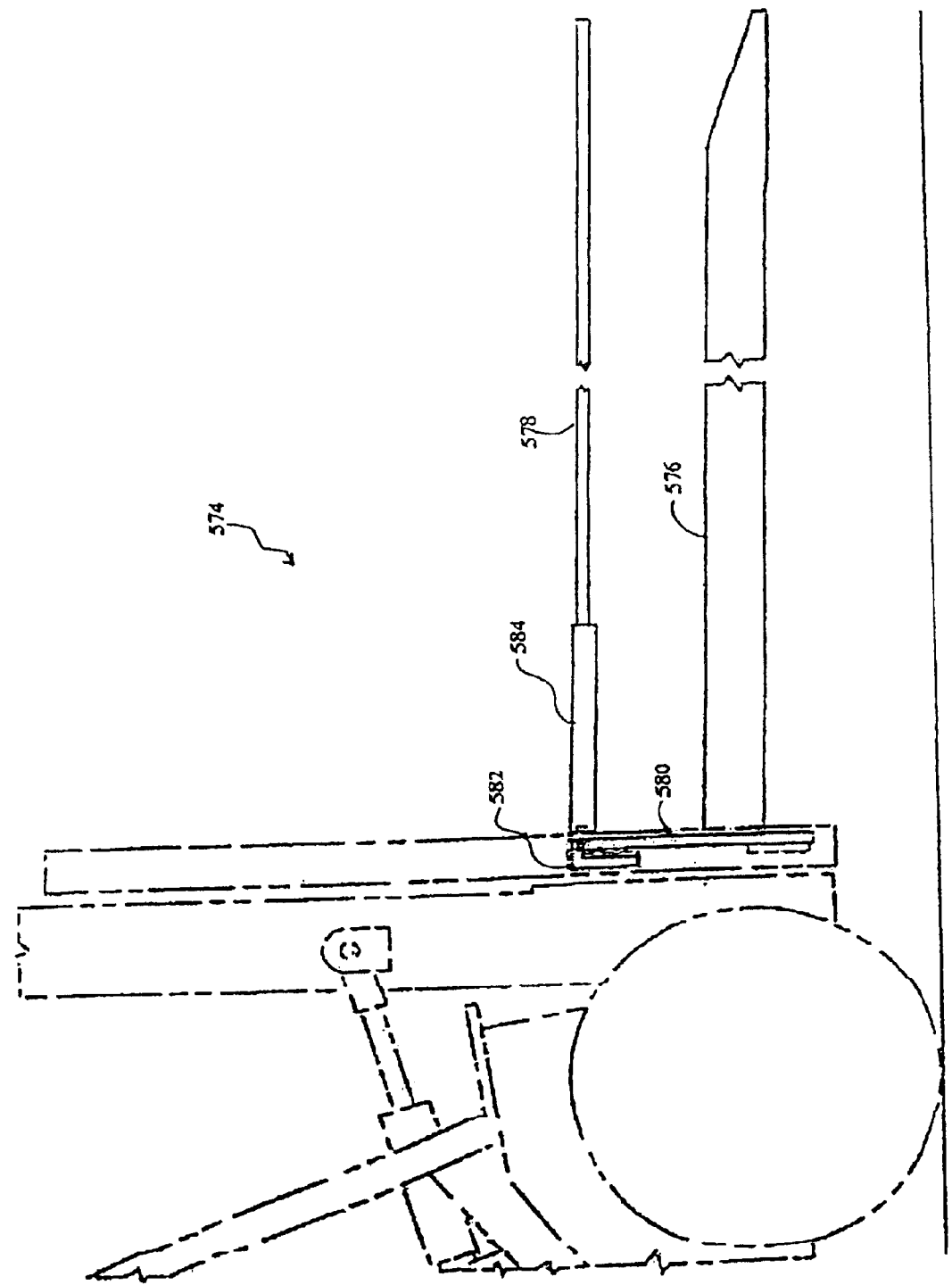

As shown in FIG. 18 of the drawings, the shopping cart collection system 550 is shown. The supporting boom 554 and side support rails 556 are mounted to a frame or plate 580 which is adaptable to be operated with a standard forklift hook type connection 582. The side support rails 578 are attached to the frame 580 so they may be positioned in different width locations for different sized shopping carts. Side support rails 556 are supported by side support rail brackets 584.

Figure 19:
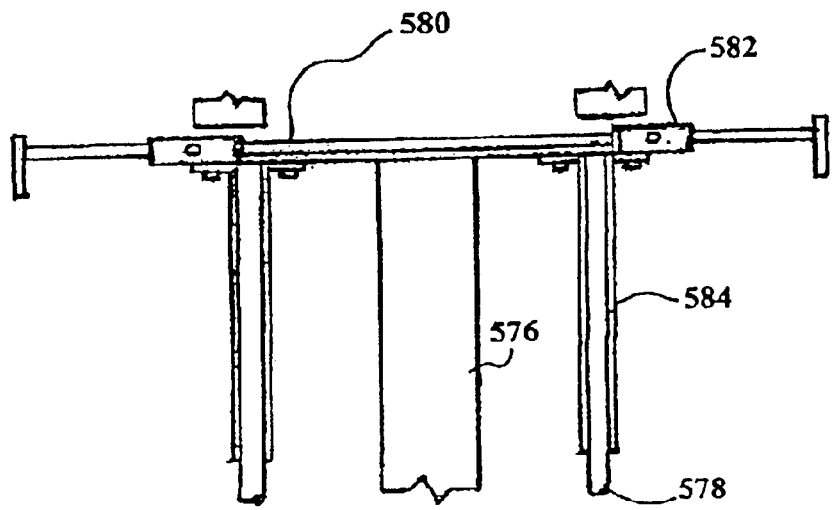

With reference to FIG. 19 of the drawings, a top view of the shopping cart collection system 550 is shown. In this figure it is easily seen that the side support rails 556 fit within the side support brackets 584 for connection to the frame 580 by bolts 581 or other means. The extending boom 554 can also be seen as attached to the frame 580. The hook type connections 582 are shown coming off of the back of the frame 580 for connection to the forklift forkbar 583.

Figure 17:
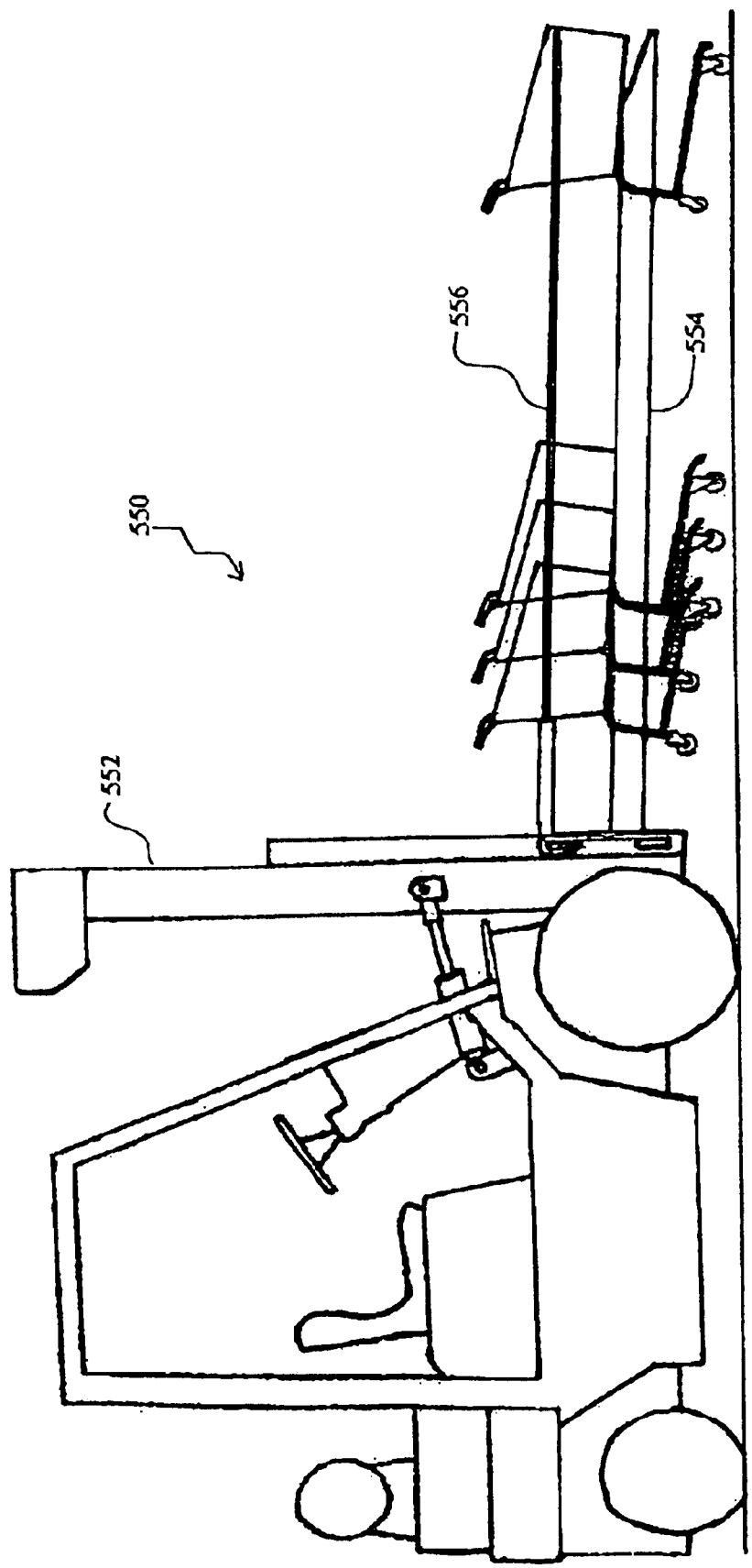
Figure 20:
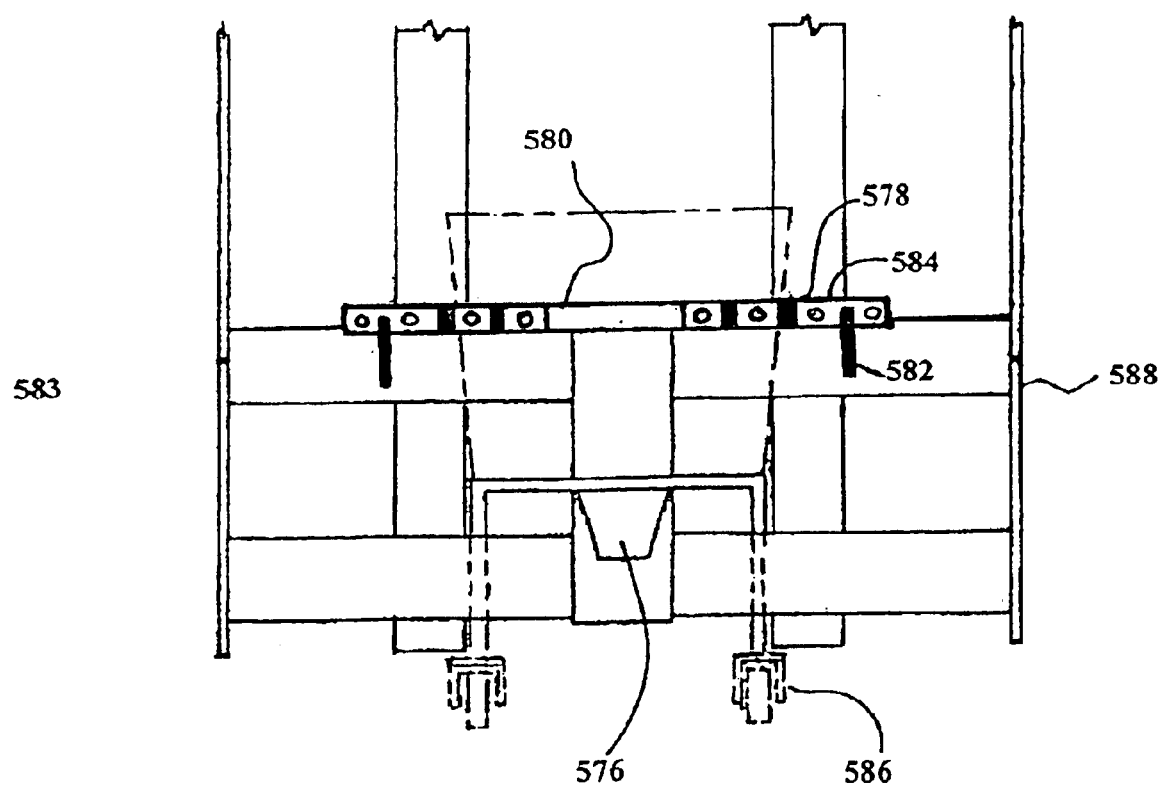

FIG. 20 shows a front view of the same system as shown in FIGS. 17, 18 and 19. In FIG. 20 it can be seen that the frame 580 has multiple attachment points for the side support arms 556 and the side support arm brackets 584. Also shown is the vertical component of the frame 580 which supports the extending boom 554. The extending boom 554 and side support rails 556 help to support, stabilize and allow for the transportation of the shopping carts 586. Also shown is the easy connection of the entire system 550 into the forklift system 580 by means of the supporting frame 588 through the use of the hook type connections 582.

With respect to FIG. 21 of the drawings, another embodiment of the shopping cart collection vehicle is generally designated by the numeral 600. This vehicle 600 includes of a shopping cart collection system 601 and a transportation system 602.

The shopping cart collection system, adapter or attachment 601 has a back frame 603, top rail or side rails 604 and cart supporting boom 606. The boom 606 is a lightweight yet sturdy metal shaft or hollow metal member of fixed length and adapted to support a number of shopping carts thereon. In accordance with one example, the boom 606 is a hollow stainless steel or aluminum shaft or pipe about 5 to 15 feet in length and at least 2 inches in diameter. The top rail or spaced side rails 604 are made of a lighter smaller metal shaft or pipe and are used to keep the first few carts collected on the boom 606 in a substantially upright position. Additional carts are nested with the carts already on the boom below a top rail or between side rails 604 and consequently remain upright.

Depending on the size of carts being collected, transported, and/or stored by the vehicle 600, the top or side rails are located and spaced to either ride along the upper sides of the cart or on the top (or handle) of the cart near each side thereof.

Although it is preferred to use a single central cart collection boom having a circular, oval, rectangular, square, trapezoidal, or inverted triangular cross-section (preferably with rounded corners), it is contemplated that spaced booms may be used especially with heavy, wide, large shopping carts. The top rail or side rails 604 are mounted to the frame 603 and supported by a supporting arm 605. The entire shopping cart collection system 601 is releasably mountable on a conventional forklift 602 through use of spaced mounting arms 608 and locking pins 610. The shopping cart collection system 601 can be mounted on a fork bar of a standard forklift-style lifting frame assembly or unit 612 and raised and lowered.

Also shown mounted on a fork bar 615 the frame 612 are the conventional forklift forks 616 each with a connecting arm 614.

The entire frame 612 and collecting system 601 or in the alternative forklift forks 616, are operatively connected to the transportation system 602 through upper and lower pairs of hydraulic cylinders 618 and 620. The cylinders are connected to the transportation system 602 by a mounting frame 622. The frame 622 is an integral part of the transportation system 602.

The transportation system 602 includes front wheels 624 and a rear steerable drive wheel 626 mounted on the bottom of a frame or body 628 of the transportation system 602.

Standard items or components are also shown on the transportation system 602. Included are a gas or fuel tank 630, a driver's seat 632, operator controls 634, steering wheel 636, and steering wheel support arm 638.

With respect to FIG. 22 of the drawings an extendable shopping cart collection system, adapter, or attachment is generally designated by the numeral 640. This collection system 640 is notable by its manually or automatically extendable central boom 642 which is mounted to a supporting frame 646. The supporting frame 646 also supports spaced top or side rails 644. This extendable system 640 also includes spaced mounting arms 650 and locking pins 648.

With respect to FIG. 23 of the drawings, a top view of the shopping cart collection system 640 shows the extendable boom 642, side rails 644, mounting arms 650, locking pins 648, and supporting frame 646. FIG. 23A is a front view of collection system 640.

With respect to FIG. 24 of the drawings, the left side view of the shopping cart collection system 640 is shown. This is the opposite side of the shopping cart collection system of FIG. 22 and shows the lower support boom 642, top or side rails 644, mounted to the frame 646, with an additional support member 605. In addition this view shows the mounting arms 650, locking pins 648, and supply wires or hoses 652 for the extendable boom 642.

The extendable boom 642 is either manually extendable and includes telescoping members or shafts (see FIG. 25) and releasable locking elements such as pins, nubs, spring-loaded balls, etc. or automatically extendable via electric, hydraulic or pneumatic drives or cylinders. For example, as shown in FIG. 24 extendable boom 642 has feed wires or hoses to extend and retract the boom from about 5 to 6 feet to about 10 to 15 feet in overall length. This is accomplished by either using an electric screw drive, hydraulic cylinder, pneumatic cylinder, or the like as boom 642 or within boom 642. Since the extension and retraction of the boom is not under great load, little force is necessary to extend the boom.

With respect to FIG. 25 of the drawings and another embodiment of the invention, a manually extendable and retracted shopping cart collection system is designated by the numeral 676. In this embodiment, a boom cover or outer boom sleeve or member 678 is shown slidably mounted on an inner boom member 679 forming an extendable boom 680. The boom cover 678 is selectively locked to the inner boom member 679 by the locking pin 682. Locking pin 682 extends through an extended locking position hole 683 to lock the boom cover 678 in position while extended. A retracted mounting hole 684 is used when the boom is in the retracted position so that the locking pin 682 holds the boom cover 678 in the proper retracted position. The boom extension cover 678 may also be provided with upstanding ridges, bumps or nubs 686 to hold the last shopping cart in place while located on the end of boom 680.

The manually extendable boom 680 is attached to base pivot plates 688 pivotally attached to pin support arms 692 by mounting pins 690. The pin support arms 692 are secured to a support plate or frame 694.

Also mounted to the support frame 694 is a pivotal mounting 696 for cart side support rails 698. The side support rails 698 are also supported by side support rail rests or supports 700 and are guided relative to the boom 680 by passive guiding cylinder or telescoping members 702. The side support rails 698 are manually extended by extending outer rail members or sleeves 704 and 708 which are held in place by locking pins 706 and 710. Outer rail members 708 of each rail 698 are connected by a cross support or brace 712. When the boom 680 and rails 698 are to be raised to a vertical out of the way, vehicle shortening position, the vehicle operator retracts the boom and rails (removes the pins, slides outer members over inner members, and reinserts the pins), and then pushes the boom upwards so that it pivots about pins 690 to a vertical or over vertical position against plate or frame 694. The boom contacts cross support 712 and causes the side rails to be passively lifted with the boom. Once in its vertical position, the boom and rails can be temporarily locked in the vertical position with a length of chain or cable attached to plate 694.

When the vehicle is not being used to collect, transport or store shopping carts, the boom 680 may be lifted manually around pivot point 690 to a vertical, vehicle driving position. The side support rails 698 are pivoted around their mounting points 696 and follow the boom 702 to a similar vertical position. In this manner the wheel base of the shopping cart collection vehicle is reduced for maneuverability and safety purposes.

With respect to FIG. 26 of the drawing, the cross-section of the boom 680 of FIG. 25 is shown. The boom cover 678 slides over the inner support boom 679 and is held in place by locking pin 682. The locking pin 682 may be held in position by a nut 714 or other similar methods such a spring clip, bolt, spring-loaded ball, drop pin, cotter pin, weld spot, chain, or the like. Note the general trapezoidal shape of the outer cover 678 and inner supporting boom member 679. This shape is useful because it allows a wide flat upper support plate for supporting the lower surface of the cage or basket of the shopping carts. Also, the inward bevel of the sides of the boom 680 provide a space for locking pin 682 within the overall square framework that would fit through a shopping cart. Note that this overall shape and the use of hollow members also reduces the amount of material and weight that has to be supported by the shopping cart collection system due to the smaller size of the bottom while maintaining strength and integrity. Although this shape or cross-section is preferred, it is to be understood that other shapes and cross-sections such as rounded corners, circular, oval, triangular, and the like may be used.

Figures 27, 28:
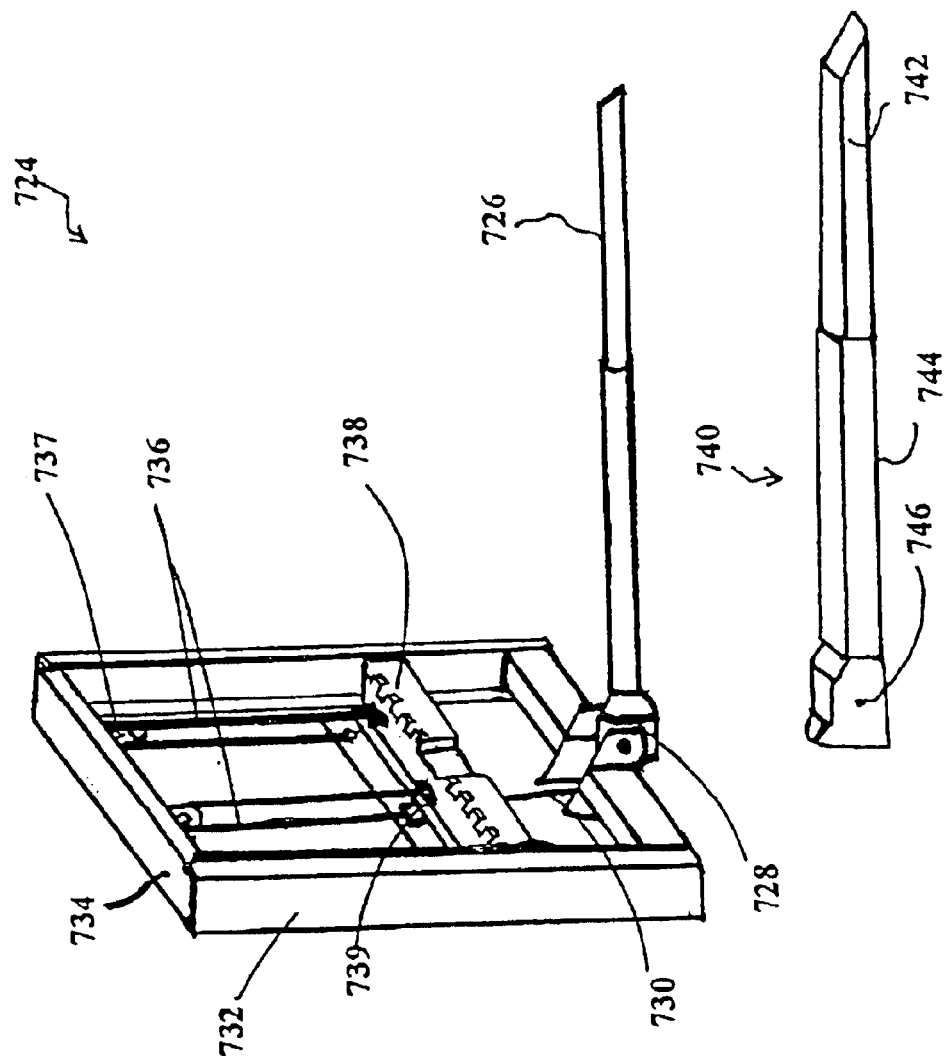
FIGS. 27–33 are directed to a shopping cart collection system, attachment, device, or adapter which is attachable to the front of a self-propelled vehicle, forklift, or the like in order to facilitate the collection, storage, and/or transport of shopping carts or similar carrier devices.

With respect to FIG. 27 of the drawings, a convertible forklift and shopping cart collection system or unit is generally designated by the numeral 724. This system 724 includes an extendable boom 726. The boom 726 is mounted through a pivotal mounting 728 to an external frame 732 of the system 724. The boom 726 is pivoted around point 728 by a hydraulic cylinder 730. In this manner, the end of the boom 726 may be retracted and then pivoted upwardly to be in a lower contact position with a cross-member of an internal frame 734. When the extendable boom 726 is in a vertical contact position with the internal frame 734, the internal frame 734 may be raised and lowered by the extension and retraction of the extendable boom 726 as seen in earlier embodiments. In this embodiment, a fork support bar 738 is not directly connected to the internal frame 734. The fork support bar 738 rides inside the internal frame 734. The fork support bar 738 is connected by cables, chains, or belts 736 through pulleys 737 to an anchor member 739 on the external frame 732. In this manner, the singular extension of the extendable boom 726 raises the internal frame 734. Raising of the internal frame 734 magnifies through the pulleys 737 the speed of lift of the fork support bar 738. Hence, the fork support bar 738 is supported and made to travel at an amplified rate in comparison to the internal frame 734.

With respect to FIG. 28 of the drawings, a boom cover 740 for the extendable boom 726 of FIG. 27 is shown. This cover 740 allows one to change the shape of the extending boom 726 to one more appropriate for each individual and separate use of the shopping cart collection system. As shown, the cover 740 changes the shape or cross-section of the extending boom 726 from a cylindrical, circular or oval shape, to a rectangular one. Alternative covers are also envisioned such as trapezoidal, triangular, larger circular shapes, or other different styles. Note that the cover includes a smaller cover 742, an outside cover 744, and a base or pivoting frame cover 746. In one example, cover 744 is in a range of about 4–10 inches wide depending on the type of carts being moved and made of a lightweight material such as aluminum.

Figure 29:
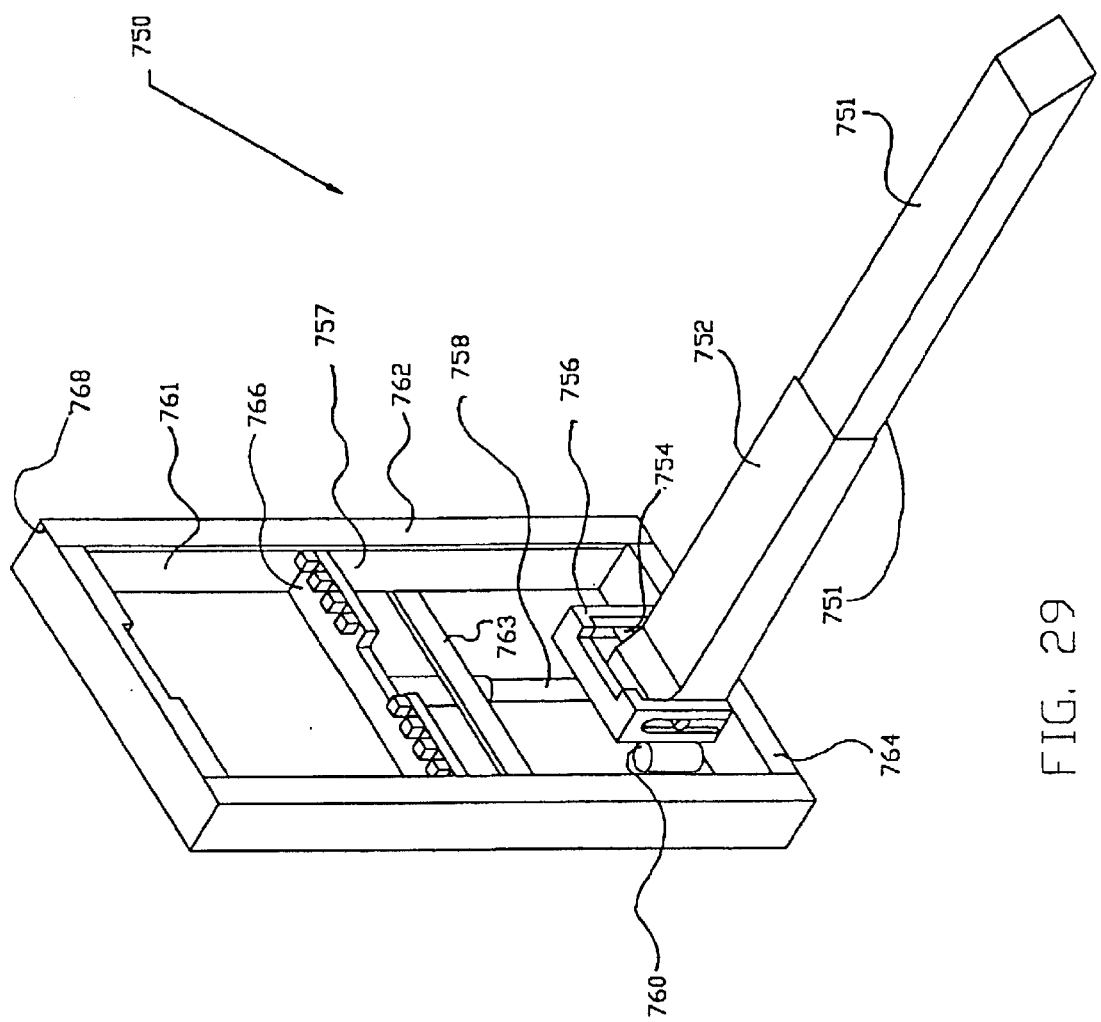

With respect to FIG. 29 of the drawings, another embodiment of a shopping cart collection system or unit 750 is shown. This system 750 includes an extendable boom 752 which is mounted by pivot pins 754 to an internal control frame 756. The pivoting and raising of the boom 752 is controlled by an off-set hydraulic cylinder 758. At the appropriate position, the hydraulic cylinder 758 extends to pivot the boom around pin 754 into an upward or lowered position. When the boom 752 is lowered by the retraction of the hydraulic cylinder 758 the boom is stopped at an angular position by angular stop 760. This angular position could be horizontal, slightly above horizontal, or below horizontal. When the hydraulic cylinder 758 has sufficiently retracted to drop boom 752 to the point where the angular stop 760 rests against the control frame 756, further retraction of the hydraulic cylinder 758 will raise substantially horizontal hydraulic boom 752 with pins 754 traveling in slots 755. The hydraulic cylinder 758 is supported near its upper end by a cross-member 763 attached to external frame 762. Cross members 766 and 768 supports internal frame 757. Additionally, top cross-member 768 receives the end of retracted boom 752. Bottom cross member 764 connects the two external side channels of the external frame 762. Crossmember 766 serves as a forklift bar adapted to receive conventional forklift forks.

Figure 30:
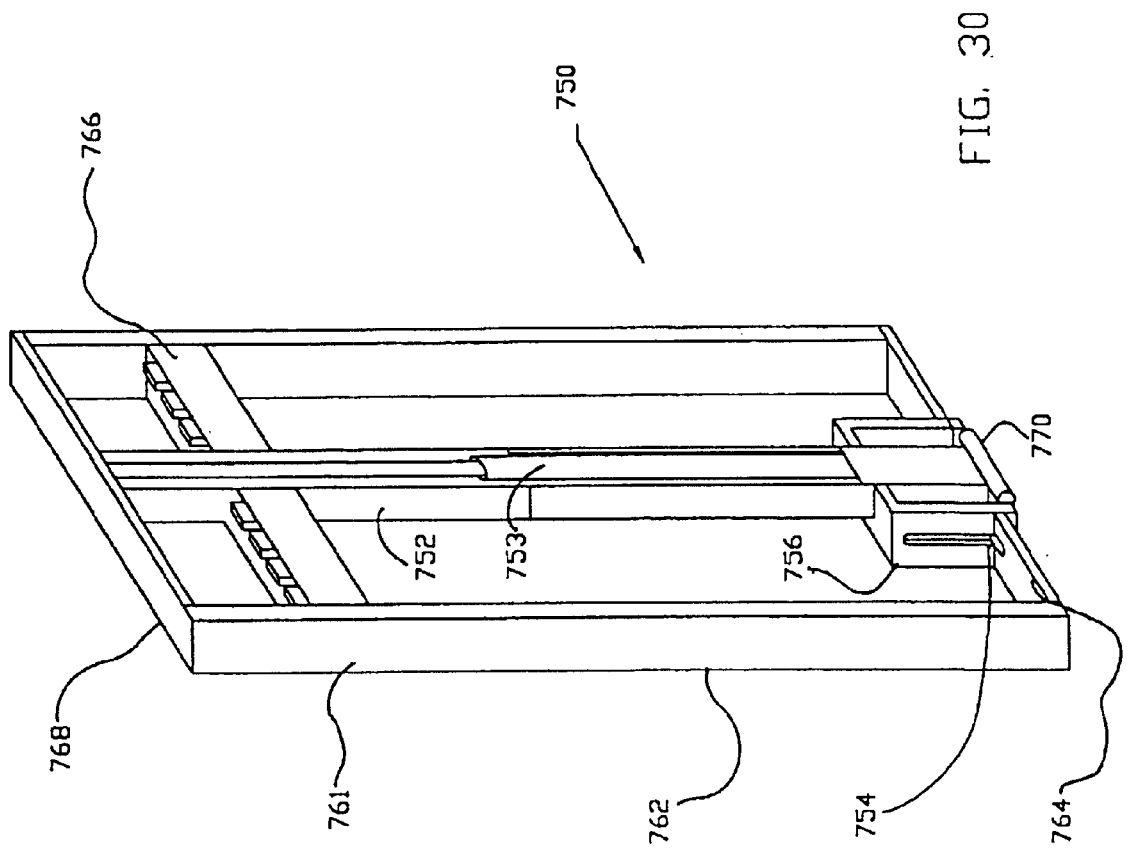

With respect to FIG. 30 of the drawings, we once again see the forklift collection system 750 of FIG. 29. Note that now we can see the bottom supporting and boom pivoting roller 770 which supports and allows movement of the boom 752. The base of the external frame assembly 764 supports the external frame 762 side rails which support the internal frame 757. The external frame member 764 supports the control frame 756 and pivot pins 754. The pivot pins 754 support the extendable boom 752 which can be seen in this embodiment includes an internal cylinder 753. The internal cylinder 753 extends and retracts with a boom cover 751 in order to raise and lower the internal frame 757, side rails 761 and forklift support bar 766.

Figure 31:
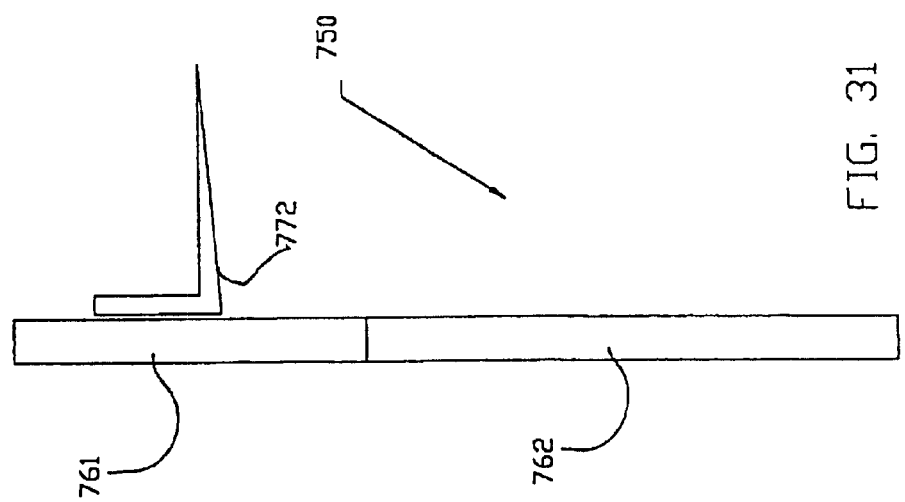

With respect to FIG. 31 of the drawings, the extension of the internal frame 761 out of the top of external frame 762 can be shown to lift forklift forks 772 upward in the air when the system 750 is being used as a forklift.

Figure 32:
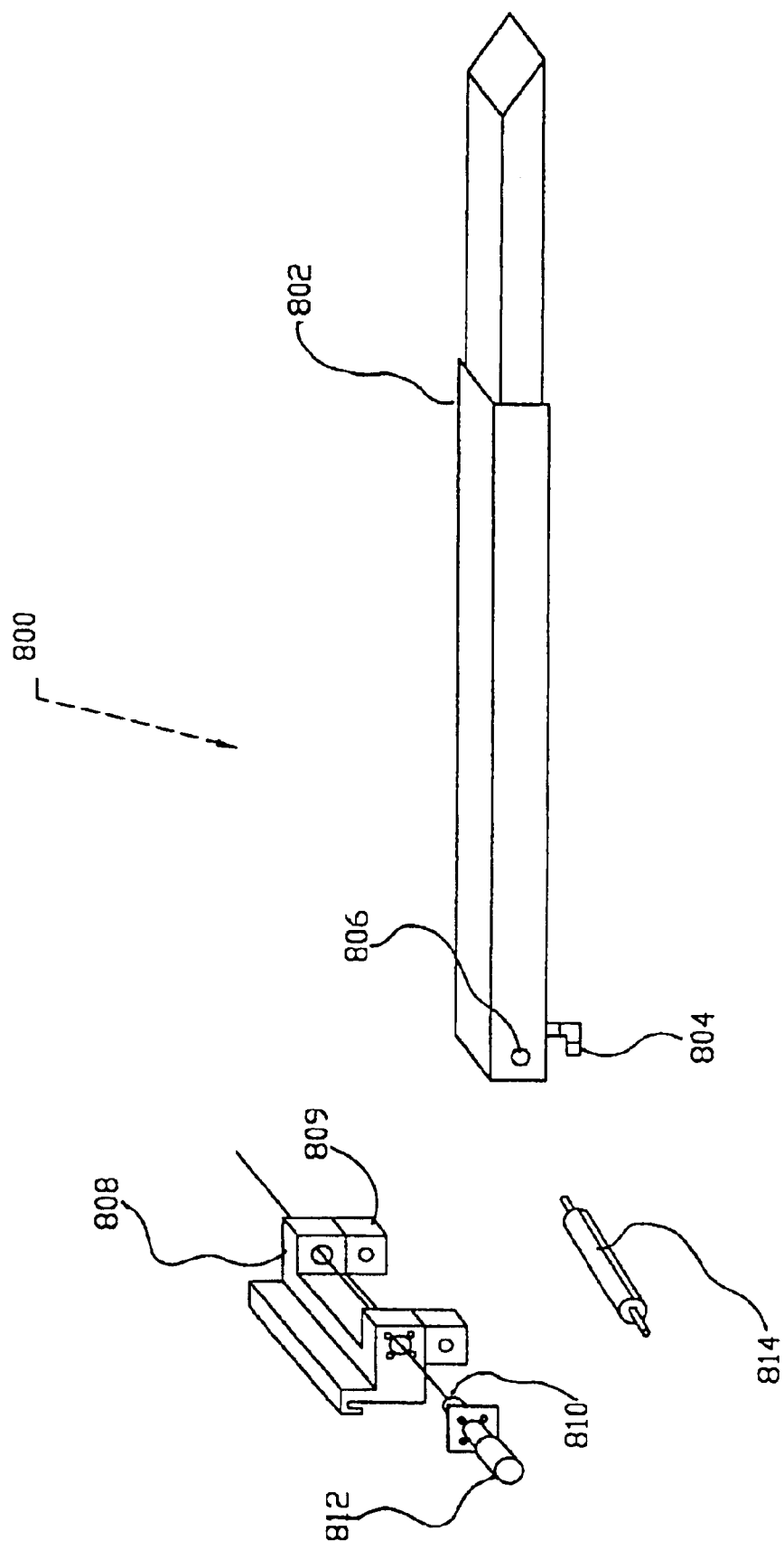

With respect to FIG. 32 of the drawings, a detailed embodiment of an extendable boom and mounting assembly 800 may be seen. The boom 802 like boom 106 of FIGS. 4-6 includes a pivotal mounting location 806 and hydraulic or electric ram connection 804 for the internal workings (cylinder, piston, or the like) of the boom 802. The pivotal mounting 806 is operatively connected to mounting frame 808 by pin and drive member 810 which are operated by a hydraulic or electric motor 812. Additionally the mounting frame 808 may include a lower adaptation 809 or bracket for a bottom roller 814 to keep from scoring the asphalt of the parking lot. Clockwise rotation of the drive shaft of motor 812 causes lowering of boom 802 while counter-clockwise rotation of the motor shaft causes raising of the boom 802. This direction of rotation depends on what side the motor is mounted.

Figure 33:
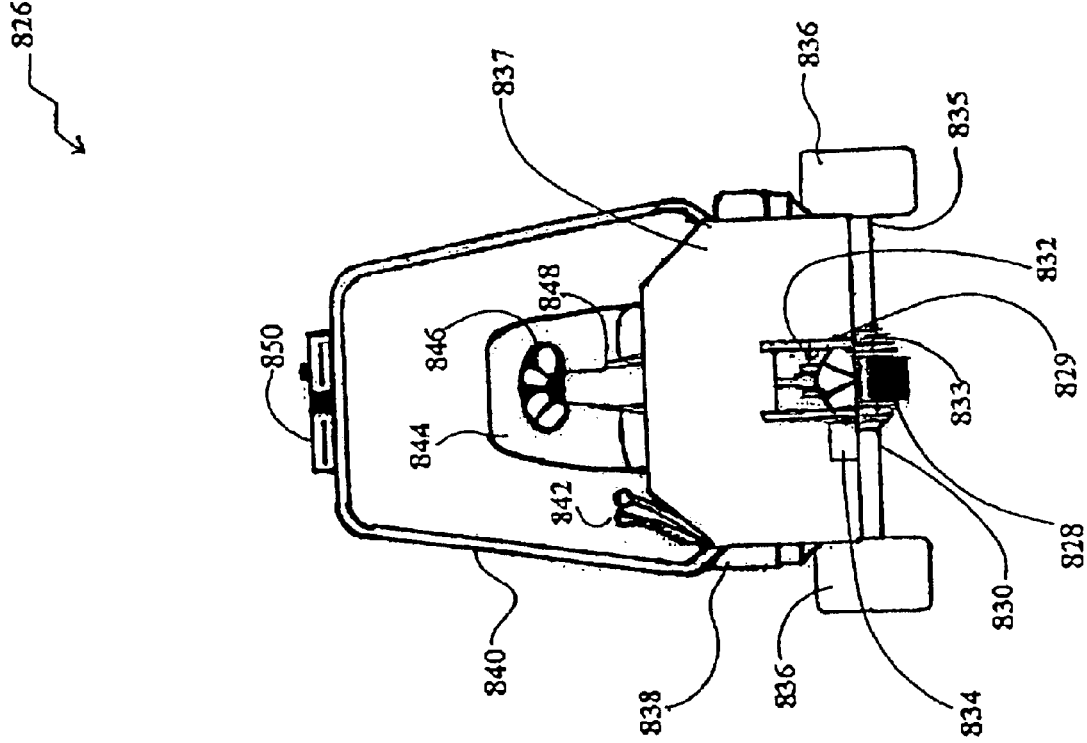

With respect to FIG. 33 of the drawings, another embodiment of a shopping cart collection vehicle and system 826 may be seen. In this embodiment, a boom 828 is mounted by a pivotal mounting pin 829 to a boom support frame 830. This embodiment shows in the alternative the hydraulic cylinder 832 or the motor 834 for lifting and lowering the boom 828. This embodiment shows wheels 836 on axles 835 extending from a vehicle frame 833. The frame 833 supports a plate 837 which supports boom support frame 830. The vehicle frame 833 also supports vehicle body 838, roll cage 840 and controls 842. Located within the roll cage 840 are a driver seat 844, a steering wheel 846 and steering wheel support column 848. Located on the upper portion of the roll cage 840 is a lighting system 850.

With respect to FIG. 33 of the drawings as well as other figures showing a self-propelled vehicle, in accordance with the present invention, it is contemplated that the vehicle may have three or more wheels with at least one wheel providing for steering and at least one wheel providing for driving and braking. In accordance with a preferred embodiment of the present invention, the vehicle has two forward idler wheels which are not driven and do not provide for steering, but merely serve as a support for supporting the weight of the vehicle as well as any shopping carts or other items on the front of the vehicle. Such as shown, for example, as wheels 836 of the vehicle 826 of FIG. 33. Also, it is preferred that the vehicle have a single or pair of rear wheels which are both driven and provide for steering. Although it is possible to have 4-wheel drive, that is all wheels driven and one or two providing steering, it is usually not necessary for 4-wheel drive on a typical parking lot. For smaller shopping cart collection vehicles, a single steerable and driven rear wheel should be sufficient. For larger shopping cart collection vehicles, a pair of driven rear steerable wheels should be provided. Although the rear wheels may be closer together than the front wheels 836, the wider the rear wheels are spaced apart, the greater the stability of the vehicle.

In accordance with some riding mowers, steering is accomplished by selectively providing drive to each of the front wheels. With such a vehicle, the rear wheels are merely follow along pivoting casters and it is each of the front wheels which, although mounted in a fixed front-to-back position, provide for steering by selectively driving each of the front wheels. For example, rotation of the right front wheel causes the vehicle to turn left, rotation of the left front wheel causes the vehicle to turn right, while rotation of both the front wheels causes the vehicle to move straight forward. Numerous and sundry vehicle driving and steering arrangements may be used in accordance with the present invention as long as the necessary control, stability, and maneuverability is provided.

Figure 34:
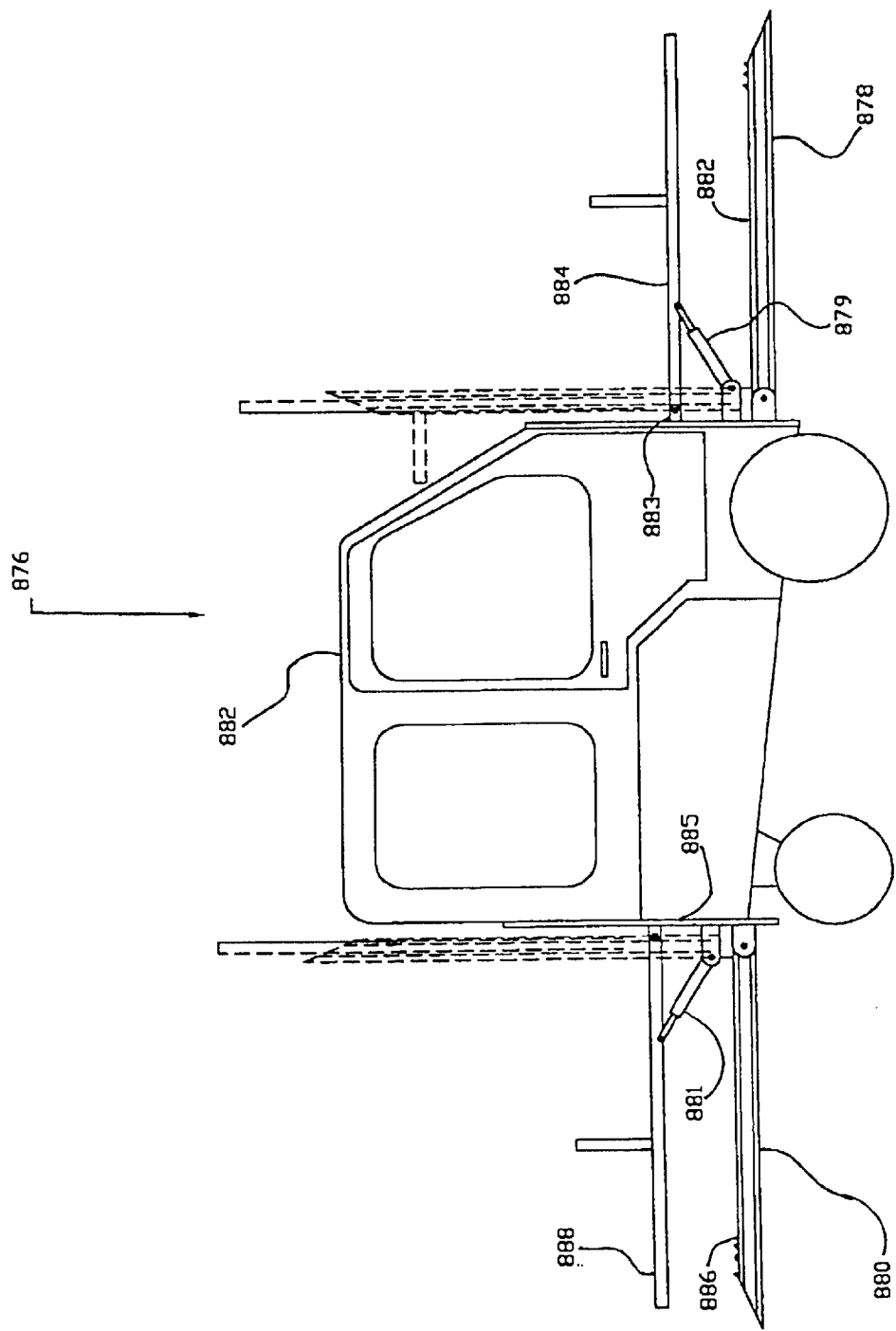
FIG. 34 is a side view representation of a shopping cart collection vehicle in accordance with still another embodiment of the present invention having front and rear articulated shopping cart collection systems.

With respect to FIG. 34 of the drawings and in accordance with another embodiment of the invention, it can be seen that a shopping cart collection vehicle 876 includes a front collection system 878 and a rear collection system 880. This particular embodiment shows the use of an enclosed body vehicle 882, which provides protection from the elements to the vehicle operator. When the collection systems 878 and/or 880 are not in use, they are raised and locked or secured in the vertical position shown in phantom.

As shown in FIG. 34 of the drawings, each of the collection systems 878 and 880 includes respective shopping cart support booms 882 and 886 and shopping cart guide rails 884 and 888. In the embodiment shown, each of the booms and rails is not extendable or retractable in length, and is manually raised and lowered from the inoperative storage vertical position to the substantially horizontal operating position. In the manual embodiment shown, each of the shopping cart guide rails 884 and 888 is guided and supported by passive telescoping members 879 and 881. Further, the system 878 is shown with a longer boom and guide rails than system 880 on the back of the vehicle. The rear system 880 can be used as an auxiliary system for use when the front system 878 is full or for use when it is difficult for some reason to maneuver the vehicle and is easier to access the carts with the rear collection system 880. Each of the front and rear collection systems 878 and 880 is supported by a backing or support plate 883 and 885 which can be raised or lowered to adjust the relative position of the booms 882 and 886 with respect to the parking lot surface or to accommodate different size shopping carts.

With respect to FIGS. 35 and 36 of the drawings, a shopping cart collection trailer is generally designated by the numeral 900. Shopping carts 902 ride up a ramp 904 and into the shopping cart trailer 900 and rest on a floor 905. The shopping cart ramp 904 is connected to a trailer frame 906. The trailer frame 906 supports floor 905 and also supports a pulling arm or tongue 908. The trailer 900 is supported off of the ground by wheels 910 connected to the frame 906. The frame 906 also includes end rails 912 and side rails 914. At the opposite end of the trailer 900, a lifting arm 916, and wheels 918 lift the trailer up into the air for transportation and lowers it for locking purposes. Lifting arm 916 operatively supports and controls trailer wheels 918 mounted on a shaft 919 such that when the arm 916 is in a lower position shown in phantom, the wheels 918 lift the trailer 900 off of the ground for transportation purposes. When the arm 916 is in its raised or upper position, a trailer locking bracket 920 is lowered to a point where it can be locked to a pavement locking device 922 by a locking pin 924. Pavement locking device 922 is connected to the pavement by bolts or other means 926. Arm 916 is held in its raised or lowered position by a pin 921.

When the arm 916 is in its lower position and the wheels 918 lift the trailer off the ground at the locking end and the shopping carts 902 are in a correct position inside the trailer 900, the trailer lift gate 904 can be lifted and held within frame 912 by a pin 907 which is received in a recess 909 to insure that the shopping carts are securely fastened in the trailer for transport. A loaded or empty trailer 900 can be moved to and from a particular location in a parking lot or other facility using any vehicle having a trailer hitch tongue which can receive a trailer hitch ball. Also, the ball hitch on tongue 908 can be replaced by a trailer hitch tongue adapted to receive a ball hitch so that the trailer can be towed by any vehicle which has a ball hitch ball mounted thereon and in position to receive the tongue 908. It is contemplated in accordance with the present invention that when the trailer 900 is filled with carts that it is moved from the parking lot to the store or other facilities, the carts are unloaded, and then the empty trailer is moved back out into the parking lot and positioned to receive shopping carts 902. Although the trailer 900 shown in FIGS. 35 and 36 of the drawings is shown as a single, relatively narrow trailer adapted to receive a single row or column of shopping carts, it is envisioned that the trailer may be doubled or tripled in width to provide a double or triple rows or columns of shopping carts.

With respect to FIG. 36 of the drawings, a top view of the shopping cart collection trailer 900 may be seen. From this view it may be seen that the lifting arm 916 raises and lowers the wheels 918 by acting on the wheel supports 930 and axle 919. In addition to affecting the position of the wheels 918, the lifting arm 916 raises and lowers the locking bar 920 into position to be locked with the pavement locking devices 922. The pavement locking devices 922 and locking arm 920 are connected by locking pin 924 and a pad lock or other securing item 934. The wheel supports 930 are cross connected through the frame 906 and secured to the axle or supporting rod 919 by nuts 932. Wheels 918 rotate on shafts 931 extending from supports 930. The end frame 917 is mounted to side rails 914 and trailer frame 906.

With respect to FIG. 37 of the drawings and in accordance with another embodiment of the invention, a shopping cart collection vehicle is generally designated by the numeral 950. The vehicle 950 includes a singular steerable drivable rear wheel 952 and front support wheels 954. The vehicle includes a protective body 956 with a door access 958 complete with lock and opening mechanism 960 and side window 966. In addition to the door side windows 966 the body includes rear side windows 962, rear window 964 and front window or windshield 972. On an upper portion of the body 956 is attached a light bar or assembly 970 which provides indication and warning lights. Located within the protection of the body 956 is the drivers area complete with drivers seat 968, steering wheel 974 and controls.

Attached to the front of the collection vehicle 950 is a collection system or unit including a hydraulic cylinder upper support 976, a hydraulic cylinder 978, hydraulic cylinder lower mounting support 982 attached to a boom 984. The boom 984 rides vertically within a boom support frame 980 by vertical and movement of the hydraulic cylinder 978. The distal end of the support boom is complete with bumps 986 and an angled pointed end 988 to facilitate the collection and retention of shopping carts.

Left and right side rails 991 support outer walls 990 of the shopping cart collection area. The outer walls 990 are connected and supported by the rails 991, an outer wall support brace 992, and vehicle frame member 996. The collection and dispersion end of the vehicle 950 is complete with shopping cart guides or bumpers 994 which are mounted to the vehicle frame members 996.

Figure 51:
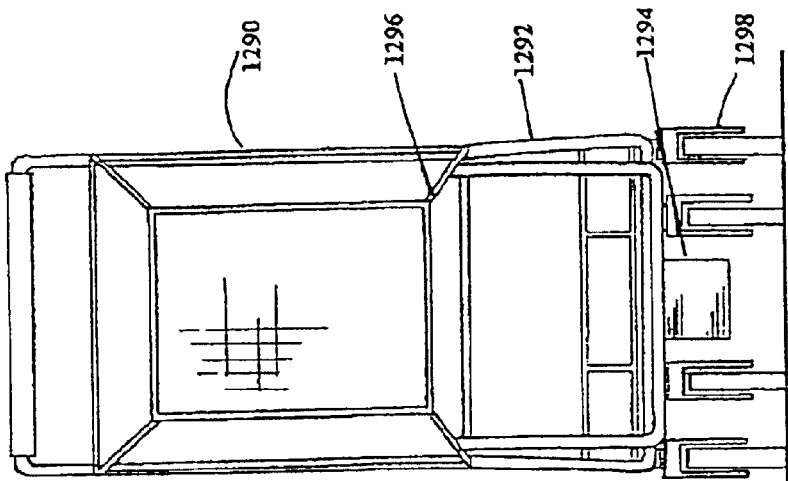
FIGS. 50 and 51 are respective front view illustrations of respective large and small type shopping carts each supported on a different style collection boom in accordance with the present invention.
Figure 50:
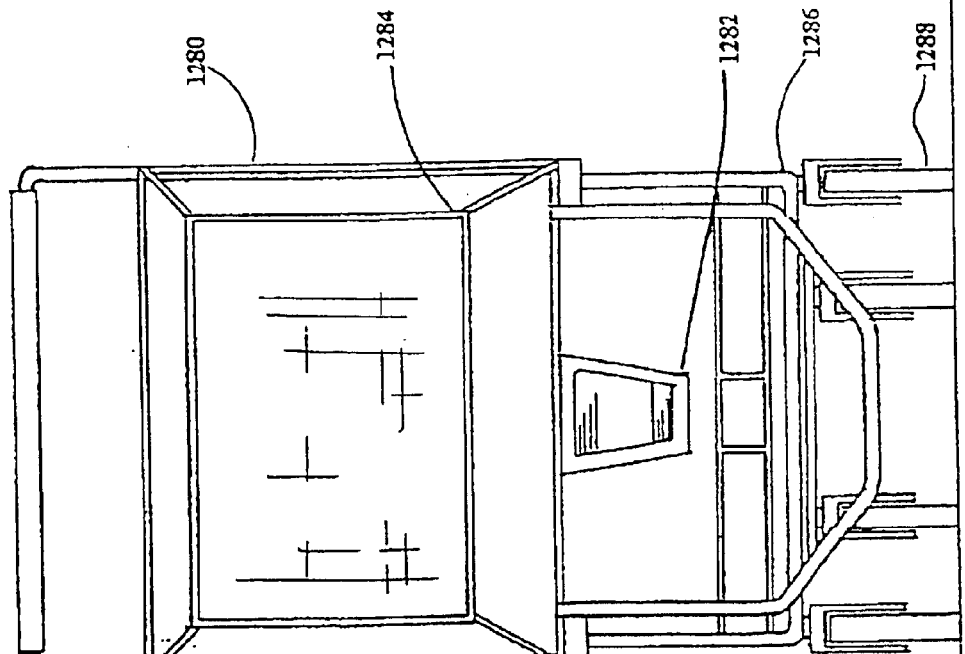

With reference again to FIG. 37 of the drawings, shopping carts are collected, transported, and/or stored by the shopping cart collection vehicle 950 as follows. First, the shopping cart collection vehicle is maneuvered to a position where it is located behind a shopping cart or nested stack, row, or column of shopping carts to be collected. Then, the driver or vehicle operator lowers the boom 984 by extending the shaft of cylinder 978 sufficiently to position the front end 988 of boom 984 below the lowest horizontal frame member of a shopping cart as shown in FIG. 51 or below the collection basket in a space provided between the collection basket and a lower shelf in the shopping cart as shown in FIG. 50 in a position to be received through the shopping cart from the rear thereof. Once the boom has been positioned correctly for the particular type or size of shopping cart being collected, the vehicle operator moves the vehicle forward as far as possible to load the shopping cart or carts onto the boom 984 as far back as possible on the boom without contacting guides 980. Once the cart or carts have been loaded onto the boom 984, the vehicle operator can raise the boom by retracting cylinder 978 sufficiently to lift the wheels of the carts off the pavement, asphalt, concrete, or other ground surface. The side rails 991 and walls 990 keep the shopping carts from tipping from side to side once they are loaded on the boom 984. The vehicle operator or driver repeats the process to load additional shopping carts until the boom 984 is fully loaded. The nubs or bumps 986 near the forward end of boom 984 keep cart from slipping off the end of the boom. Once the boom is fully loaded and the boom has been raised to keep the shopping cart wheels off the ground, asphalt or other surface to prevent damage to the shopping cart wheels while they are being moved or transported from, for example, the parking lot to the store, the vehicle operator maneuvers the vehicle to the store for unloading of the shopping carts. The shopping carts can be removed from the boom 984 by simply lowering the boom and allowing the shopping cart wheels to again support the shopping carts, backing the vehicle up to remove the boom from within the shopping carts, and then raising the boom once again for travel out to collect additional shopping carts. To facilitate the loading and unloading of shopping carts to and from the boom 984, the boom may be angled slightly downward with the forward end 988 of the boom slightly lower than the rear of the boom 984.

The top of the shopping cart collection area of the collection vehicle 950 is shown open between rails 991 and walls 990 to allow the vehicle operator or driver access to the shopping carts to correct any misalignment, if necessary, and also to allow an unobstructed view to facilitate proper maneuvering of the vehicle and boom to collect and unload shopping carts. If desired, the vehicle 950 can be used to store shopping carts on boom 984 temporarily or at the end of the work day until unloading of the carts therefrom. Hence, the shopping cart collection vehicle 950 is useful in not only collecting, transporting, and the unloading of collected shopping carts, but also in the temporary storage thereof.

Figure 38:
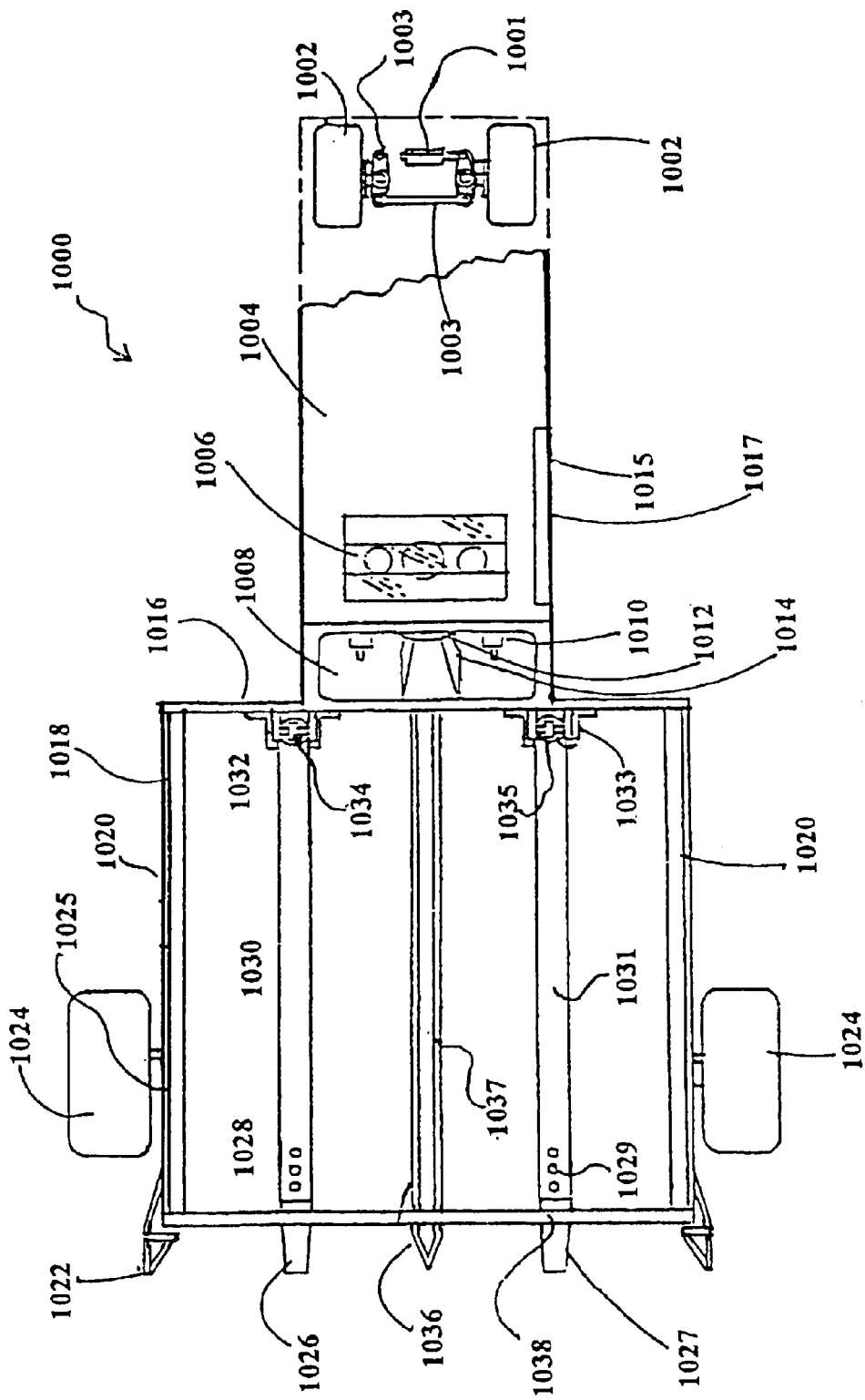
FIG. 38 is a top view illustration of a shopping cart collection vehicle having a dual or double collection rack system.

With respect to FIG. 38 of the drawings and in accordance with another embodiment of the invention, there is shown a dual or double boom collection vehicle designated by the numeral 1000. This double boom vehicle 1000 is driven and steered by rear wheels 1002. The rear wheels are steered by a hydraulic cylinder 1001 through linkage 1003. The vehicle includes a cover or body 1004 mounted on a supporting frame. The vehicle body 1004 supports a light system 1006 and a front windshield 1008. Viable through the front windshield 1008 are driver controls 1610, steering wheel 1012, and its support column 1014. The vehicle body 1004 has entry through a side door 1017 which is opened and closed by a locking handle 1015. The vehicle portion is connected to a shopping cart collection area by a front frame member or plate 1016. This front frame member or plate 1016 supports side walls 1008 and side rails 1020. The side walls 1018 and lower frame members support cart guides 1022 which help to guide the shopping carts into the collection area. The front wheels 1024 are mounted to lower frame members by front wheel axles 1025.

Collection booms 1030 and 1031 have ends 1026 and 1027, retainment bumps 1028 and 1029, and are mounted the vehicle frame plate 1016 by brackets 1032 and 1033 and vertical hydraulic cylinders 1034 and 1035.

The separate sides of the shopping cart collection area are divided by dividing walls 1036 extending downwardly from a center rail 1037. The dividing walls 1036 and rails 1037 and 1020 are supported at one end by a cross bar 1038 and at the other end by the plate 1016. By utilizing a dual collection system many shopping carts can be collected in a shorter wheel base vehicle than using a single collection area as shown in FIG. 37. The shorter wheel base allows for maneuverability in tight locations and the use of a shorter frame for the vehicle 1000. If maneuverability is not a concern, and the collection booms of the vehicle 1000 of FIG. 38 are the same length as the collection boom of the vehicle 950 of FIG. 37, the amount of shopping carts which can be collected, transported, and/or stored, can be doubled. Further, the shopping cart collection vehicle 1000 can be adapted to collect large and small shopping carts by moving the central walls 1036 and rail 1037 either to the right or left and thereby forming a narrow shopping cart collection channel and a wide shopping cart collection channel and moving either boom 1030 or boom 1031 so that it is centered within the collection channel. Weights or counterweights can be added to the vehicle as necessary to maintain stability and to prevent unwanted tipping during shopping cart collection, transport and unloading. Further, it is to be understood that the vehicle 1000 is operated in a similar fashion to the vehicle 950 of FIG. 37. Also, it is to be understood that if the rails 1020 and 1037 are located at the proper height with respect to the selected shopping carts being collected, walls 1018 may be eliminated.

Figure 39:
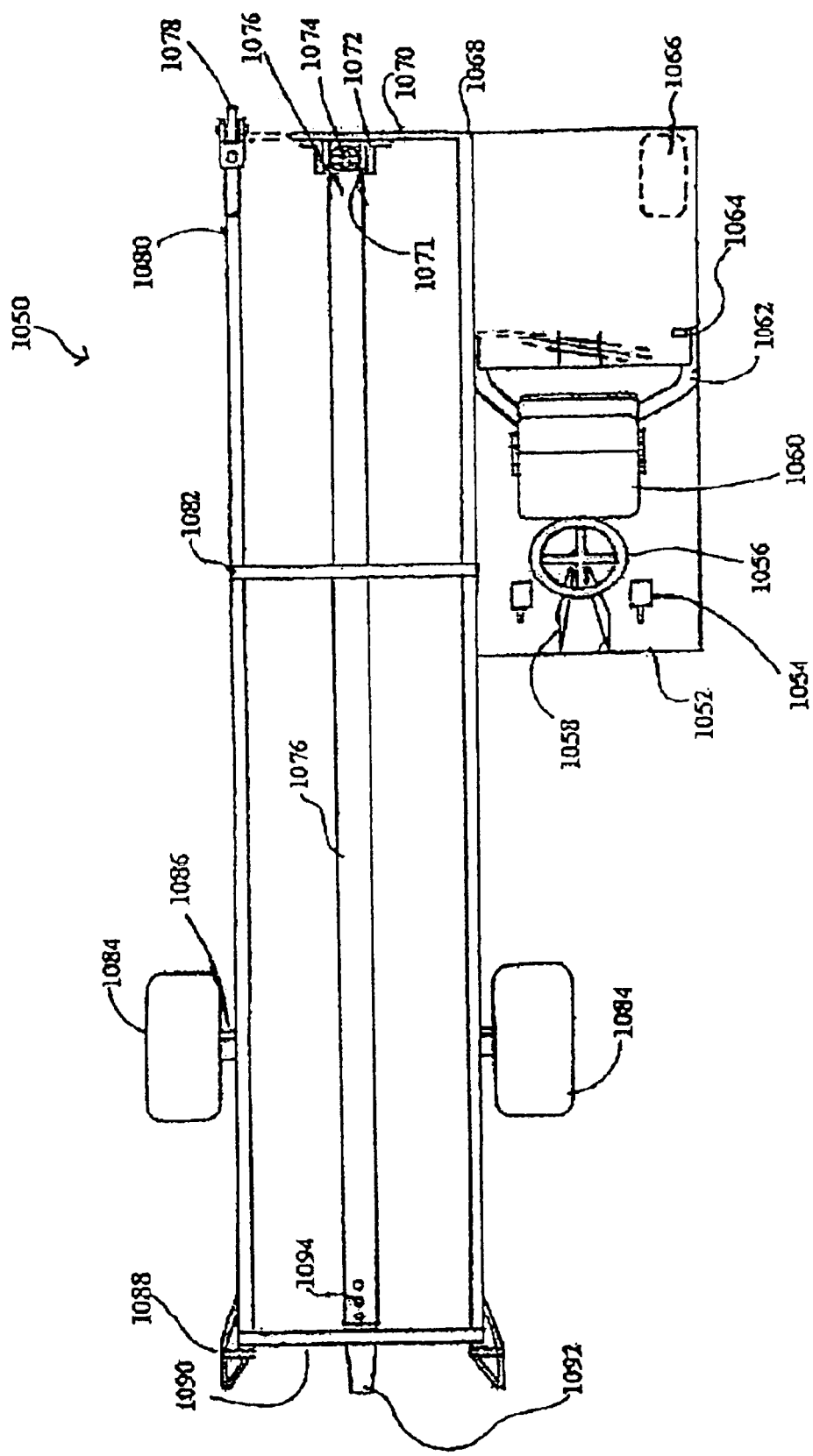
FIG. 39 is a top view representation of a shopping cart collection vehicle having a side mounted drive and operator system.

FIG. 39 of the drawings shows another embodiment of a shopping cart collection vehicle designated by the numeral 1050. In this embodiment, the shopping cart collection system is located to the right side of an operator vehicle 1052 thus allowing for a larger shopping cart collection or storage area and for the operator to fully monitor the collection, transport, unloading and/or storage of the shopping carts. The vehicle portion 1052 is complete with operator controls 1054, steering column 1058, steering wheel 1056, and drivers seat 1060. The driver is protected by a roll cage 1062 which supports on its upper portion a safety light bar 1064. As shown, the vehicle is a side mounted single drive and steer wheel 1066 system. This single system is powered by appropriate means such as gas, electric or other motors or hybrid motor system which drives the single drive and steer wheel 1066. Although only wheel 1066 is driven, wheels 1084 and 1066 may all include brakes. An idler or follower caster or wheel 1078 supports the right rear corner of the vehicle 1050.

An inner side rail 1068 of the shopping cart collection system is connected to the side of transportation vehicle 1052. The inner side rail 1068, an outer rail 1080, and the vehicle 1052 supports an end frame or plate 1070. The end frame or plate 1070 supports hydraulic supporting brackets 1071, the single vertical hydraulic cylinder 1074, boom guides 1072, and a shopping cart collection boom 1076.

The outer end of the end frame 1070 supports the outer rail 1080, a lower frame member and the caster support wheel 1078. The outer rail 1080 is connected to the inner rail 1068 by end plate 1070, middle cross member 1082, and end cross member 1090. Outer and inner lower frame members below outer rail 1080 and inner rail 1068 support front axles 1086 and front wheels 1084 for the support of the shopping cart collection system and support cart guides 1088 for guiding shopping carts into the collection area and onto the collection boom 1076. The collection boom 1076 also has a shopping cart guidance end 1092 and retainment bumps 1094. The vehicle 1050 and boom 1076 of FIG. 39 are operated in the same fashion as the vehicle 950 and boom 984 of FIG. 37.

Figure 40:
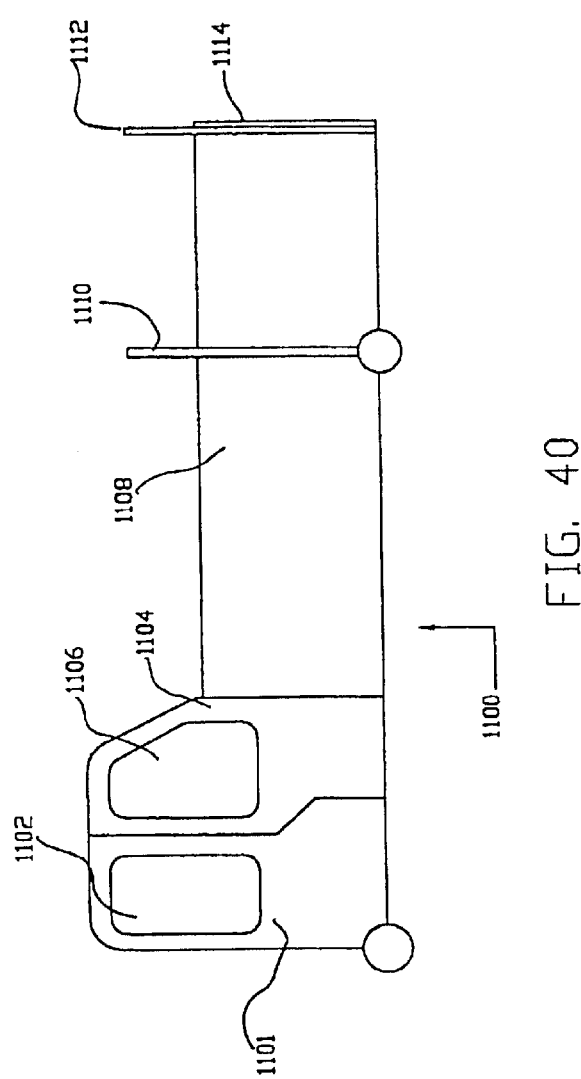

With respect to FIG. 40 of the drawings, the side view of body 1100 for a shopping cart collection vehicle can be seen. The body 1100 includes side rear body panels 1101, side rear windows 1102, side doors 1104, side door windows 1106, side rail panels 1108, cross rail 1110, front cross rail 1112, and front rubber bumpers 1114.

In accordance with one example, side rear body panel 1101 is about 60 inches high, 31½ inches wide at the base, has a front rise of 17½ inches up from the base, an angled rise of 10½ inches at approximately a 45° angle rearward, and then a vertical rise of 35 inches to the top, and has a top about 28 inches wide. The rear panel window 1102 is located approximately 3 inches down from the top and approximately 3 inches in from the back side of the rear body panel 1101. Rear body panel window 1102 is approximately 18 inches wide and 31 inches high. Note that the rear body panel 1101 may have a lower concave curvature in order to accommodate wheels and a convex radius at the rear of the top where the back panel joins the roof.

Side door 1104 includes side door window 1106. In accordance with one example, the side door 1104 is about 60 inches high to match the rear side body panel 1101. The shape of the rear portion of the side door 1104 conforms with the front shape of the rear panel 1101. Thus the rear side of the side door 1104 has a 35 inch vertical portion dropping to a 10½ inch angular portion which connects to a 17½ inch vertical portion. The lower edge of the side door 1104 is about 21½ inches wide. The front edge of door 1104 extends up vertically to the bottom of the windshield and then is angled back and curves into the top of the door. The combined width dimension of the rear side panel 1101 and side door 1104 is 53 inches. The side rail panel 1108 extends forward from the door 1104 to create an overall dimension of the body of approximately 15 feet.

In accordance with the example, the cross rails or bars 1110 and 1112 and the rubber bumpers 1114 at the front of the shopping cart collection vehicle are less than 60 inches tall and less than 44 inches wide and can be approximated in size according to the body dimensions.

Figure 41:
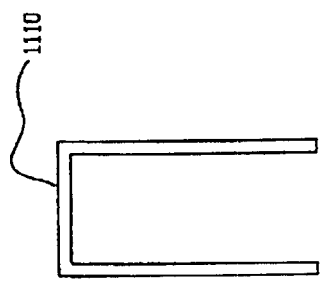
FIGS. 40–43 are respective side, back, front, and end view illustrations of the body of a shopping cart collection vehicle in accordance with one example of the present invention.

With respect to FIG. 41 of the drawings, the body 1100 includes aback panel 1116 between the side body panels 1101. In accordance with the example, the approximate dimensions for the back panel 1116 are 60 inches high and 44 inches wide. The back body panel 1116 includes rear window 1118. In accordance with the example, the rear window 1118 is about 38 inches wide and 31 inches high. The rear window 1118 is centered in the upper portion of the rear back panel 1116.

Figure 42:
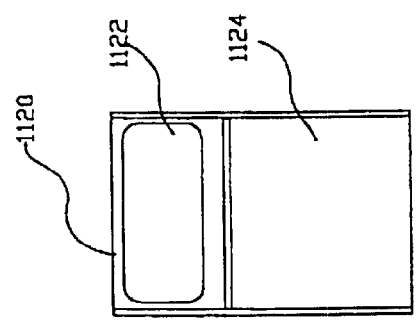

With respect to FIG. 42 of the drawings, the body 1100 includes a front panel 1124 between doors 1104. The front panel 1124 has a front windshield frame 1120 and front windshield 1122. The front panel 1124 and front windshield frame 1120 are proportioned to give proper viewing for the shopping cart collection area. In accordance with the example, the front panel 1124 has an overall vertical dimension of about 60 inches. In this example, the width of the front panel 1124 and front windshield frame 1120 correspond to the rear panel 1116 and are approximately 44 inches wide. Also, in this example, front windshield 1122 has dimensions of about 39 inches wide by 22½ inches high. The windshield fits in the windshield frame 1120 within the 60 inch parameter because the front windshield frame 1120 and front windshield 1122 are angled rearwardly from the lower section of front body panel 1124. Note that the front and rear body panels have a bend or radius of approximately 1 inch although a greater or lesser radius could be used for visual appearances.

Figure 43:
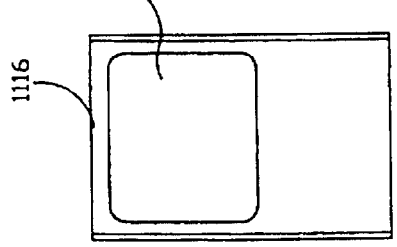

With respect to FIG. 43 of the drawings, a front view of the cross member 1110 shows the inverted U-shape thereof.

Figure 44:
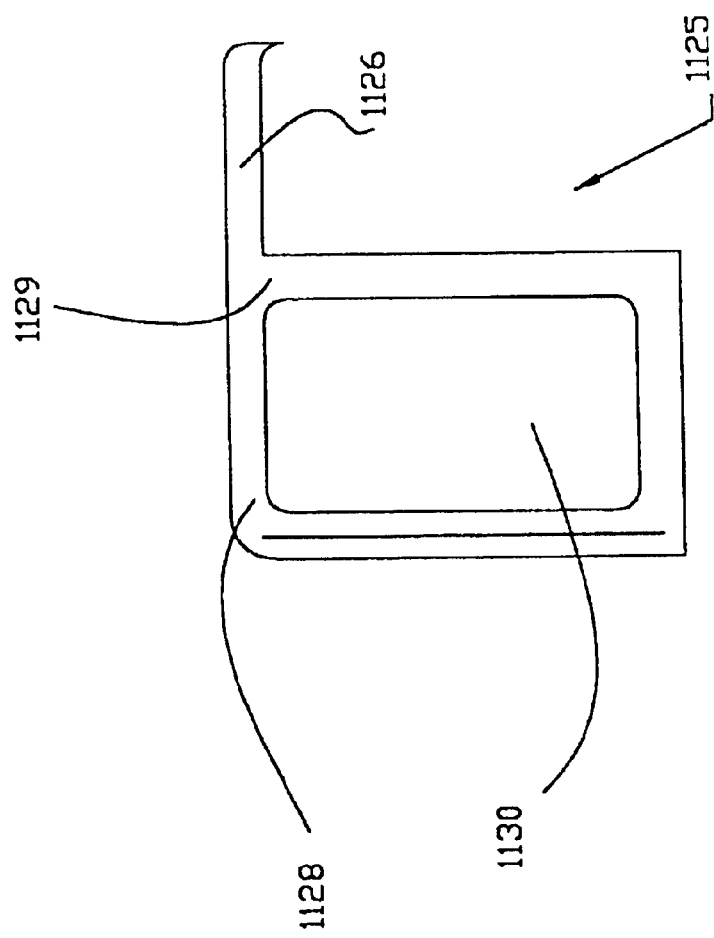

With respect to FIG. 44 of the drawings, and in accordance with another example of the present invention, it is shown that a removable top or cover 1125 made of light weight metal, fiberglass, soft cloth or material, ABS plastic, or the like can be used. The top 1125 has a front cover section 1126, side panels 1128, side windows 1130, a rear panel, a rear window, and a top 1129. Note that glass within vehicle side and rear windows 1130 may be substituted with a clear plastic such as Lexan, plexiglass or other type of clear or transparent material.

Figure 45:
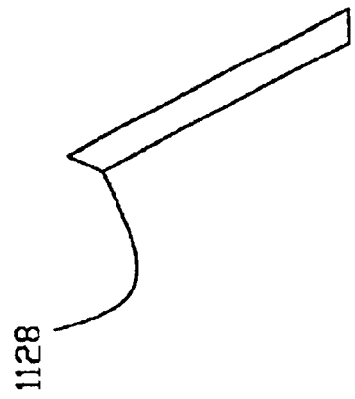
FIGS. 44, 45 and 46 are respective side view illustrations of a vehicle top, windshield and door in accordance with another embodiment of the present invention.

With respect to FIG. 45 of the drawings, a front windshield and frame 1128 is shown adapted to be used with cover 1125. The front windshield frame 1128 may be made out of metal, fiberglass, plastic, soft materials stretched over an inner tubular frame, ABS plastic, or other types of material. Note that the front windshield may be tinted or clear and may be made of any numerous glass, plastic or other suitably clear materials for viewing purposes.

Figure 46:
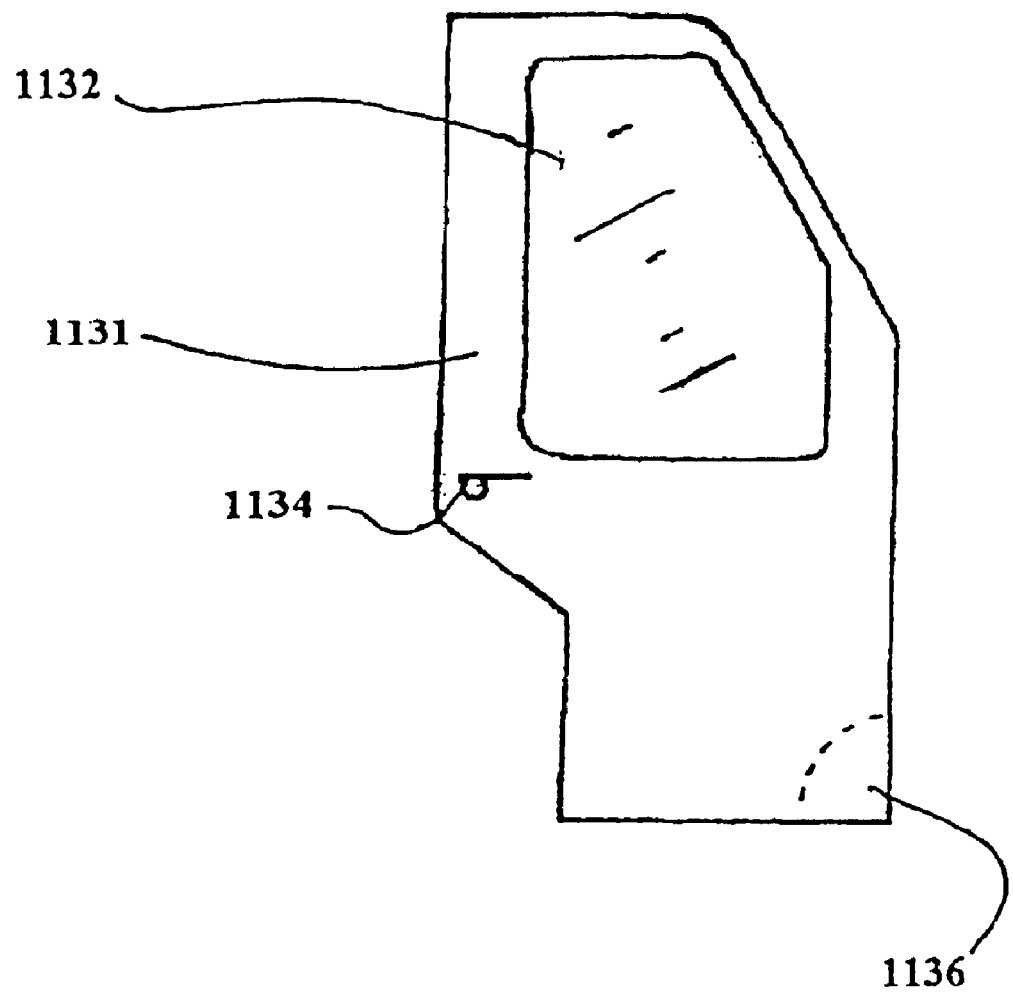

With respect to FIG. 46 of the drawings, there is shown a vehicle side door 1131 adapted for use with cover 1125 and windshield 1128. The side door 1131 includes a side window 1132, door handle 1134, and may have a cutout 1136 to accommodate a front wheel.

Figure 47:
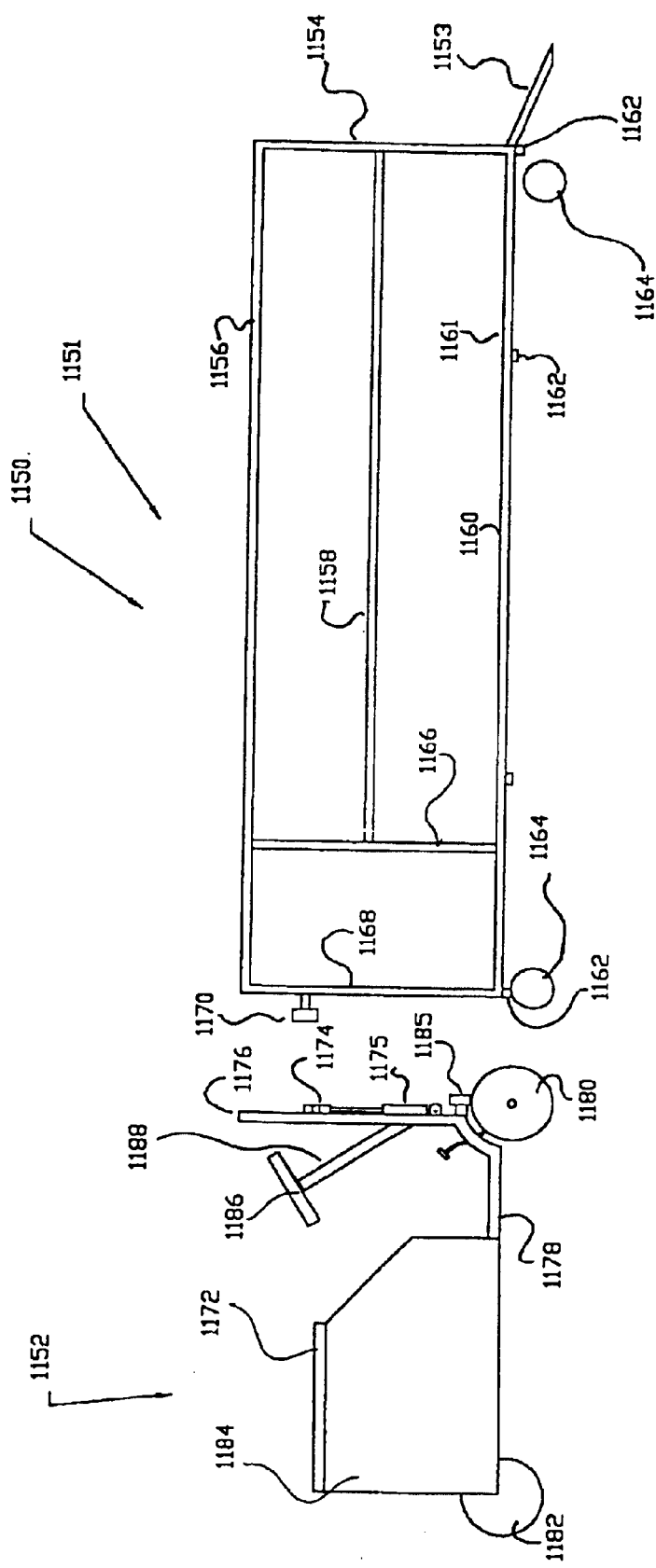
FIG. 47 is a side view illustration of a shopping cart collection vehicle or system including a wheelless collection trailer and self-propelled vehicle.

With respect to FIG. 47 of the drawings, and in accordance with another embodiment of the present invention, a shopping cart collection system is generally designated by the numeral 1150. In this embodiment, shopping cart collection system 1150 includes a wheeless collection trailer 1151 and a self-propelled vehicle 1152. The trailer 1151 has a cart ramp 1153, a front frame 1154 connected to top side rails 1156, mid side rails 1158 and bottom support rails 1160. A bottom or floor 1161 is supported horizontally by bottom support rails 1160 and cross supports 1162 in appropriate positions to also provide feet or supports for the shopping cart collection trailer 1151. In addition, the shopping cart collection trailer 1151 may include wheels 1164 for movement around the parking lot. The top rails 1156, mid rails 1158, and bottom rails 1160 connect to a back frame 1166 and a rear support plate 1168. The rear support plate 1168 supports a rear connection piece 1170. This rear connection piece 1170 is made to releasably mount within a receiver 1174 on the front of self-propelled vehicle 1152.

The self-propelled vehicle 1152 is selectively connected to the shopping cart collection trailer 1151 by the connecting receiver or mating piece 1174. This mating piece 1174 is moved in a vertical direction to correspond with the connection piece 1170 extending from the collection trailer 1151. The vertical movement of the receiver 1174 is done by a cylinder 1175 on a mounting frame or plate 1176. The mounting frame 1176 is connected to a vehicle frame 1178. The vehicle frame 1178 is supported by wheels 1180 and 1182. In addition, the vehicle frame 1178 supports the power drive and body assembly 1184, seat area 1172, steering wheel 1186, steering column 1188, operator controls, and the like.

It is preferred that shopping cart collection trailer 1151 be utilized without wheels 1164 so that it is more difficult for unauthorized persons to move or tamper with trailer 1151 once it is placed in its selected location in a parking lot or other shopping cart collection area. In operation, shopping cart collection system 1150 is utilized by, for example, placing the receiver at the correct height in position to receive connecting piece 1170, driving vehicle 1152 to a point whereat the connection piece 1170 is received within receiver 1174, and thereafter raising receiver 1174 an additional increment to lock the connection piece 1170 into the receiver 1174 and to raise the trailer 1151 off the ground or parking lot. The rear plate 1168 of trailer 1151 is adapted to abut against a lower bumper 1185 extending from mounting frame or plate 1176. Additionally, plate 1168 may include lower cutouts or opening for receiving or accommodating front wheels 1180 of vehicle 1152. Once the trailer has been raised off the ground, the vehicle is driven to place the trailer at a selected location in a parking lot or other shopping cart collection area. Then, the receiver 1174 is lowered to allow trailer 1151 to rest on the surface of the parking lot and to unlock receiver 1174 from connection piece 1170. Thereafter, the vehicle 1152 is moved away from the trailer and driven back to the store or other vehicle storage location. Next, the ramp 1153 is lowered and the trailer is in condition to receive shopping carts. As described above with respect to the other embodiments in accordance with the present invention, the shopping cart collection trailer 1151 may include one or more side by side channels for receiving respective stacks or rows of shopping carts. Once the collection trailer 1151 is filled with shopping carts, the ramp 1153 is raised and locked in position to hold the shopping carts within the trailer 1151, and the above described process for selectively attaching the trailer to the vehicle is repeated and the filled trailer is moved to the store or other location to be unloaded and reused.

In accordance with particular examples of the present invention, the trailer 1151 may have a top or cover to keep out snow and rain, and may include one or more upper cross members or support rails for adding additional support between the side rails 1156 on each side of the trailer (see FIG. 40).

Figure 48:
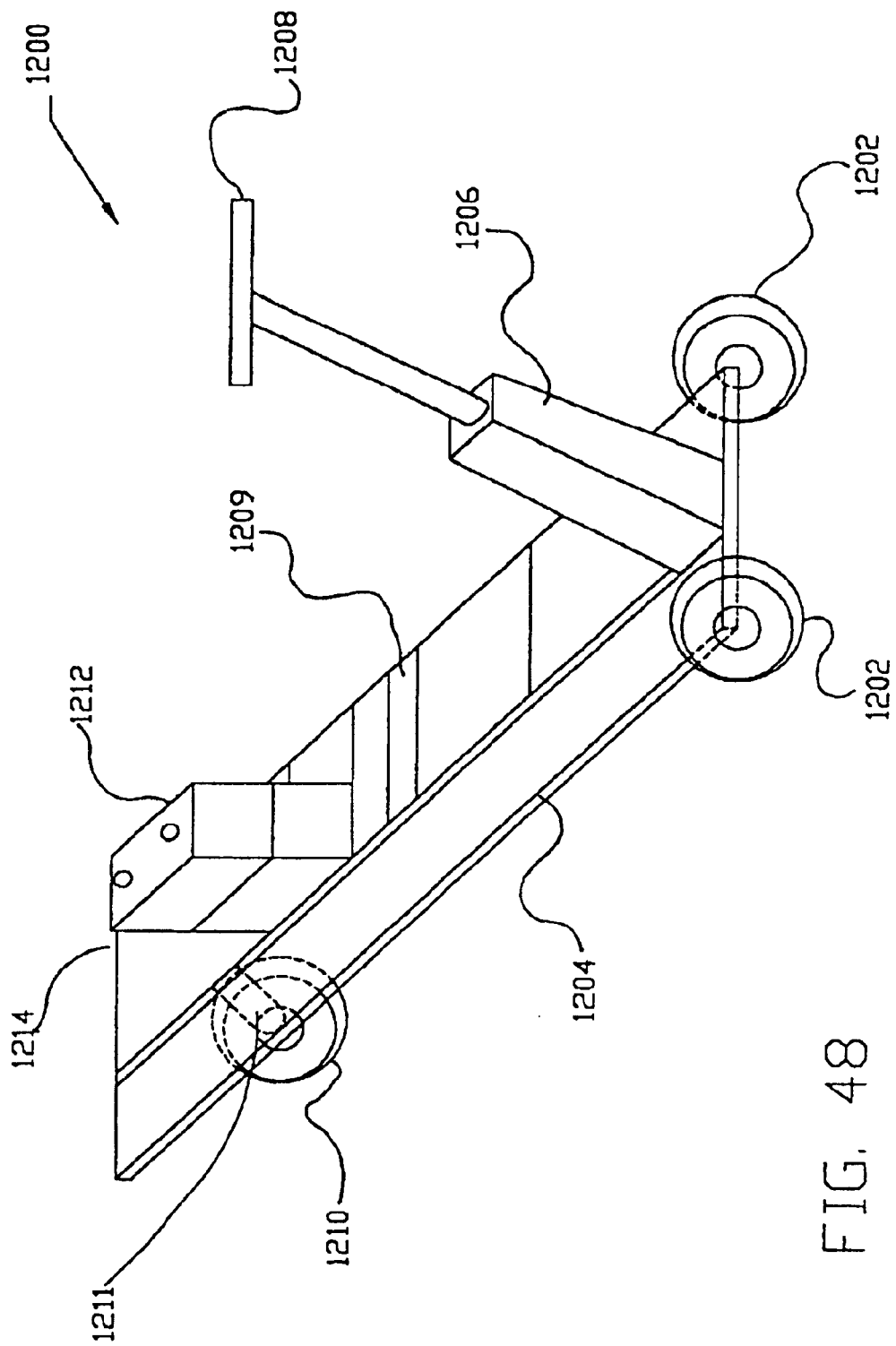
FIG. 48 is a schematic perspective view illustration of a portion of the self-propelled vehicle of a shopping cart collection vehicle in accordance with the present invention.

With respect to FIG. 48 of the drawings and in accordance with one embodiment, a frame, steering and drive systems for a shopping cart collection vehicle are generally designated by the numeral 1200. Front wheels 1202 support a basic frame or undercarriage 1204 of a self-propelled shopping cart collection vehicle. The frame 1204 supports a steering column 1206 and steering wheel 1208. The steering wheel 1208 is connected through a linkage 1209 to a rear wheel 1210. The rear wheel 1210 is supported by a bracket 1211 off the bottom of frame 1204 of the shopping cart collection vehicle. The rear wheel 1210 is powered through the use of either a gas, electric or other suitable motor which is generally designated by the numeral 1212. The approximate power necessary for a shopping cart collection vehicle would be about a 5 to 16 horsepower motor. A fuel tank 1214 provides fuel for motor 1212. Operator controls and a battery are added to provide for electric start and drive control. A brake is added for braking front wheels 1202 and/or rear wheel 1210.

Figure 49:
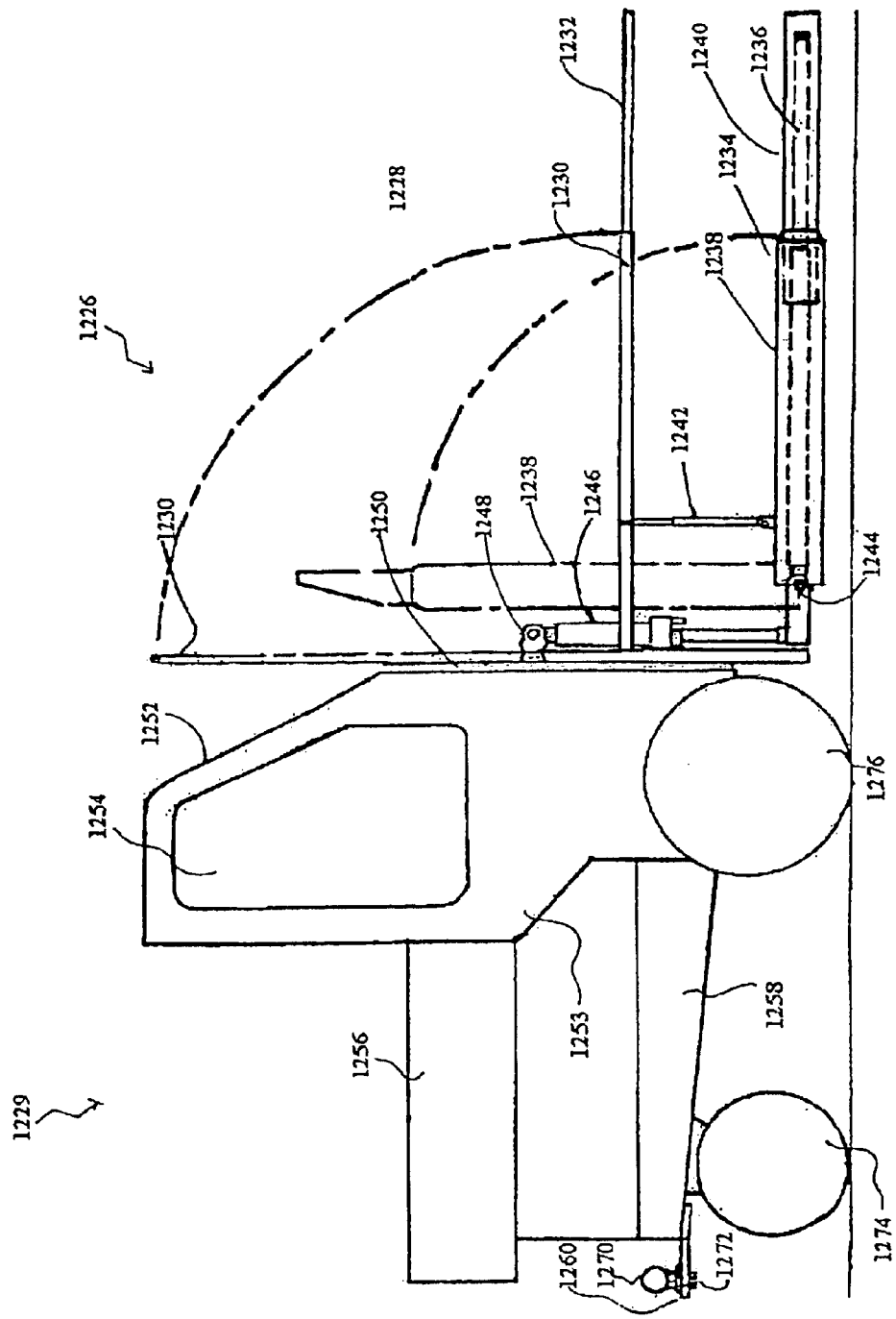
FIG. 49 is a side view illustration of a shopping cart collection vehicle in accordance with still yet another embodiment of the present invention.

With respect to FIG. 49 of the drawings, another embodiment of a shopping cart collection vehicle is generally designated by the numeral 1226. This vehicle 1226 includes shopping cart collection system 1228 and self-propelled vehicle 1229. The collection system 1228 includes a side rail 1230, side rail extension 1232, extendable boom 1238, and boom extension 1240. Note in this particular embodiment, the boom 1238 and extension 1240 are boom covers over a cylinder 1234 and cylinder shaft 1236. The side rail 1230 and boom cover 1238 are connected by a telescoping connector 1242. By connecting them in this manner when the boom 1234 is pivoted into the upright position, the side rails 1230 are also pivoted manually into the upright position.

The boom 1238 is connected through pivot point 1244 to a vertical hydraulic cylinder 1246. The vertical hydraulic cylinder 1246 controls vertical movement of the horizontally extended boom 1238 as described in previous embodiments. The vertical hydraulic cylinder 1246 is connected through mounting bracket 1248 to a plate 1250 of the shopping cart collection vehicle 1229. The side rail 1230 is also pivotally connected to the plate 1250.

The mounting plate 1250 is connected to a body 1252 of the vehicle 1229. The vehicle body 1252 includes side doors 1253, windows 1254, a top, a back, a front, a back window, and a windshield. The body 1252 and a utility bed 1256 are supported by a vehicle frame 1258. The vehicle frame 1258 also supports a mounting hitch 1270 and a mounting hitch frame 1260. The mounting hitch 1270 is connected to a mounting hitch frame 1260 by a mounting hitch nut 1272. The vehicle frame 1258 is supported by a single powered steerable rearwheel 1274 and spaced front wheels 1276.

With respect to FIG. 50 of the drawings, a large type shopping cart may be seen designated by the numeral 1280. Looking at the shopping cart 1280, it can be noted that a large boom 1282 supports the shopping cart 1280 immediately underneath a basket 1284.

In this manner, it may be noted that a shopping cart support frame 1286 and wheels 1288 of cart 1280 hang beneath the shopping cart basket 1284 and thus depend on the basket 1284 and any cross members for support when the cart is being carried by the boom 1282.

With respect to FIG. 51 of the drawings, a small type shopping cart may be seen designated by the numeral 1290. Note that the small shopping cart 1290 is supported underneath its frame 1292 by a small boom 1294. In this manner, the small boom 1294 supports the shopping cart frame 1292 and cart 1290. Space permitting, boom 1294 may be received beneath basket 1296 of cart 1290. Note that the shopping cart wheels 1298 still hang from the shopping cart frame 1292 when supported by the boom 1294. Boom 1294 is thinner vertically than boom 1282 of FIG. 50 and can be used with either cart 1280 or cart 1290. Although special or modified carts may be constructed for use with booms 1282 and/or 1290, it is preferred to use conventional shopping carts with the collection systems, units, booms, devices, trailers, adapters, and the like of the present invention.

Figure 54:
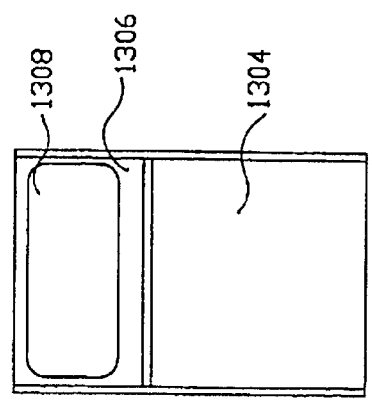
FIGS. 52–54 are respective side, rear and front view representations of a shopping cart collection vehicle body in accordance with another embodiment of the present invention having a rear collection system.
Figure 53:
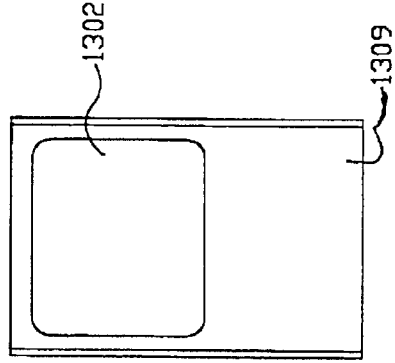
Figure 52:
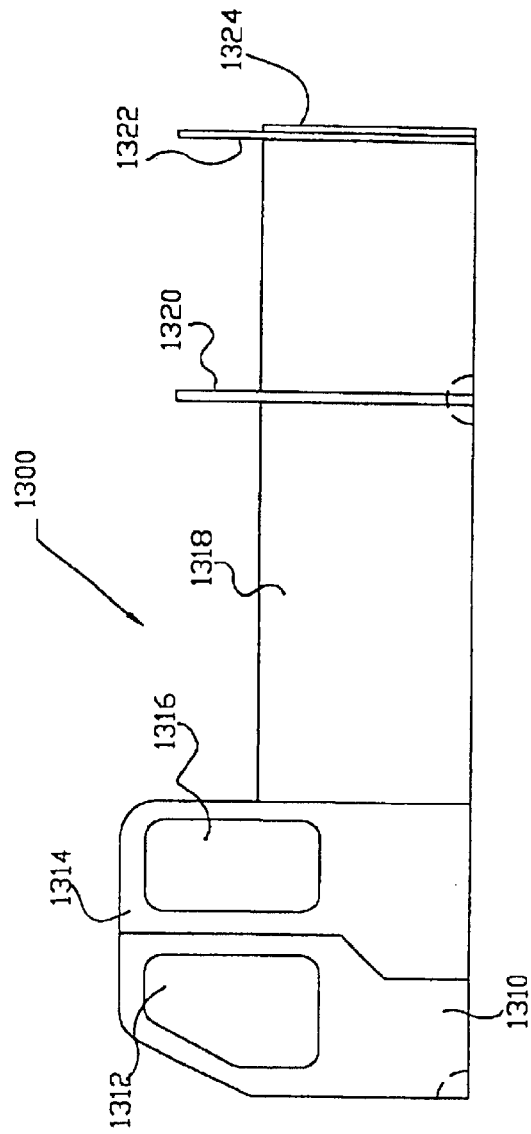

With respect to FIGS. 52–54 of the drawings and in contrast to FIGS. 40–43 of the drawings, the vehicle body 1100 of FIG. 40 is adapted for use with a shopping cart collection vehicle having the shopping cart collection system or unit on the front of the vehicle, while vehicle body 1300 of FIGS. 52–54 of the drawings is adapted for use on a shopping cart collection vehicle having a shopping cart collection system or unit on the back of the vehicle or a trailing collection unit rather than a leading collection unit.

With respect to FIG. 52 of the drawings, a vehicle body with a rear collection system is generally designated by the numeral 1300. The vehicle body 1300 includes side doors 1310, side door windows 1312, rear side panels 1314, side panel windows 1316, side rail panels 1318, side rail panel cross supports 1320 and 1322, and end rubber bumpers 1324.

In accordance with one example, side panel door 1310 is approximately 22½ inches long at its base. From the rear portion of the base the door extends vertically about 17½ inches, angles at approximately a 45° angle toward the rear of the collection vehicle about 10½ inches and then proceeds vertically another 35 inches. This gives an overall height for the vehicle collection side door 1310 of approximately 60 inches. Note that this height allows the door side window 1312 to be approximately 31 inches high.

In the same example, the rear side panel 1314 has a corresponding design to the door 1310 so that it rises approximately 17½ inches, proceeds rearward at approximately 45° angle for 10½ inches and then rises vertically for another 35 inches to also have a 60 inch vertical height. The bottom of the rear panel 1314 is approximately 30½ inches wide. Note that this gives the door 1310 and rear panel 1314 a combined width dimension on the bottom of approximately 53 inches. The rear panel side window 1316 has a vertical dimension of approximately 31 inches and width of approximately 18 inches. The collection side panel 1318 is sufficiently high (less than 60 inches) to cover the side of the shopping cart collection system or channel while being approximately 10 feet 7 inches in length. Note that the cross bars 1320 and 1322 and the rubber bumpers 1324 can be sized in accordance with the requirements of the system and can generally be seen in proportion to the other body dimensions.

With respect to FIG. 53 of the drawings, a rear panel of the vehicle body 1300 for a rear collection system may be seen designated by the numeral 1309. This rear panel 1309 also includes a rear window 1302. In accordance with the example, the rear panel 1309 is approximately 60 inches high and 44 inches wide. The rear window 1302 is situated in the upper portion of the rear panel 1300 and evenly distributed from side to side. In the example, the rear window 1302 is approximately 31 inches high and 39 inches wide.

With respect to FIG. 54 of the drawings, a front panel 1304 of vehicle body 1300 includes a front windshield frame 1306, and front windshield 1308. In the example, the front panel 1304 is approximately 44 inches wide and has an approximate vertical dimension of 60 inches. The front windshield frame 1306 is angled rearwardly with respect to the lower portion of front panel 1304. The front windshield frame 1306 supports the front windshield 1308. In the example, the front windshield 1308 is approximately 22½ inches high and 39 inches wide.

With respect to FIG. 55 of the drawings, and in accordance with another embodiment of a collection system having a front dual zone cart collection system is generally designated by the numeral 1350. Note that this version of the collection system is adapted for use with fixed length booms. The body 1350 includes rear panels 1352, rear panel side windows 1354, side doors 1358, side door windows 1360, top 1361, front windshield 1362, rear window 1363, side panels for the collection system 1364, and side panel cross member 1366. The rear body panels 1352 include the rear panel windows 1354 and a cut-out 1356 for the rear wheels.

In one example, the base of the side panel 1352 is approximately 30½ inches in length. The side window 1354 is approximately 31 inches high and 18 inches wide. The side door 1358 to the body 1350 is approximately 22½ inches long at the base. The side door 1358 includes a side window 1360 which is dimensioned to be aesthetically pleasing but approximately 31 inches high. The collection system side panel 1364 is shown approximately 5 feet 6 inches in length. Collection system cross bar 1366 is sized proportionally to the rest of the body 1350.

With respect to FIG. 56 of the drawings, a top view of the dual collection system of the vehicle body 1350 of FIG. 55 is shown. This top view of the vehicle body collection system 1350 shows the side walls 1364 adjacent cart supporting booms 1366 and a center divider 1368. Note that the side rails 1364, booms 1366, and center divider 1368 are connected to front wall 1369 of the vehicle body 1350. Also, note from this view that the rubber bumpers 1370 may be seen mounted on the ends of side walls 1364. The inner surfaces of side walls 1364 and divider 1368 may be lined with rubber or friction-reducing strips to facilitate the movement of carts therein and to prevent damage to the carts, walls or divider.

Figure 57:
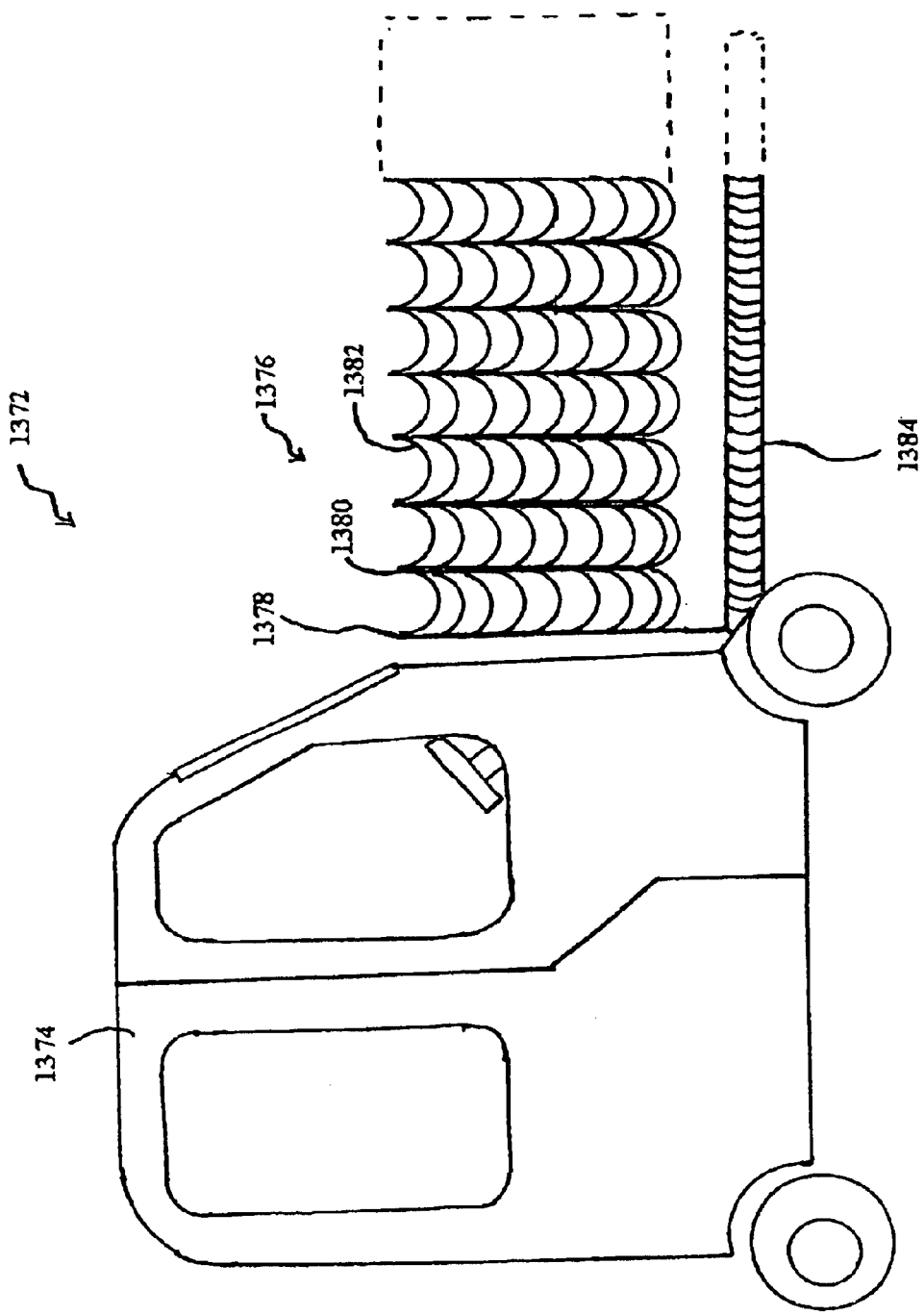
FIGS. 57 and 58 are respective side and partial end view illustrations of a shopping cart collection vehicle in accordance with still another embodiment of the present invention.

With respect to FIG. 57 of the drawings, and in accordance with another embodiment, a folding canvas and extendable boom collection system and vehicle is generally designated by the numeral 1372. The collection system and vehicle 1372 includes a cart collection system or unit 1376 mounted on a self-propelled vehicle 1374. The collection system 1376 is mounted off a front plate 1378 which supports a folding canvas cover 1380 and canvas support system 1382. The canvas 1380 and support system 1382 are supported over an extendable boom 1384.

Figure 58:
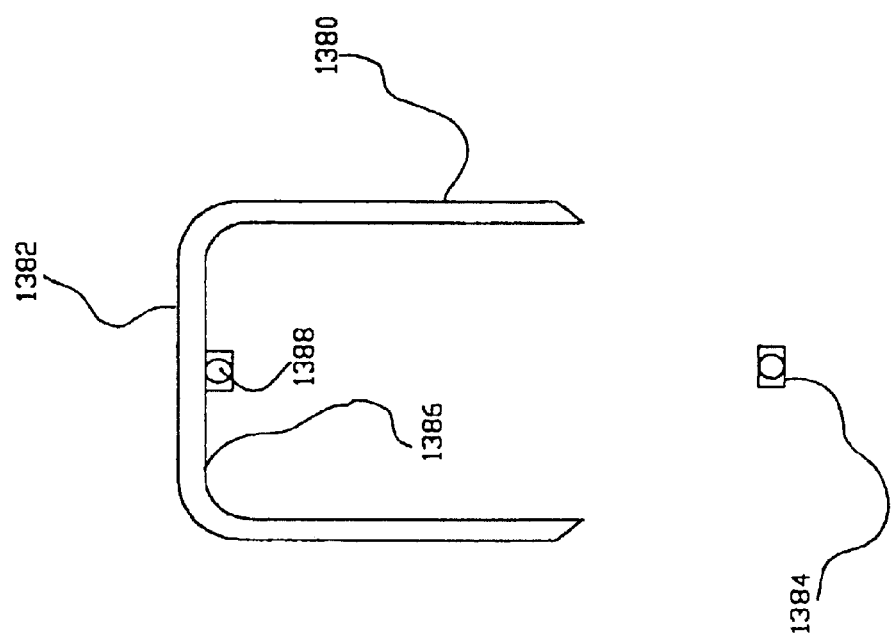

With respect to FIG. 58 of the drawings, a front view of the folding canvas cover and collection system may be seen. From this view, it may be seen that the support system 1382 includes metal bows 1382 which support the folding canvas 1380. The metal bows 1382 are supported on a smaller upper telescoping or extending cylinder 1388. The relationship of the upper telescoping cylinder 1388 and the shopping cart collection boom 1384 may also be seen in this drawing.

It is preferred that the booms or cylinders 1384 and 1388 are extended or retracted simultaneously so that the cover 1380 and cart supporting boom 1384 remain about the same length. When extra length of the boom 1384 is not needed, the booms 1384 and 1388 are retracted to shorten the overall length of the system 1372 and improve the visibility and maneuverability of the system 1372.

Figure 59:
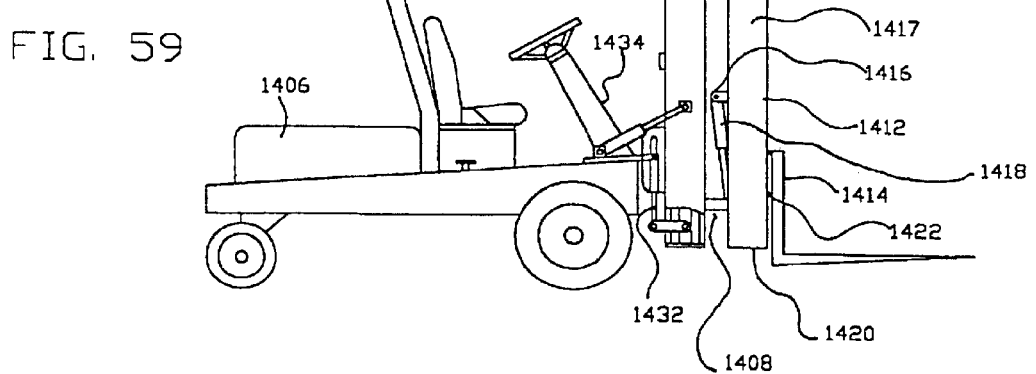

With respect to FIG. 59 of the drawings and in accordance with another embodiment of the present invention, a convertible shopping cart collection and forklift vehicle is generally designated by the numeral 1400. This vehicle 1400 includes a shopping cart and forklift system 1402 connected to a lifting system 1404 on a self-propelled vehicle 1406. In this embodiment, the lifting system 1404 and forklift system 1402 are connected through brackets 1408 and 1410.

Also in this embodiment, cables 1412 are mounted at one end to a fork bar 1422 which supports forklift forks 1414 in the shopping collection and forklift system 1402. Also shown mounted to this system 1402 is the vertical cylinder 1418 which controls the movement of a shopping cart collection boom 1424 recessed into the forklift system 1402. The vertical cylinder 1418 is connected through mounting bracket 1416 to an outer frame 1417 of the shopping cart and forklift system 1402. The bottom end of the cylinder 1418 is connected at pivot point 1420 to the collection boom 1424. In this manner, the vehicle 1406, lifting system 1404, and forklift/collection system 1402 function as a forklift when the boom is in the raised inner frame 1426 lifting position. The boom 1424 is used to raise inner frame 1426 relative to outer frame 1417 and thereby cause cables 1412 to raise fork bar 1422 and forks 1414. Note also that the extension of the boom 1424 not shown allows for the forks 1414 to be raised to a greater height then normally useable on the forklift system 1404. Great care should be used when operating the vehicle in this manner as the increased height may offset the center of gravity designed for the forklift vehicle 1406 and normal forklift system 1404.

Figure 60:
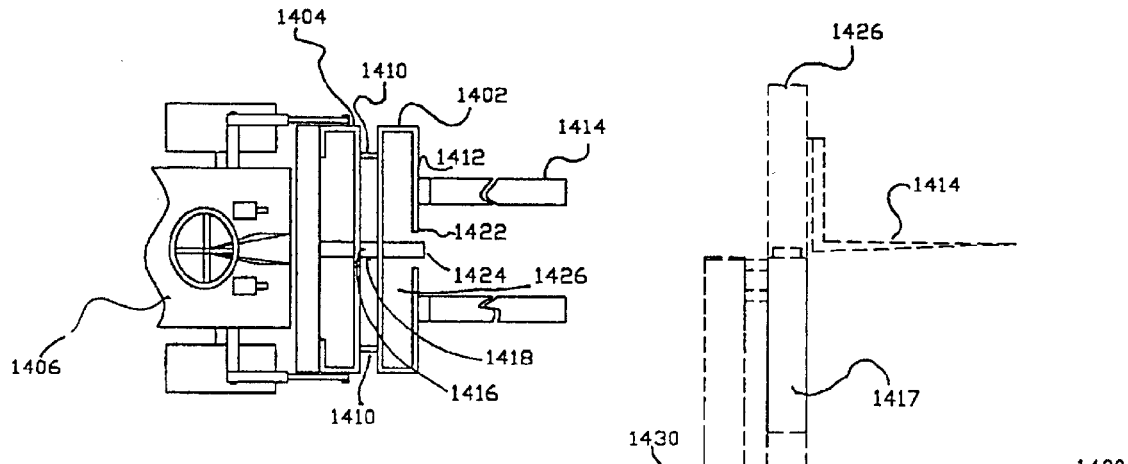
FIGS. 59 and 60 are respective side and partial top view illustrations of a convertible shopping cart collection and forklift vehicle in accordance with another embodiment of the present invention.

As shown in FIG. 60 of the drawings, the forklift and shopping cart collection system 1402 is shown mounted on the forklift system 1404 through mounting brackets 1410 and 1408. The drawing also shows how the forks 1414 are mounted on the forklifting bar 1422 which is connected to the vertical cables 1412. In this manner, the forks 1414 may be moved inward or outward from each other for varying dimensions while still allowing the cables 1412 to lift the fork bars 1414.

Also shown in this drawing are the mounting of the vertical hydraulic cylinder 1418 through its mounting bracket 1416 to the shopping cart collection and forklift system 1402. The cylinder 1418 is in its extended position and thus the boom 1424 is raised into its enclosed vertical position.

With respect to FIG. 61 of the drawings, another embodiment of the shopping cart collection vehicle is generally designated by the numeral 1450. In this embodiment, external frame 1452 controls and houses the movement of internal frame 1454 of collection system 1450. The internal frame 1454 is raised and lowered by extending and contracting a shopping cart collection boom 1456 while in the upright position. When boom extension 1458 is extended from the boom 1456, the internal frame 1454 is raised.

The internal frame 1454 is movably connected to top or side rails 1460. In this manner, side rails 1460 are raised in a corresponding relationship to the raising of the internal frame 1454. The side rails 1460 are mounted on a cross bar 1466. The cross bar 1466 is connected through cables 1462 and pulleys 1464 to the internal 1454 and external 1452 frames. The cables 1462 are connected to the external frame 1452 at a connecting point 1468. The cables 1462 travel through pulleys 1464 which are connected to the internal frame 1454. The pulleys 1464 magnify the movement of the internal frame 1454. Thus, side rails 1460 and cross bar 1466 move at a greater speed then the internal frame 1454 when being raised. In this embodiment, side rails 1460 are shown with side rail extensions 1470 connected by side rail pins 1472.

In this embodiment, the external frame 1452 is connected through lower cylinder brackets 1470 to lower hydraulic cylinders 1472 and upper cylinder brackets 1474 to the self-propelled vehicle 1475. The external frame 1452 is also connected through tilting frame brackets 1476, tilting cylinders 1478, and vehicle brackets 1480 to the self-propelled vehicle 1475.

The boom 1456 is connected through pivot point 1488 to the boom cylinder 1484 through bracket 1486. Boom cylinder 1484 is connected through upper bracket 1482 to the external frame 1452. In this manner the extension of the cylinder 1484 raises the boom 1456 around pivot point 1488. Retracting the cylinder 1484 lowers the boom 1456 around pivot point 1488.

The self-propelled vehicle 1475 is supported by dual front wheels 1490 and a single, powered, steering rear wheel 1492. These wheels 1490 and 1492 support a vehicle frame 1494. In turn, the frame 1494 supports a multitude of parts including a vehicle body 1496, roll bar 1498, driver seat 1502, vehicle controls 1500, cylinder mounting brackets 1480 and 1474, as well as steering column 1504 and steering wheel 1506.

With respect to FIG. 62 of the drawings, the top view of the shopping cart collection vehicle 1450 may be seen. From this view, the relationship of the external frame 1452 and internal frame 1454 may be seen. Also shown is the relation of the side rails 1460 to the cross bar 1466. The boom cylinder 1484 is shown in relation to the boom 1456 in its centered raised position.

When the boom 1456 is in the raised position, the boom 1456 is housed within the internal frame 1454. Extending the boom 1456 raises the internal frame 1454. The cross bar 1466 is controlled by wheels 1508 in relation to the internal frame 1454. Thus the cross bar 1466 and internal frame 1454 are in a controlled relationship within the external frame 1452 to freely move in the vertical direction.

Also shown in this drawing are the relation of the tilting cylinders 1478, front wheels 1490, vehicle controls 1500, steering column 1504, and steering wheel 1506 of the shopping cart collection vehicle 1450.

Figure 63:
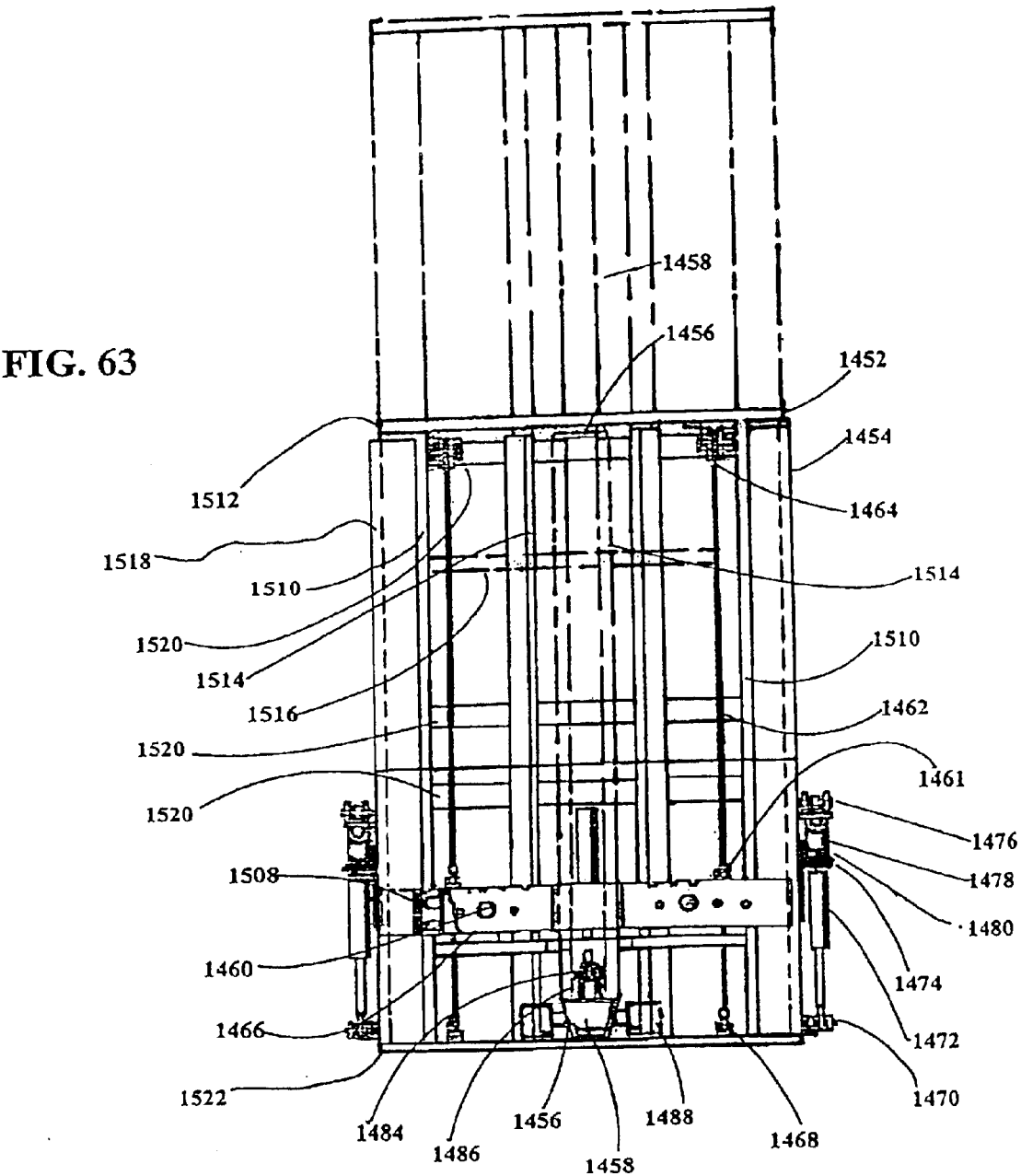

FIG. 63 of the drawings shows the front view of the shopping cart collection vehicle and system 1450 of FIGS. 61 and 62. The boom 1456 and boom extension 1458 can be seen in their lowered horizontal position and mounted around pivot point 1488. In addition, the connection of the boom cylinder 1484, through the boom cylinder bracket 1486, to the boom 1456 may be seen. Also shown in this drawing are the vertical cylinders 1472 and their connections 1470 and 1474. Furthermore, the tilting cylinders 1478 are shown with their connections 1480 and 1476. The cross bar 1466 and its connections 1471 to the cables 1472 and pulleys 1474 are also clearly shown in this view. Note that the cables 1462 are connected to the cross bar 1466 at connection points 1471. The cables travel through the pulley 1464 and down through the external frame 1454 to connection points 1468. This shows the relation of cross bar 1466 to the internal frame 1452 and external frame 1454 and its relation thereto.

The internal frame 1452 has a top cross bar 1512 connected to side rails 1510 and internal guide rails 1514. The external rails 1510 and internal rails 1514 are also connect by bottom cross rail 1516. The bottom cross rail 1516 is positioned such that it is always below the cross rail support 1466. This drawing also shows that the cross rail 1516 and the fork support bar 1466 are indented to allow the boom 1456 to be raised into an upright position where the boom 1456 recesses into the internal frame 1452.

The external frame 1454 has two side rails 1518 and multiple back supports 1520. The back supports 1520 support the external side rails 1518. The external side rails 1518 are also connected by a bottom plate 1522 thus becoming a rigid supporting structure external frame 1454.

Fork cross arm support 1466 is shown supporting side rails 1460. Furthermore, the cross rail 1466 is seen to ride within the internal frame 1452 on the internal side rails 1510. The cross bar 1466 rides within this internal side rail 1510 through the use of guide wheels 1508.

Figure 64:
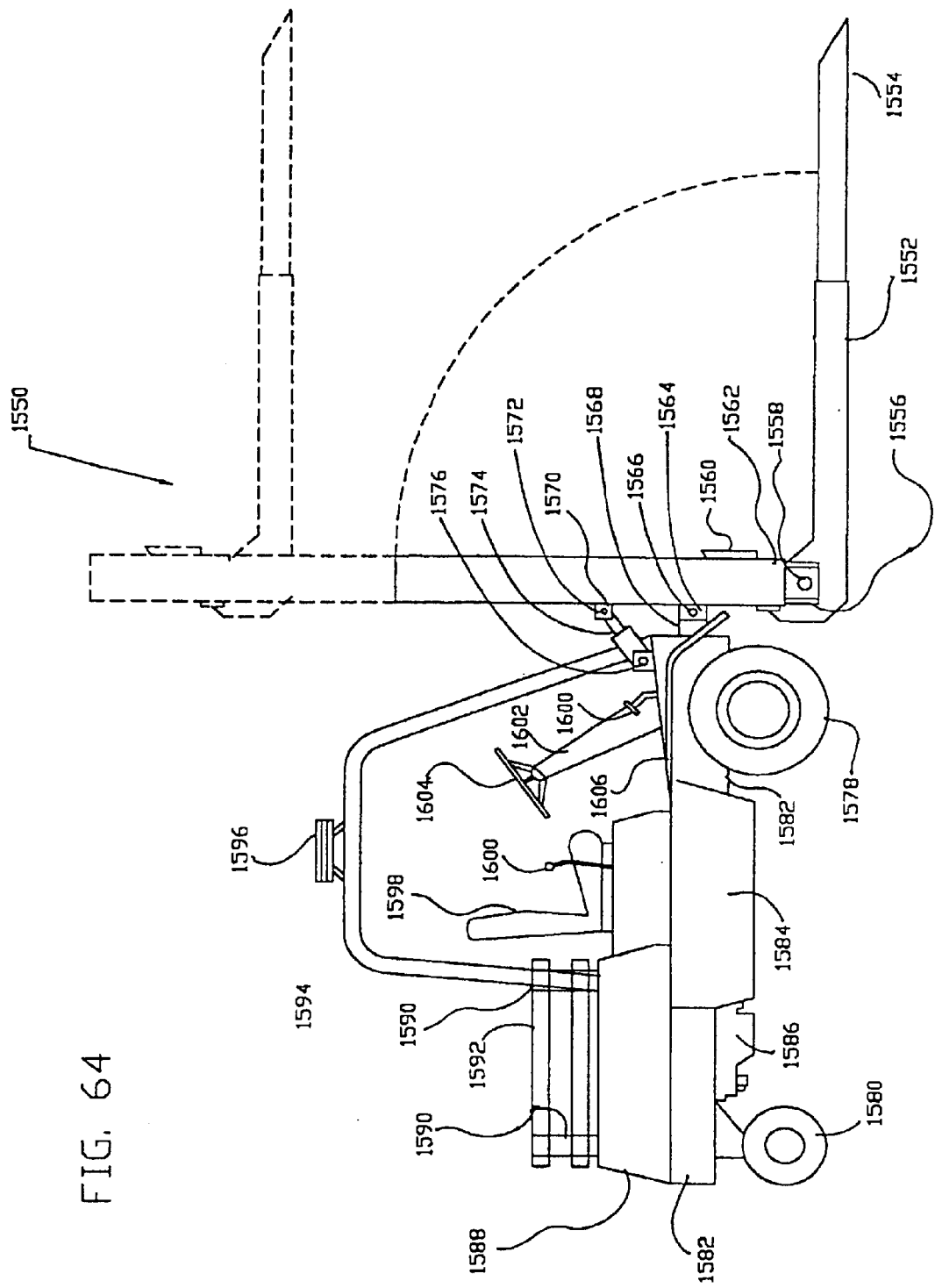

With respect to FIG. 64 of the drawings, another embodiment of a light duty dual purpose shopping cart collection and forklift vehicle may be seen designated by the numeral 1550. The vehicle 1550 has a boom 1552 and boom extension 1554 connected to an internal frame 1556 through a pivot point 1558. The internal frame 1556 also supports a fork cross bar 1560. The internal frame 1556 rides within an external frame 1662 and is guided by vertical hydraulic cylinders. The internal frame 1556 is selectively moved vertically within the external frame 1562. The external frame 1562 is connected to the vehicle through one or more lower brackets 1564 and pivot points 1562 to vehicle brackets 1568. The external frame 1562 is also connected to the vehicle by upper brackets 1570, upper pivot points 1572, and tilting cylinders 1574, to tilting cylinder vehicle connection brackets 1576. Both the lower brackets 1568 and upper tilting brackets 1576 are connected to vehicle frame 1582.

The vehicle frame 1582 is supported by front wheels 1578 and rear powered steering wheel 1580. The frame 1582 supports body 1584 and power drive system 1586. In addition, this embodiment shows wheel fenders 1606 mounted over front wheels 1578. The frame 1582 supports a motor cover 1588 which supports a utility area encased by vertical rails 1590 and cross rails 1592.

The vehicle frame 1582 supports a roll cage 1594 to protect the driver enclosed area. The roll cage 1594 supports a light bar 1596 for warning and indicator lights. Enclosed within the roll cage 1594 are a driver seat 1598, vehicle controls 1600, steering column support 1602, and steering wheel 1604.

Note that in this embodiment, the boom 1552 is powered by a rotating power source around pivot point 1558 to be raised to a vertical position. When the boom 1552 is located in its vertical position, it is housed within the internal frame 1556. The internal frame 1556 is not powered in its movement by the extension of the boom 1552 in the vertical position but has a separate vertical power source of spaced vertical cylinders. In this manner, the internal frame 1556 and boom 1552 may both be raised with the boom 1552 in its lowered and extended positions. Thus, the forklift forks may be raised independently from the boom 1552. In this manner, forklift forks may be used as top or side rails to keep the shopping carts in position on the boom 1552. Also, three frames can be used with the boom serving as the means for raising and lowering a third frame or supplemental internal frame to give even more height to the forklift forks.

Figure 65:
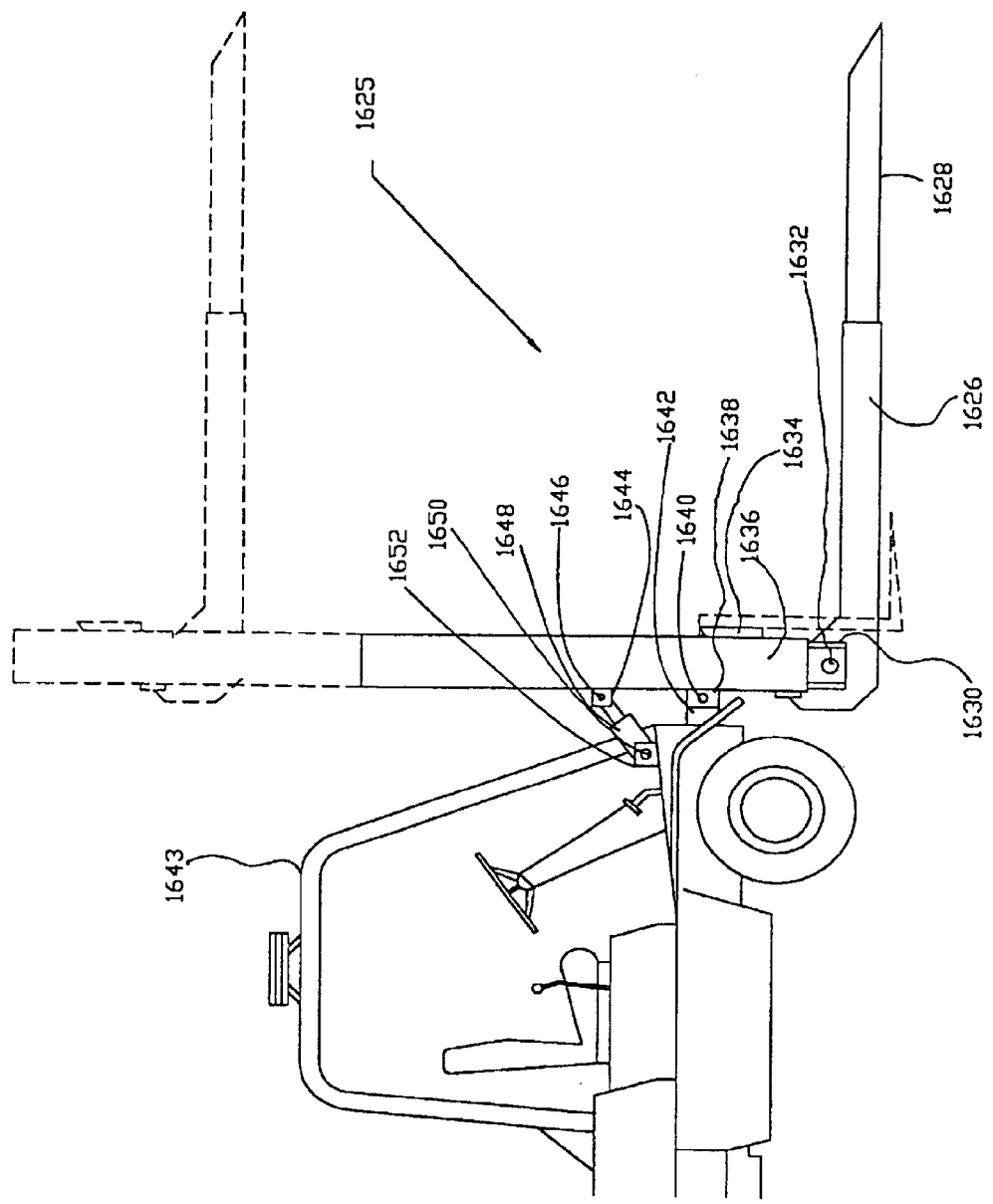

With respect to FIG. 65 of the drawings, a heavy duty dual purpose shopping cart collection and forklift vehicle like that of FIG. 64 is generally designated by the numeral 1625. This vehicle 1625 has an extendable boom 1626 and boom extension 1628 which are mounted to an internal frame 1630 through a pivot point 1632. The internal frame 1630 also supports a fork cross bar 1634 to which forklifts may be attached. The internal frame 1630 rides vertically within an external frame 1636.

The external frame 1636 is connected to the vehicle through lower brackets 1638, lower bracket pivot points 1640, and vehicle connection brackets 1642. The external frame 1636 is also connected to the vehicle by upper brackets 1644, upper bracket pivot points 1646, and upper hydraulic cylinders 1648. The upper hydraulic cylinders 1648 are connected through pivot points 1650 to vehicle frame brackets 1652. The vehicle connection and frame brackets 1642 and 1652 are securely mounted to a self-propelled vehicle 1643.

The self-propelled vehicle 1643 is of sufficient size and power to control, lift and maneuver the boom 1626, external frame 1636 and internal frame 1630 in the manner necessary for the collection of shopping carts and for use as a forklift.

Figure 66:
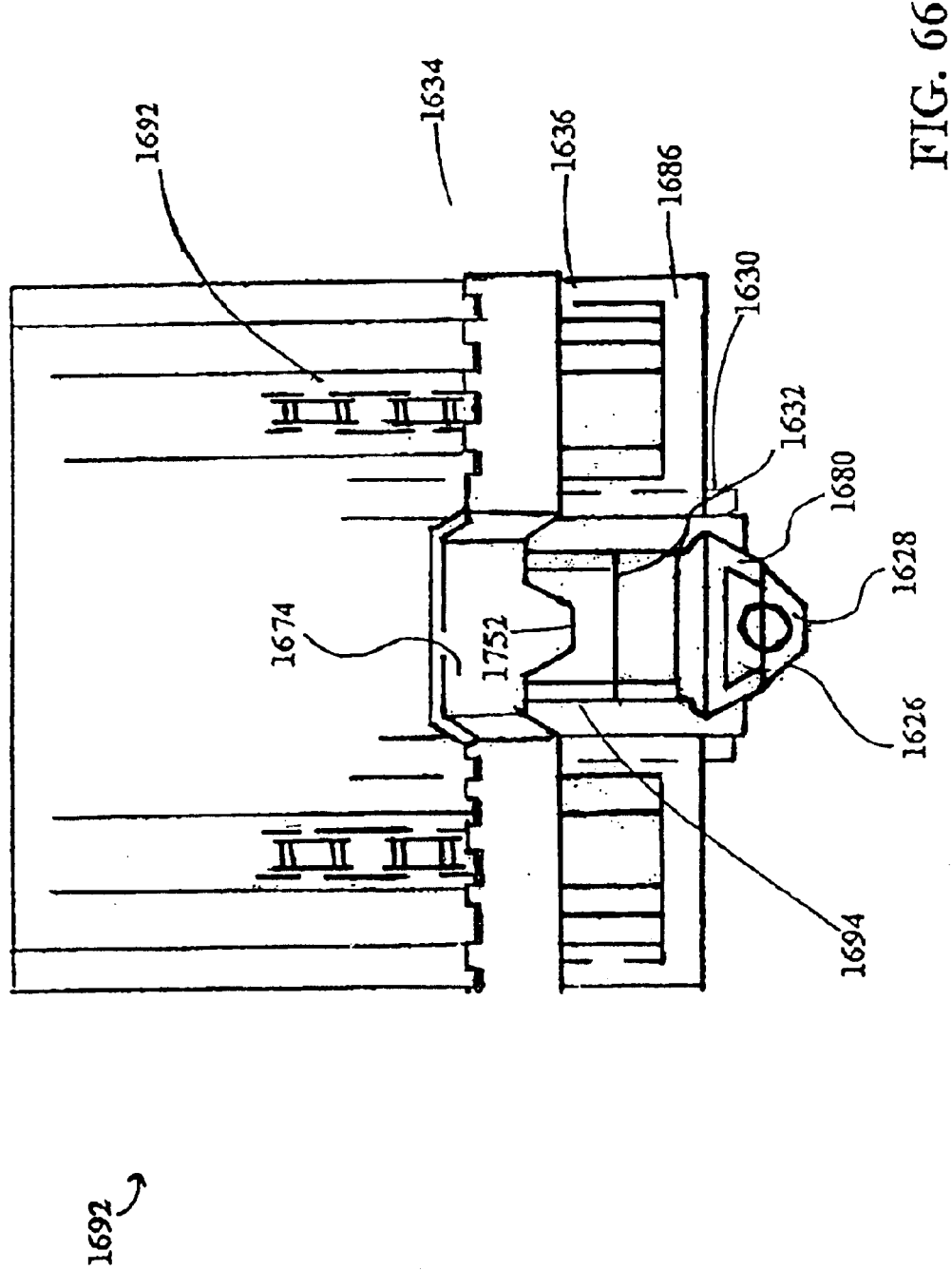

FIG. 66 of the drawings shows one embodiment of the recessed boom and fork assembly of FIG. 65. This recessed boom and fork assembly 1674 includes boom 1626 and boom extension 1628 housed within a boom cover 1680. The boom 1626, boom extension 1628, and boom cover 1680 are pivotly mounted to the inner frame 1630 through pivot point 1632. The inner frame 1630 passes through frame base 1686 which connects to the outer frame 1636.

The fork cross bar 1634 rides along the inner 1630 and outer 1636 frame pieces. The fork cross bar 1634 is raised and lowered through the use of connecting chains 1692. The chains 1692 are either connected with one end attached to the fork bar and the other end attached to or anchored to the outer frame and passing over pulleys connected to the inner frame so that raising and lowering of the inner frame causes resultant raising and lowering of the fork bar or the chains have one end connected to the fork bar, pass over pulleys connected to the inner frame and have the other end attached to a moving power source such as a hydraulic cylinder or motor unit.

Figure 70:
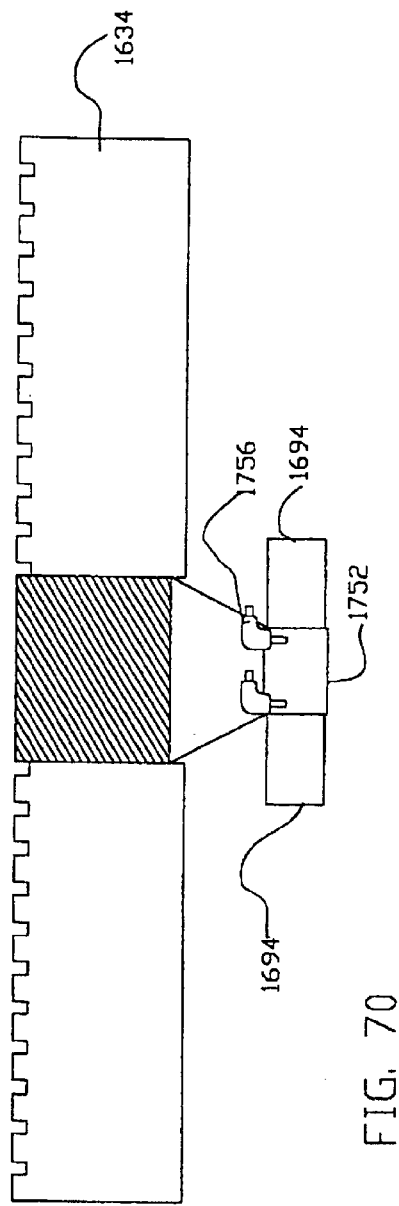
Figure 71:
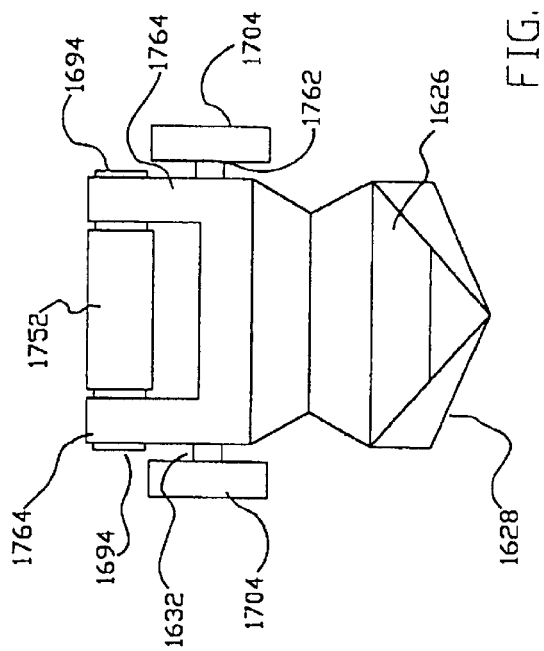

The fork bar 1634 is selectively attached to the boom 1628 by hydraulicly actuated locking pins 1694 which are selectively received in circular openings in catch brackets extending upwardly from the boom 1626 (see FIGS. 70 and 71). Alternatively and preferably, the locking pins extend from the boom 1626 and are received in the fork bar 1634 (see FIGS. 72–75).

Figures 67, 68, 69:
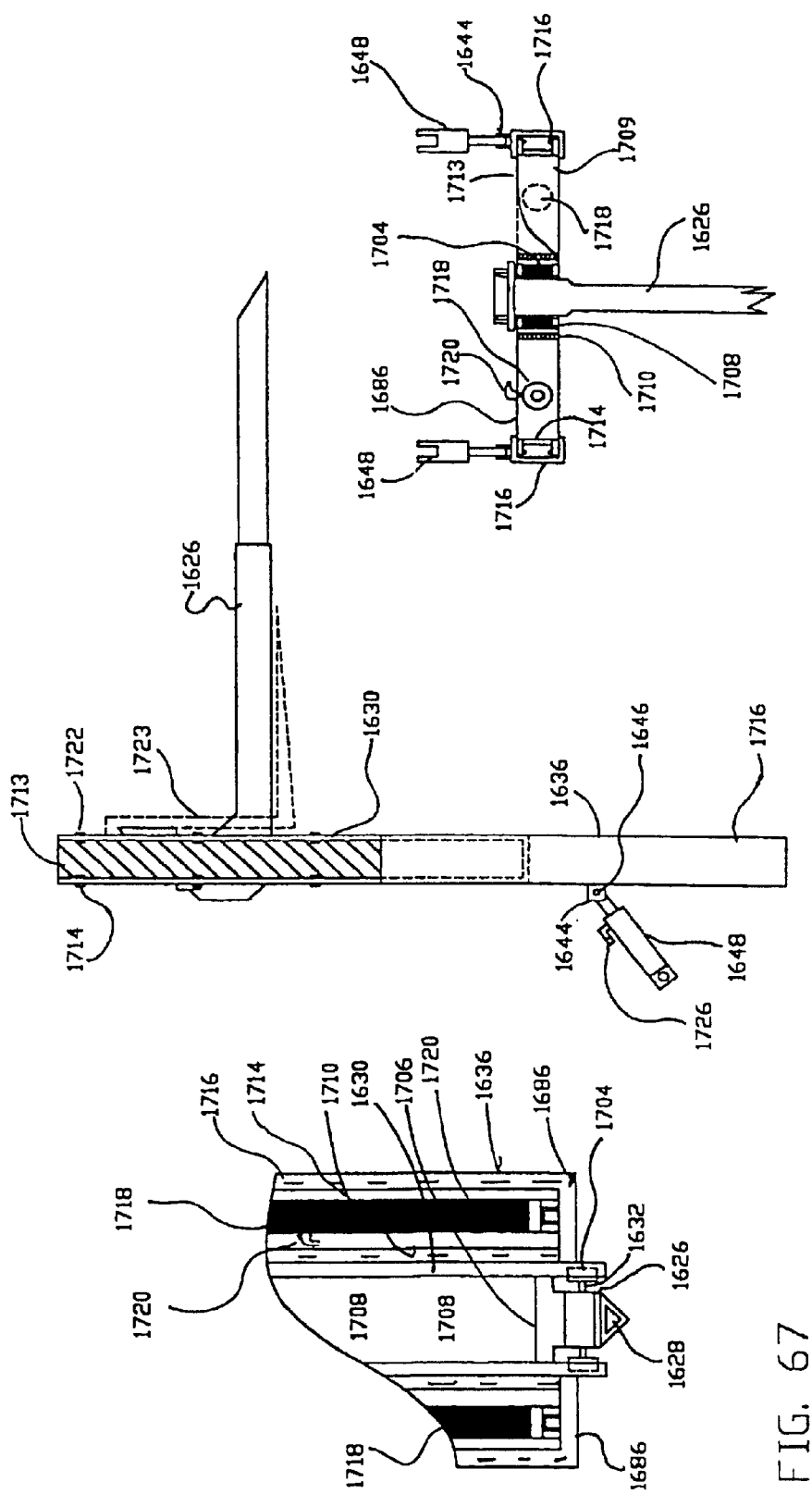

With respect to FIG. 67 of the drawings, a particular embodiment of the vertically extendable boom shopping cart and forklift collection system of FIGS. 65 and 66 is shown with the extendable boom 1626 pivotally mounted through pivot point 1632 to vertical alignment guides 1704. The vertical alignment guides 1704 align within internal frame channels 1708 to allow a vertical motion of the boom 1626. In addition, a cross bar 1706 also supports and guides the boom assembly in a vertical motion within the internal frame channels 1708. The internal frame 1630 rides within the external frame 1636.

The external frame 1636 has inner rails 1710 connected to bottom plate 1686 which is also connected to external outer rails 1716. The channels 1708 of inner frame 1630 are connected by cross member 1713 to outside rails 1714 of the inner frame 1630. The inner frame members 1708, 1713 and 1714 ride within and are guided by the external frame 1636 and are powered by vertical hydraulic cylinders 1718. The hydraulic cylinders 1718 receive hydraulic power from the vehicle through connectors 1720. The cylinders 1718 operate between base plate 1686 and cross member 1713 so that extension of the cylinders causes upward movement of inner frame 1630.

With respect to FIG. 68 of the drawings, the internal frame 1630 can be seen extended upwardly from the external frame 1636. The internal frame 1630 uses rollers 1722 and/or grease to ride within the external frame 1636. The internal frame 1630 supports both the fork bar 1634 and the extendible boom 1626.

The external frame 1636 is mounted to the vehicle by means of the tilting cylinders 1648 which receive hydraulic power from the vehicle through connectors 1726.

FIG. 69 shows a top view of the embodiment of the shopping cart collection system shown in FIGS. 65–68.

FIG. 70 of the drawing shows the fork bar 1634 with hydraulic piston 1752 and locking pins 1694. The locking pins 1694 are activated by power flow through connectors 1756. These locking pins 1694 and hydraulic cylinder 1752 are used to connect to the boom 1626 to the fork bar as shown in FIG. 71.

With respect to FIG. 71 of the drawings, boom 1626 is shown with guide wheels 1704 mounted on wheel shafts 1762. The boom 1626 also has catch brackets 1764 into which slides the hydraulic lock 1752. The lock 1752 then extends pins 1694 through circular openings in catch brackets 1764 to lock the hydraulic lock 1752 and fork bar 1634 to boom 1626.

Figure 72:
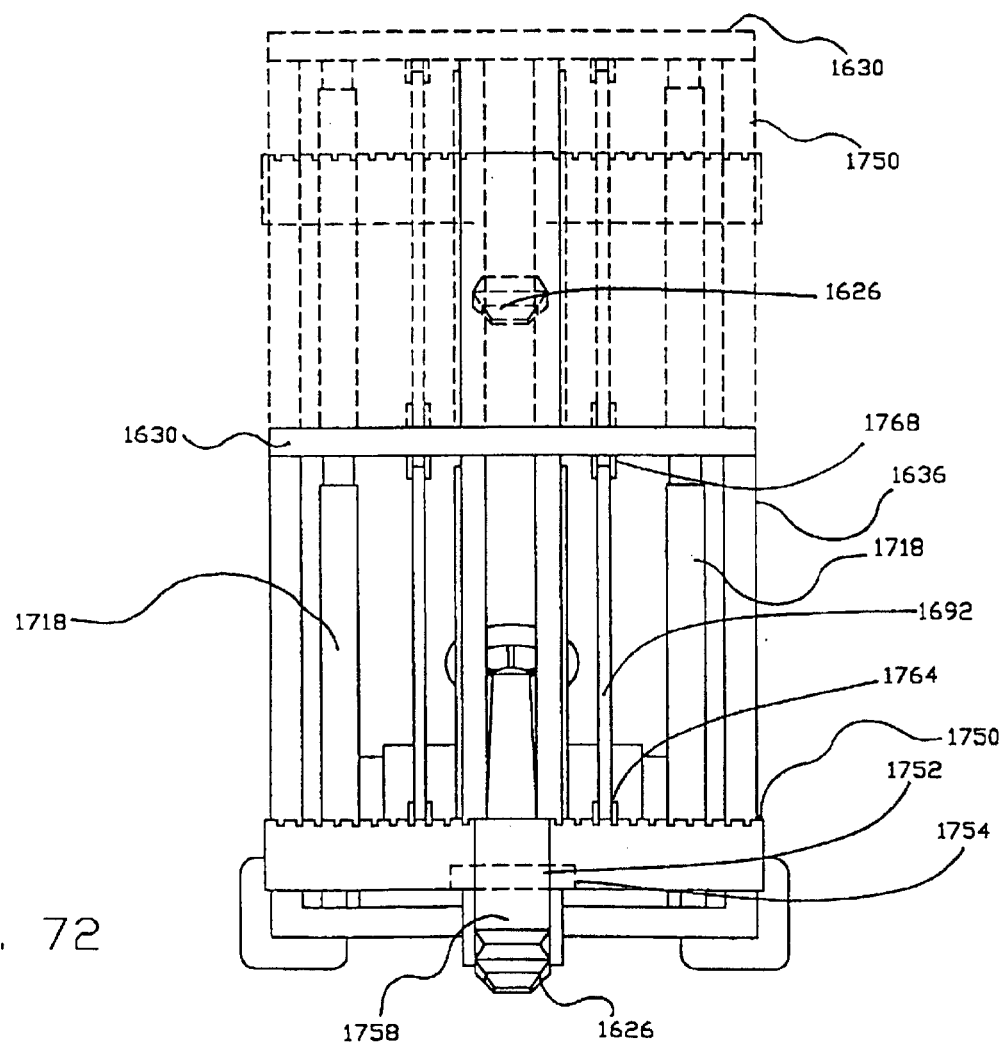

With respect to FIG. 72 of the drawings and in accordance with another embodiment of the releasable connection between the boom and fork bar with the locking pins on the boom and being selectively extended into circular openings in the fork bar, an extension 1758 of the boom 1626 is shown locked to a fork bar 1750 by the hydraulic lock 1752 and locking pins 1754. The fork bar 1750 is connected by brackets 1764 to cables or chains 1692. The chains 1692 pass through pulleys 1768 attached to the internal frame 1630 and are fixably connected to the external frame 1636. The internal frame 1630 rides within the external frame 1636. The internal frame 1630 is raised and lowered through the use of hydraulic cylinders 1718 mounted on each side of the internal frame 1630. This configuration also shows that the boom 1626 may be raised and lowered with the fork bar 1750 in a standard forklift type configuration.

Figure 73:
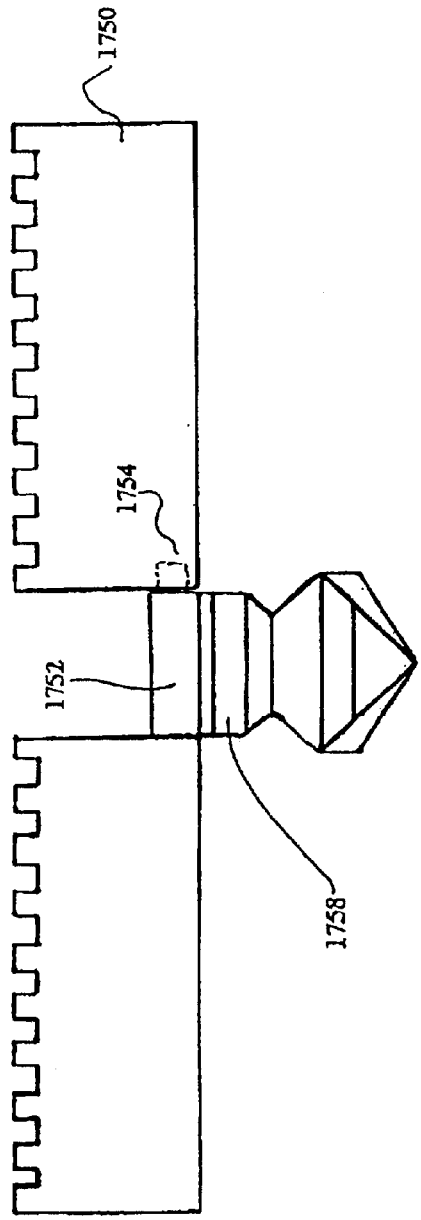

FIG. 73 of the drawings shows the fork bar 1750 connected to the boom 1626. This embodiment shows the boom extension 1758 connected to the fork bar 1750 by the lock 1752 and extending pins 1754.

Figure 74:
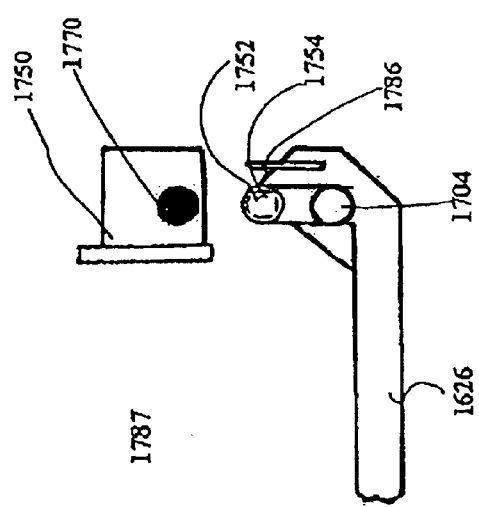

With respect to FIG. 74 of the drawings, a side view of the fork bar 1750 and boom 1626 connection may be seen. The boom 1626 is connected to the fork bar 1750 through the use of hydraulic lock 1752 and pins 1754. Additionally shown in this drawing are the guide wheels 1704 which help the vertical alignment of the boom 1626 while it is being moved. In addition, a connecting wear plate 1786 is also shown. Note that the boom 1626 has an angular support member 1787 to connect the horizontal and vertical portions of the boom 1626.

Figure 75:
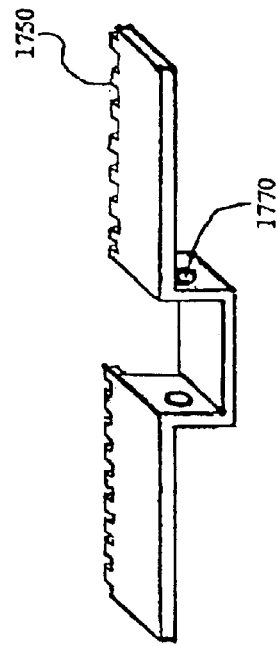

With respect to FIG. 75 of the drawings, a perspective view of the fork bar 1750 and holes 1770 is shown.

FIG. 76 of the drawings shows a side view of vehicle 1625 with a connection as described in FIGS. 66–71 or 72–75. Note that the layout of the cables or chains 1692 and pulleys 1768 may be seen in this drawing as previously described in other embodiments. In addition, the external frame connecting point 1790 for the chains 1692 may be seen.

Figure 77:
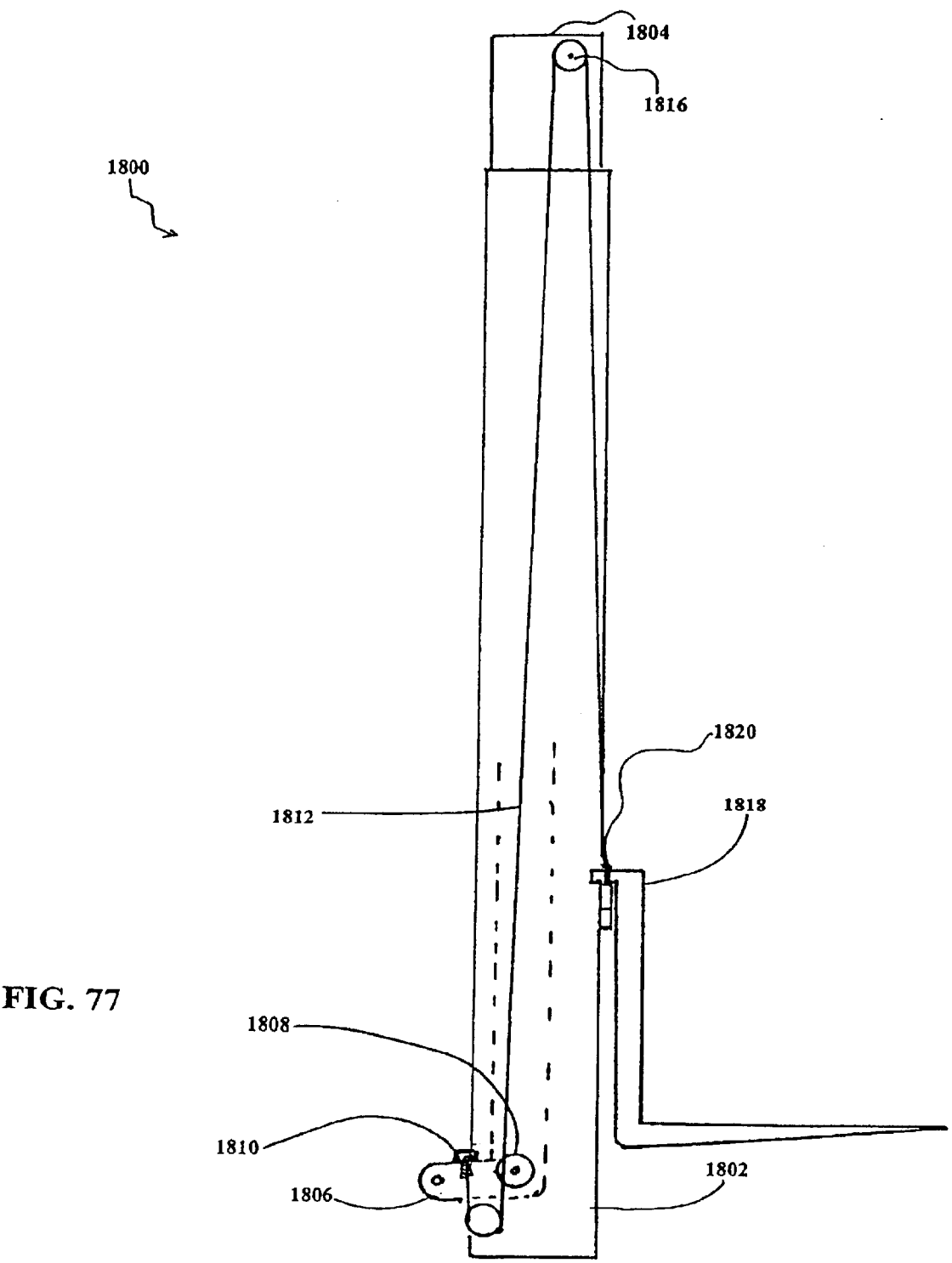
FIGS. 77–81 are schematic representations of the boom and fork assembly in accordance with selected examples of the present invention.

FIG. 77 of the drawings shows another embodiment of a shopping cart collection and forklift system generally designated by the numeral 1800. In this drawing, boom 1806 has been pivoted around point 1808 into a vertical position. The boom 1806 is housed within internal frame 1804 of the collection system 1800. The internal frame 1804 is housed within external frame 1802. The internal frame is allowed to move vertically within the external frame 1802.

FIG. 77 also shows the use of a chain or cable system to move the fork bar assembly. Chains 1812 pass around respective pulleys or sprockets 1814 to stationary ends 1810. The chains 1812 also wrap around vertically moving pulleys or sprockets 1816 which are connected to the internal frame 1804. The chains 1812 travel downward from the pulleys 1816 to connect to the fork bar 1818 at points 1820. In this manner, the raising of the internal frame 1804 and pulleys 1816 multiplies the travel of the chains 1812 to make the fork bar 1818 travel faster than the internal frame 1804. While particular embodiments describing cable and chain systems have been mentioned, any type of flexible and strong material such as straps or belts may be used for the connection between the external frame and fork bar.

Figure 78:
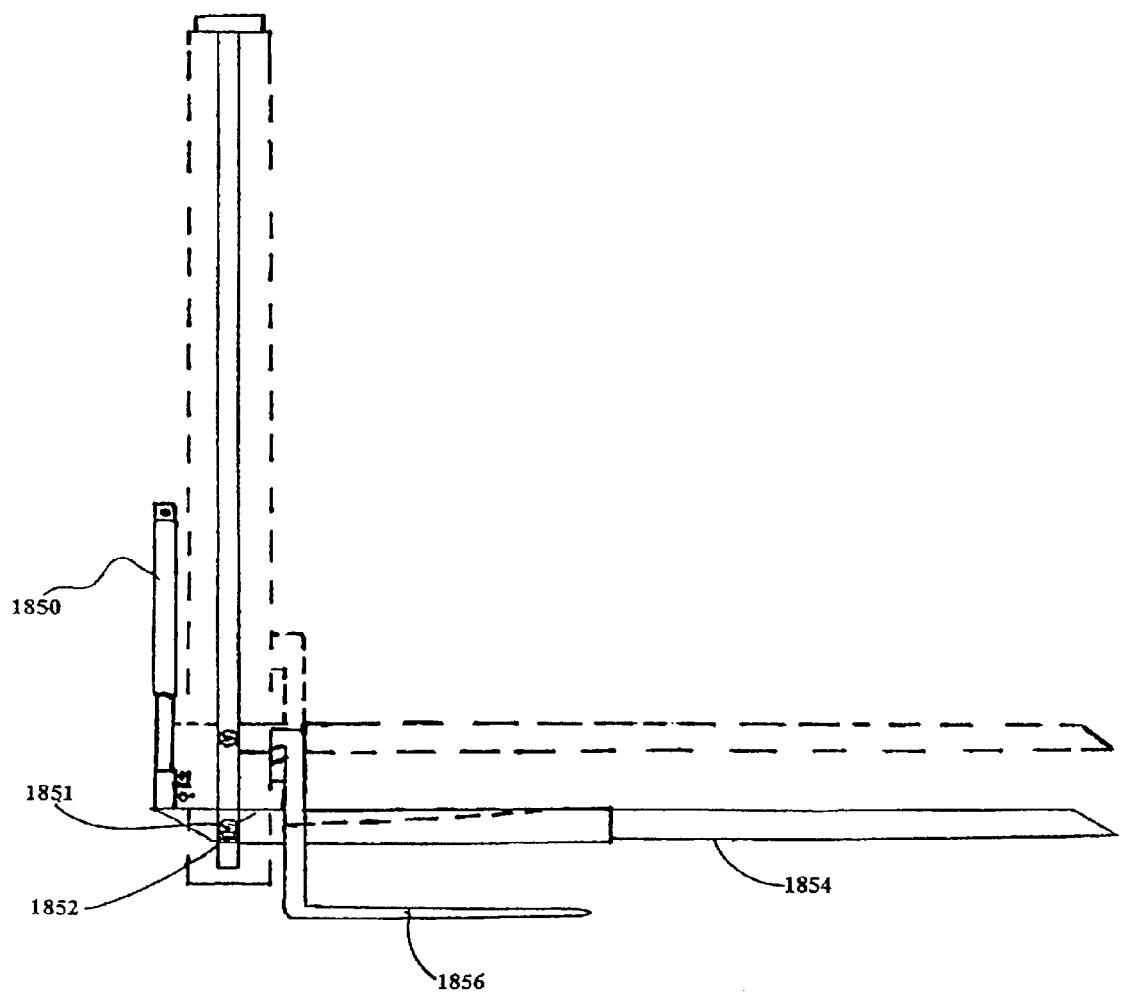
Figure 79:
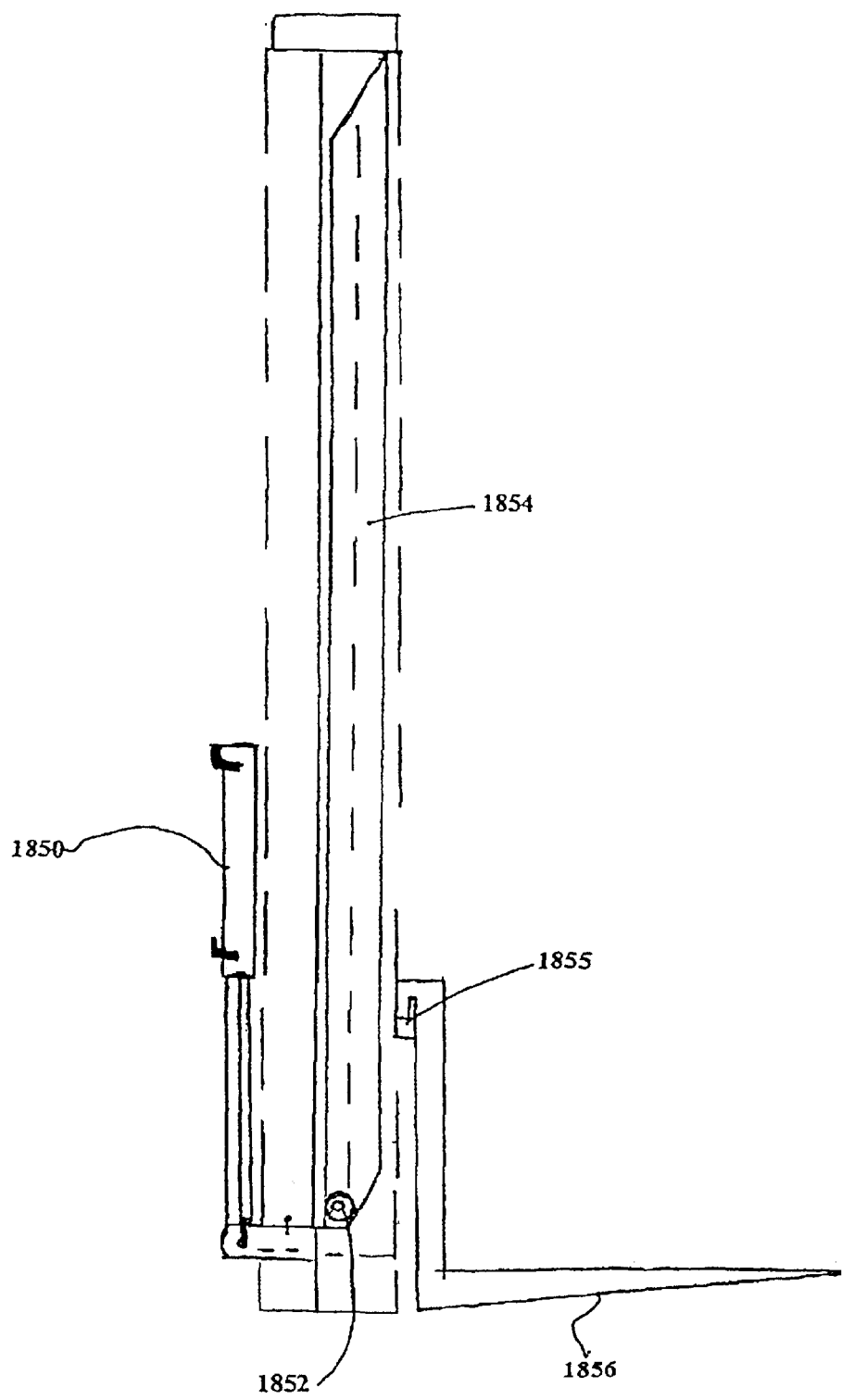

FIGS. 78 and 79 of the drawings show the movement of an extendable boom 1854 around a pivot point 1851 with roller bearings 1852 by the use of an extending hydraulic cylinder 1850. When the ram 1850 is retracted, the boom 1854 is in a lowered horizontal position.

Continued retraction of cylinder 1850 past the point where boom 1854 is horizontal causes upward movement of the boom 1854 and forks 1856.

FIG. 79 of the drawings shows the extension of the hydraulic ram 1850 and the movement of the boom 1854 into a vertical position around pivot point 1852. Note that in FIG. 79, forks 1856 on fork bar 1855 have not been moved by the hydraulic ram.

Figure 80:
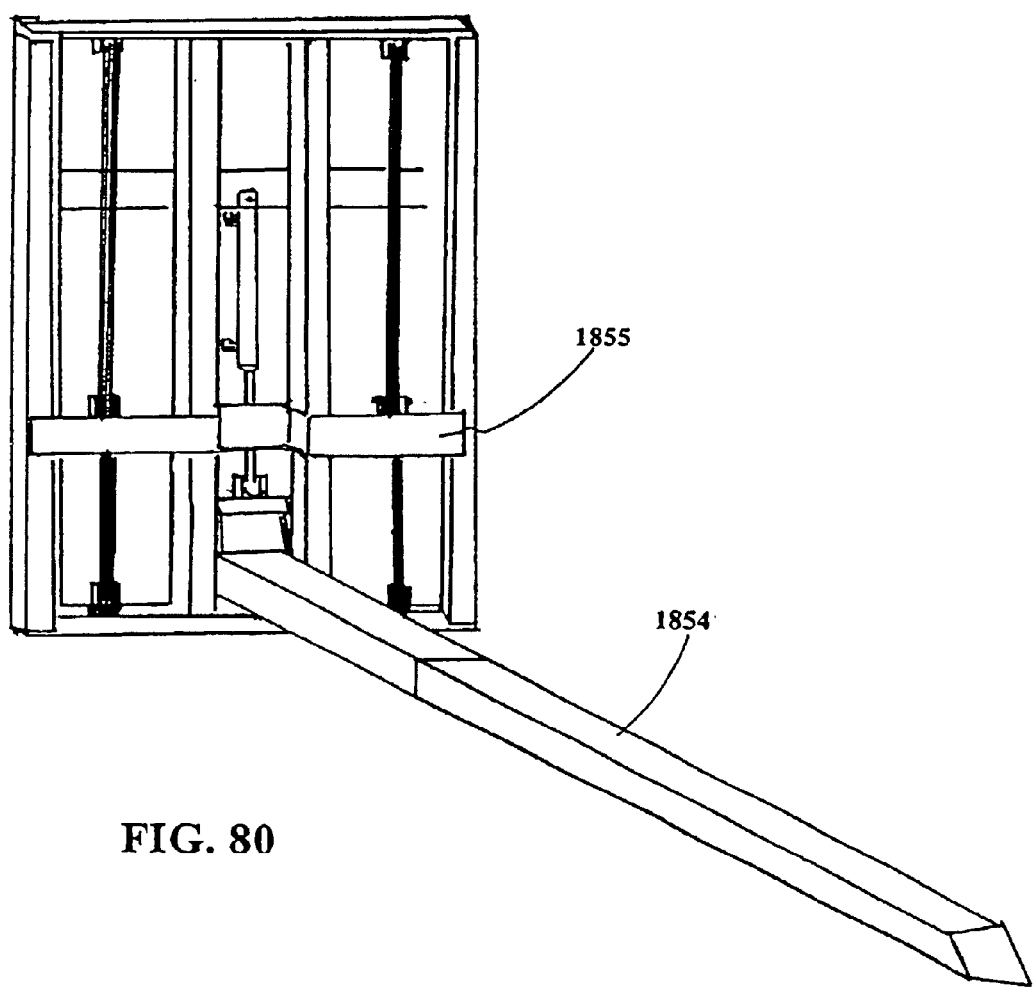
Figure 81:
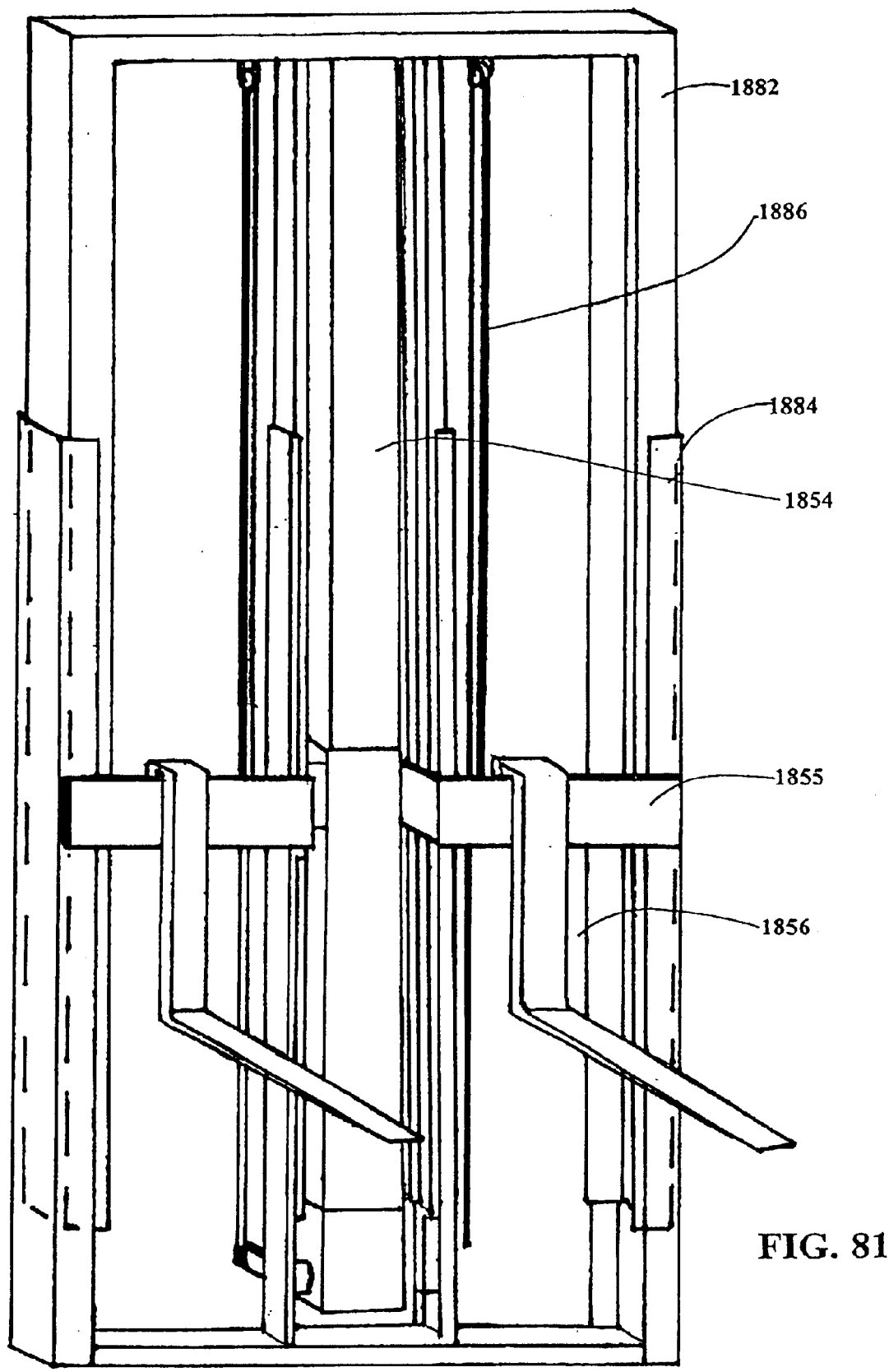

FIGS. 80 and 81 of the drawings show that when the boom 1854 is in the lowered position, it may be used for the collection of shopping carts.

As shown in FIG. 81 of the drawings, when the boom 1854 is in the raised position it can control the movement of internal frame 1882, in comparison to external frame 1884, internal frame 1882 will raise and lower the fork bar 1855 through cable system 1886. Forks 1856 may be mounted on the fork bar 1855. Thus the system may be used as a forklift as well as a shopping cart collection system. Note the efficiency of design when using an extension of the boom 1854 to expand the capacity of the shopping cart collection system as well as using the extension of the boom 1854 in a raised position to control the movement of the fork bar 1855 and forks 1856.

FIG. 82 of the drawings shows a particular example of frame members for the self-propelled vehicle generally designated by the numeral 1900.

Figure 83:
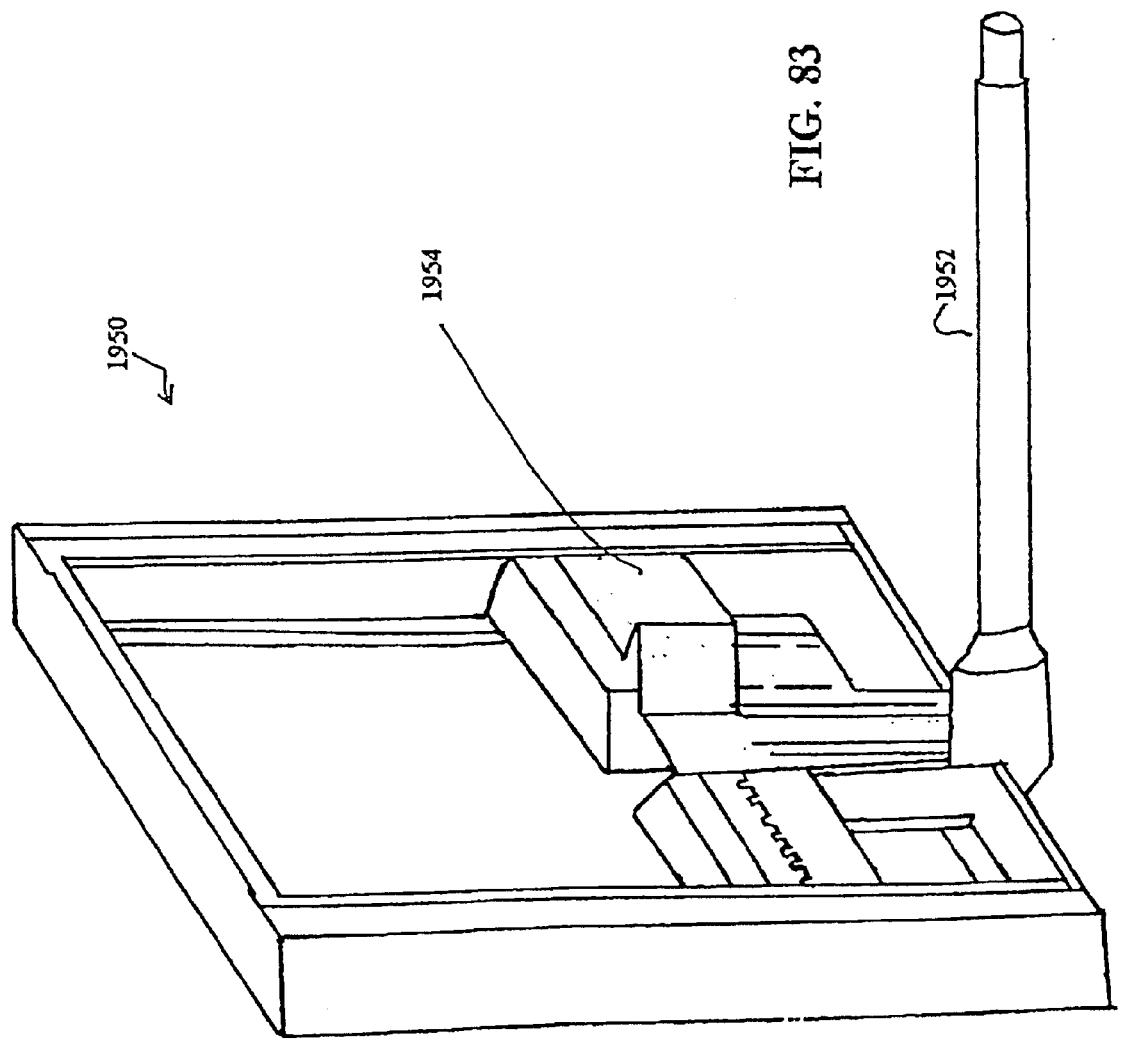
FIGS. 83 and 84 are respective perspective view illustrations with a lowered circular boom or shaft in retracted and extended positions in accordance with another example of the present invention.

With respect to FIG. 83 of the drawings, a circular extendable boom or extendable shaft 1952 and recessed fork bar 1954 of a system 1950 is shown.

Figure 84:
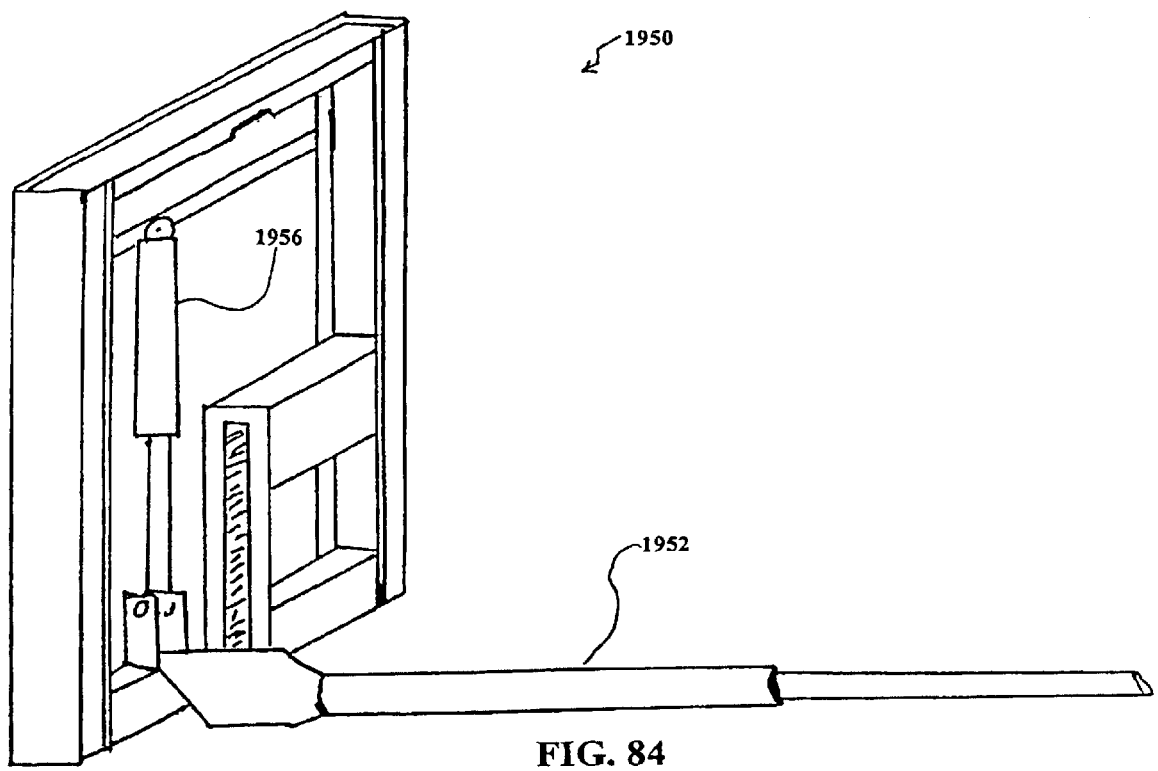

FIG. 84 of the drawings shows that the boom 1952 of system 1950 is raised and lowered by a cylinder 1956.

Figure 85:
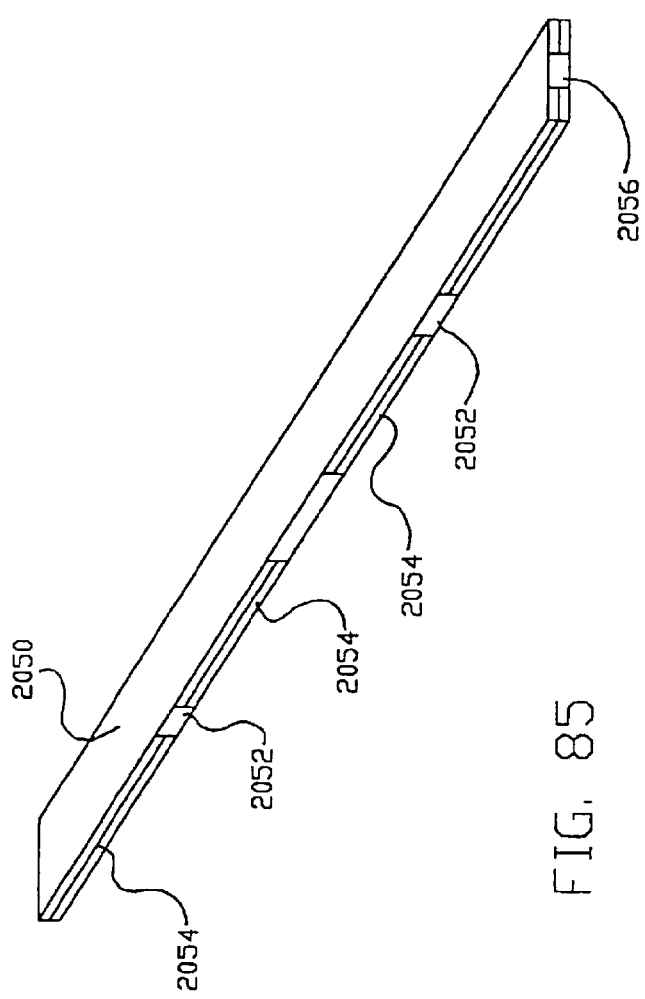
FIGS. 85 and 86 are schematic perspective and front view illustrations of a safety light bar in accordance with one embodiment of the present invention.

With respect to FIG. 85 of the drawings, a long safety light bar is generally designated by the numeral 2050. Along light bar 2050 are take downs 2052, strobes 2054, and alley lights 2056 on each end.

Figure 86:
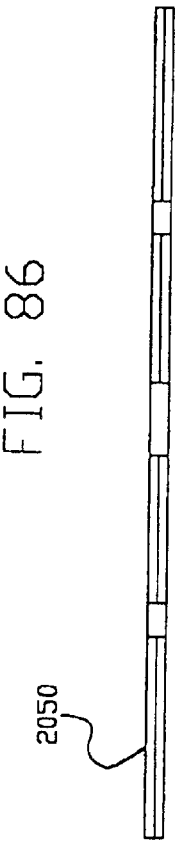

FIG. 86 of the drawings shows the same light bar shown in FIG. 85 from a front view.

Figures 87, 88:
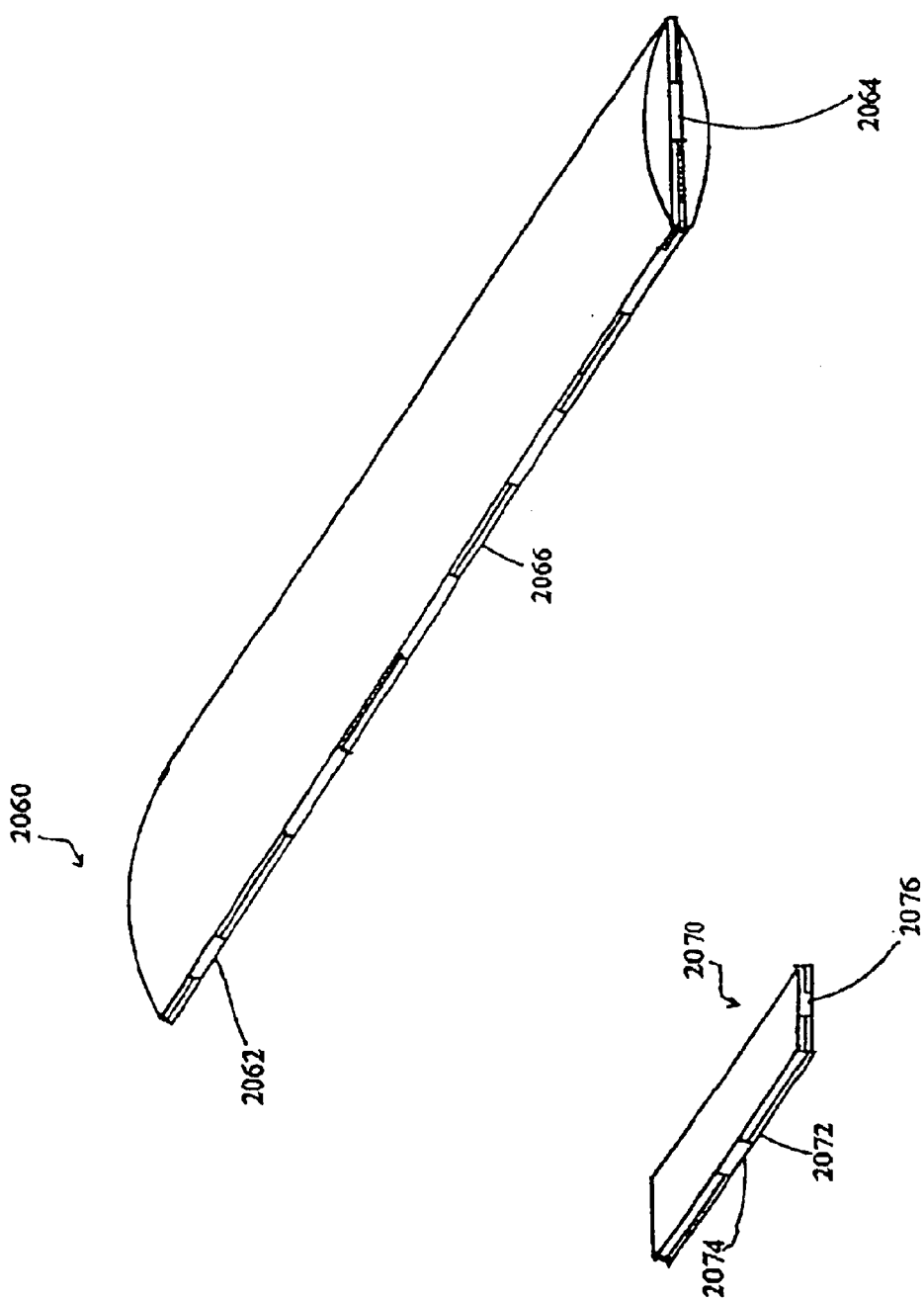
FIG. 87 is a perspective view illustration of a safety light bar in accordance with another embodiment of the present invention.
FIG. 88 is a perspective view representation of a mini-light bar in accordance with still another embodiment of the present invention.
Figure 91:
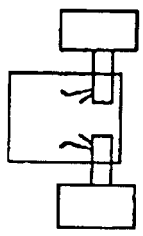
FIG. 91 is a partially fragmented top plan view of the wheel assembly of the vehicle of FIG. 89.
Figure 90:
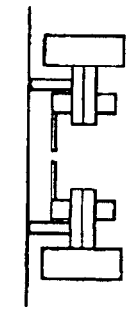
FIG. 90 is a partially fragmented front elevational view of the wheel assembly of the vehicle of FIG. 89.
Figure 89:
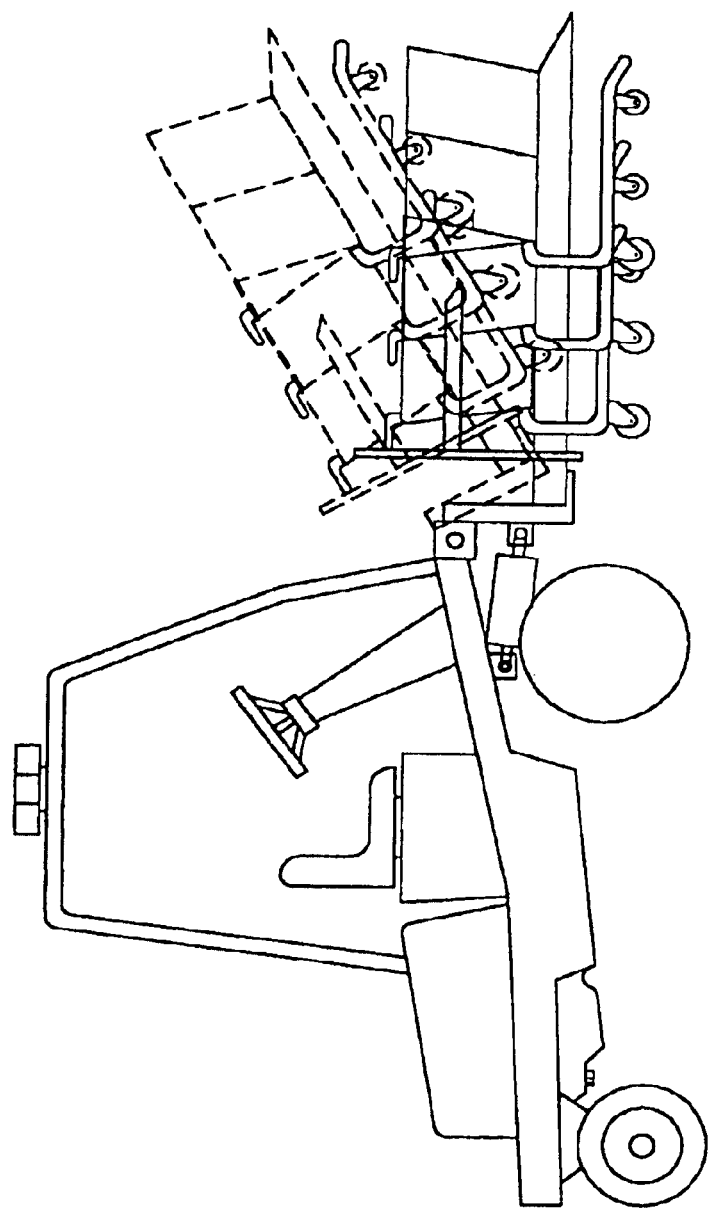
FIG. 89 is a side view representation of a shopping cart collection vehicle in accordance with another embodiment of the present invention.
Figure 92:
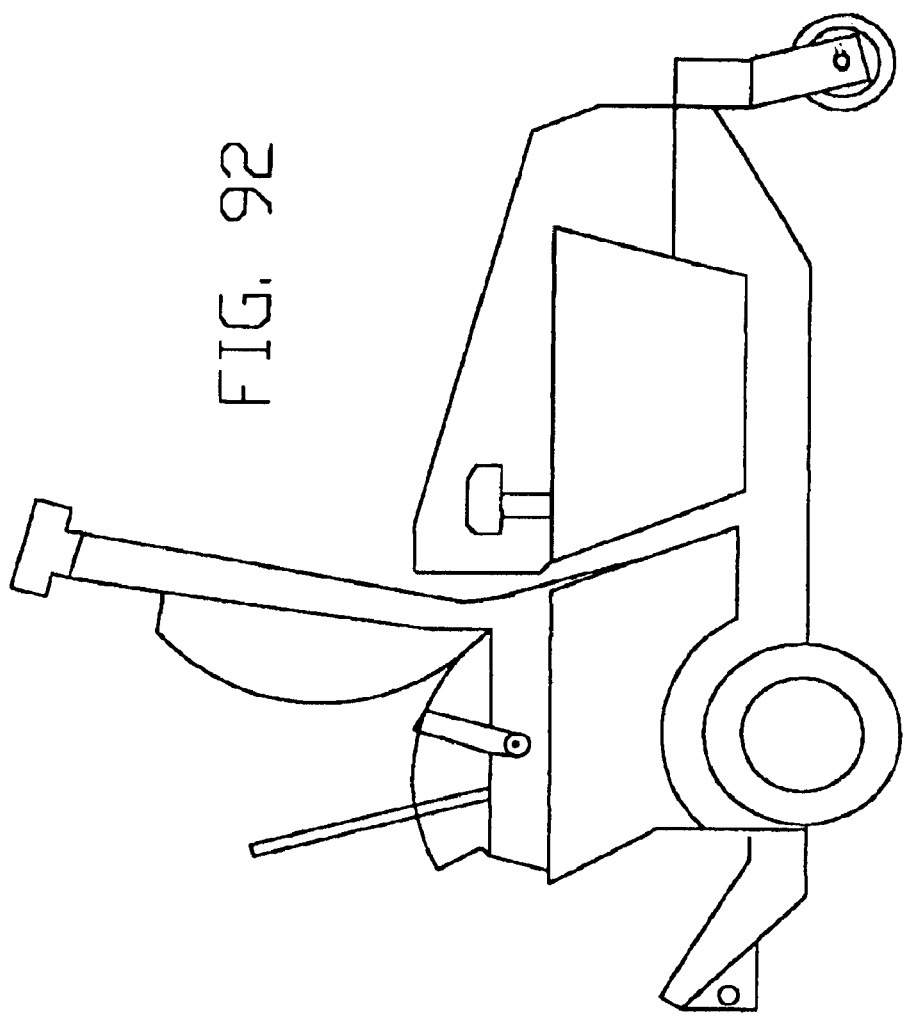
FIG. 92 is a side view representation of a shopping cart collection vehicle in accordance with another embodiment of the present invention.
Figure 93:
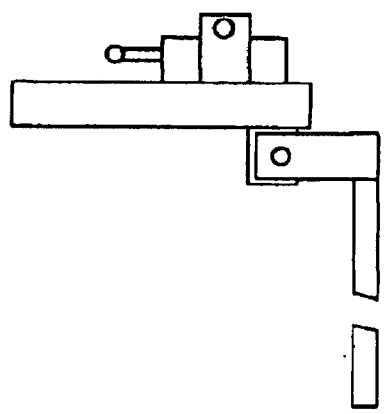
FIG. 93 is a partial schematic perspective view illustration of a cantilever boom structure with the boom in the lower cart collecting operative position.
Figure 94:
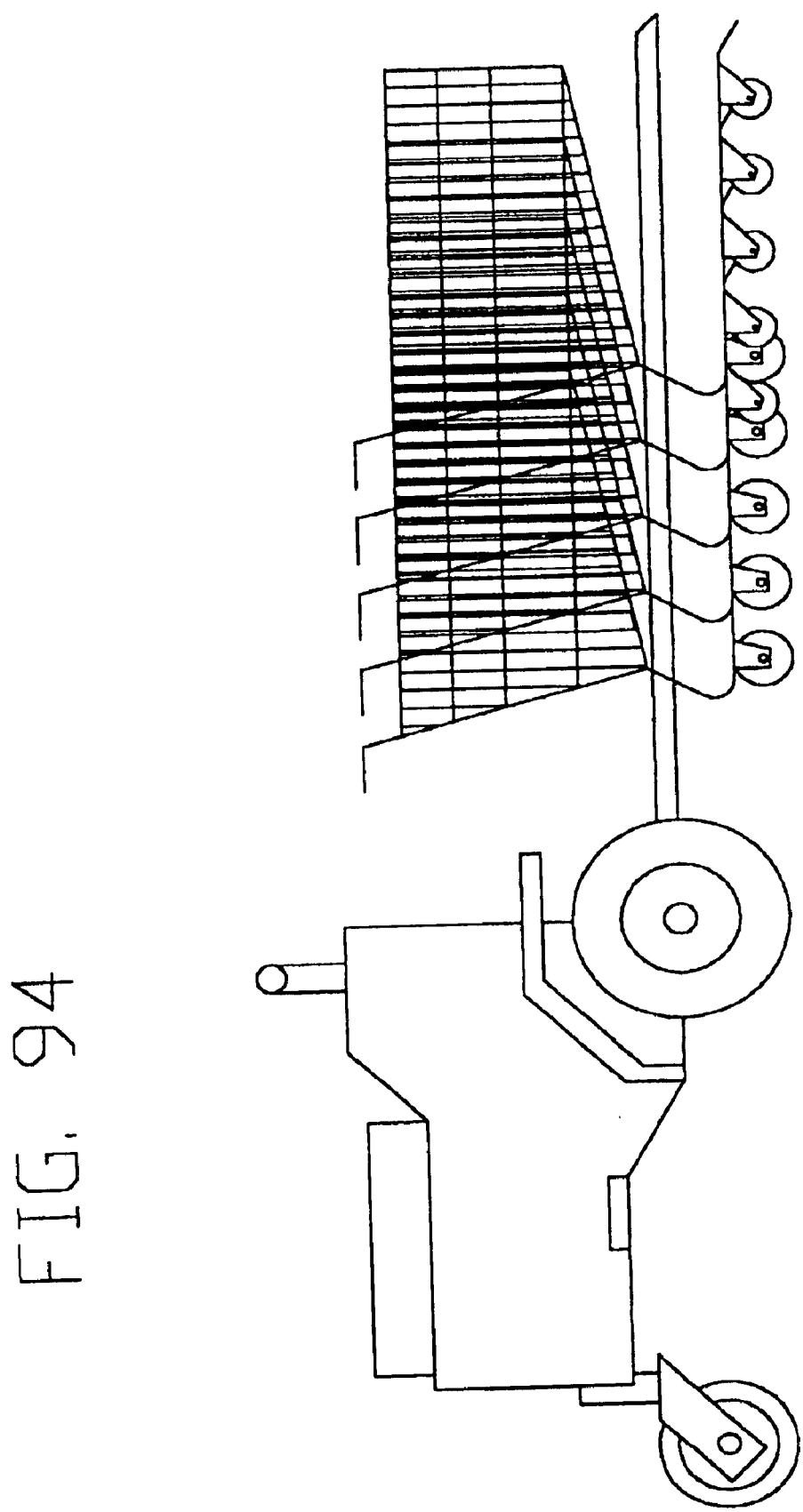
FIG. 94 is a side view representation of a shopping cart collection vehicle in accordance with another embodiment of the present invention.
Figure 96:
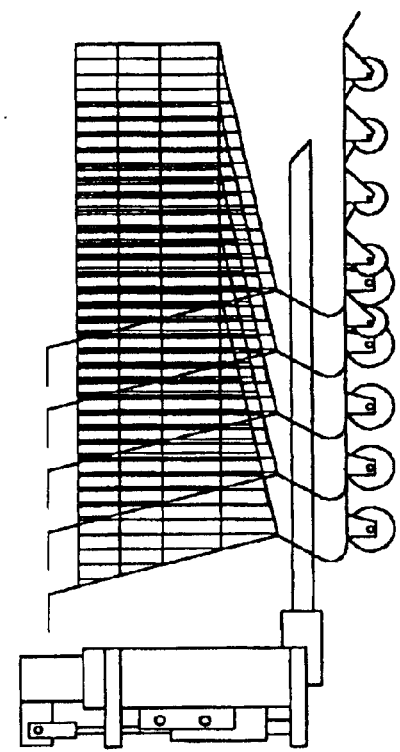
FIG. 96 is a partial schematic perspective view illustration of a cantilever boom structure with the boom in the lower cart collecting operative position.
Figure 95:
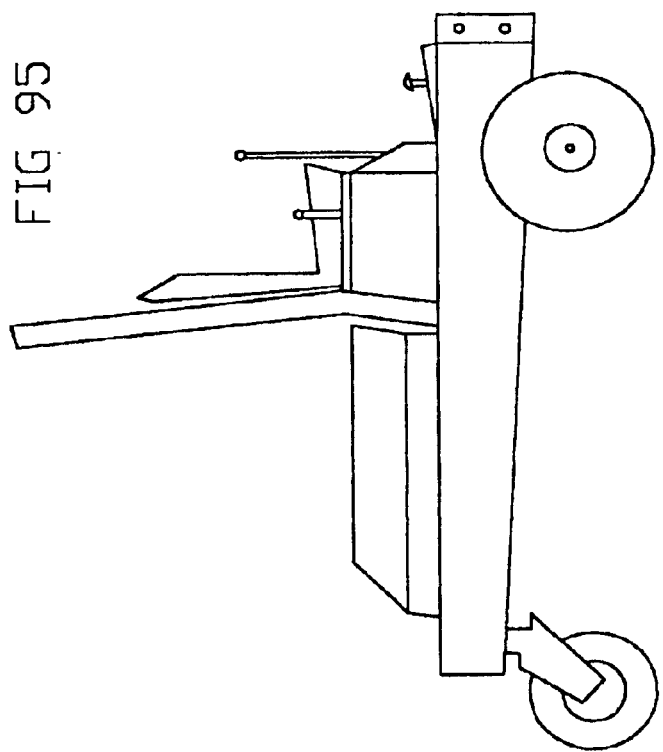
FIG. 95 is a side view representation of a shopping cart collection vehicle in accordance with another embodiment of the present invention.
Figure 97:
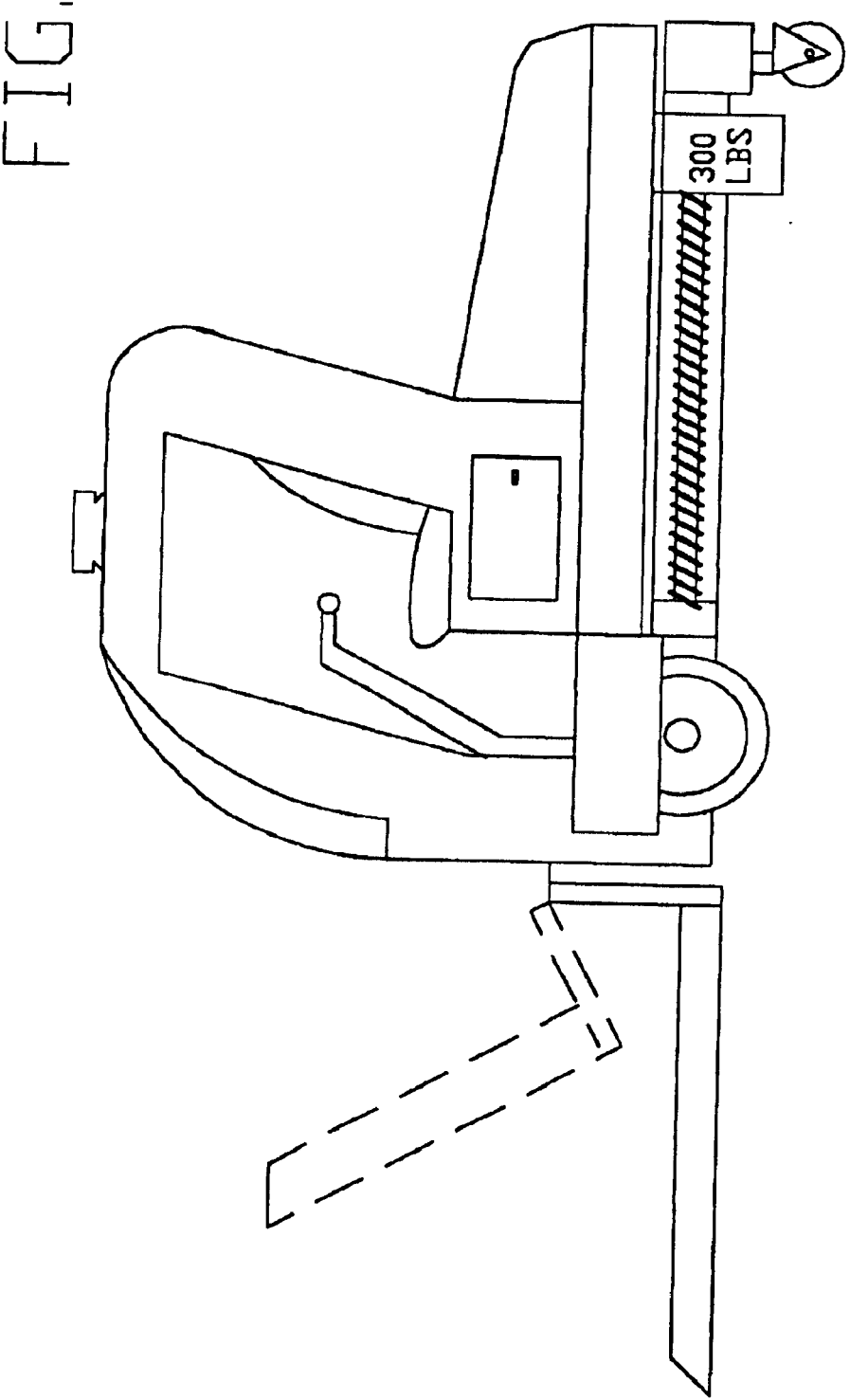
FIG. 97 is a side view representation of a shopping cart collection vehicle in accordance with another embodiment of the present invention.
Figure 98:
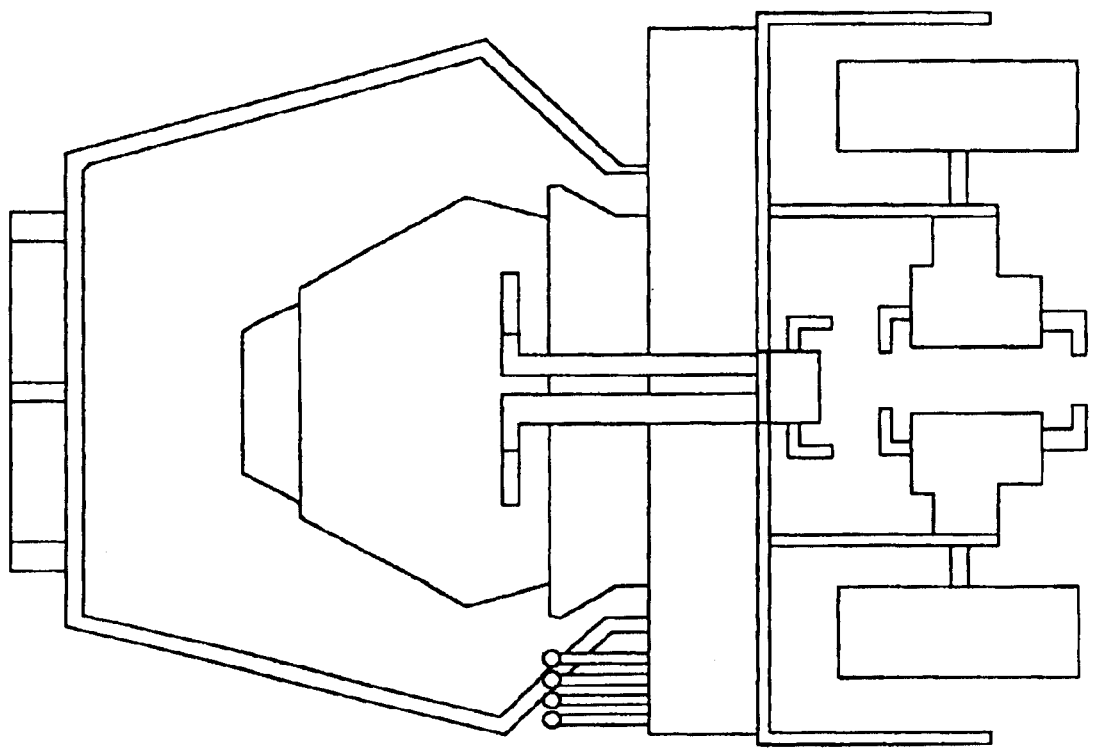
FIG. 98 is a front view illustration of a shopping cart collection vehicle having a front wheel assembly such as shown in FIG. 89.
Figure 100:
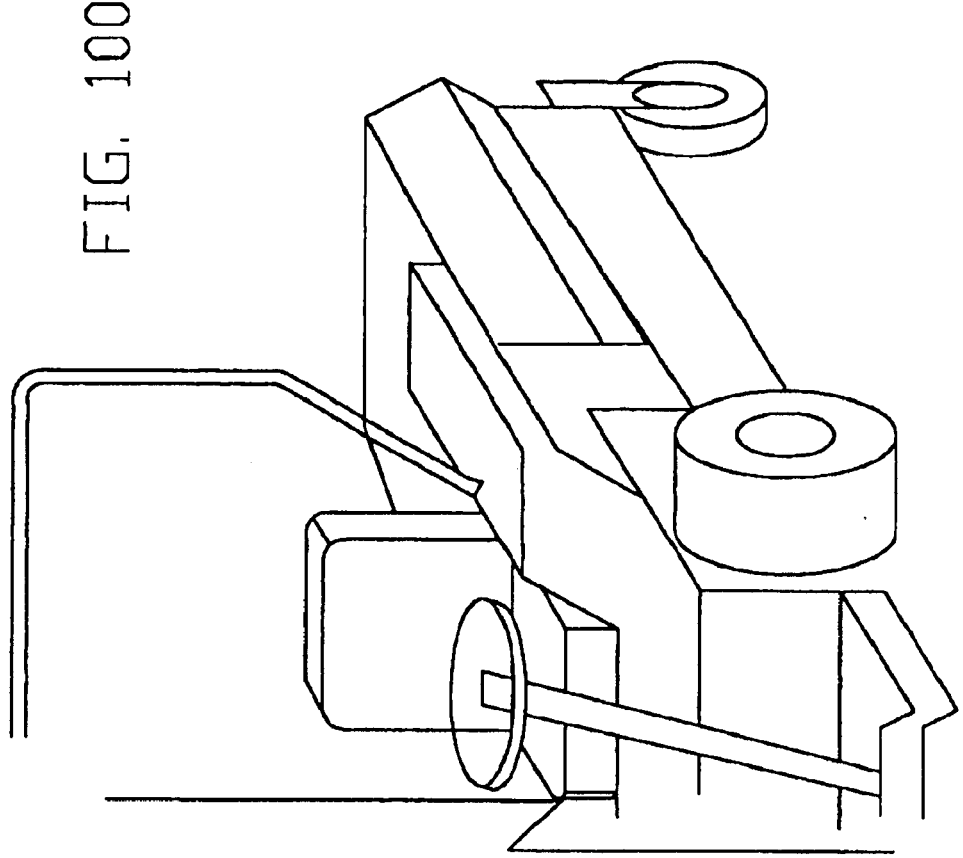
FIG. 100 is a perspective view representation with the boom lowered to an operative position and extended.
Figure 99:
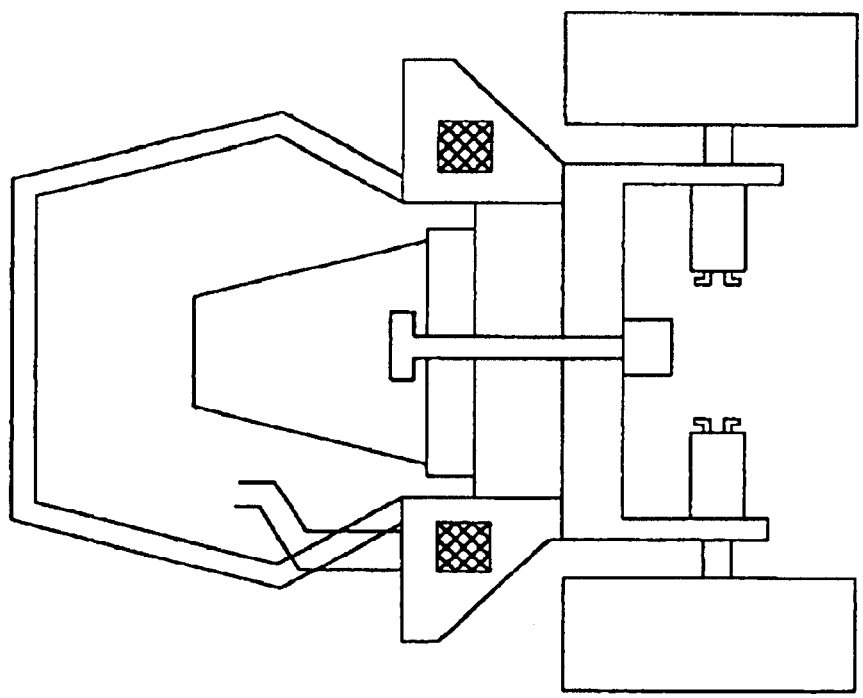
FIG. 99 is a front view illustration of a shopping cart collection vehicle having a front wheel assembly such as shown in FIG. 89.

FIG. 87 of the drawings shows an aero-dynamic light bar 2060. This light bar 2060 also includes strobes 2062 and alley lights 2064. Additionally the aero-dynamic bar 2060 is shown with mounting brackets 2066.

With respect to FIG. 88 of the drawings, a mini-light bar is shown designated by the numeral 2070. This mini-light bar 2070 also includes strobes 2072, take downs 2074, and alley lights 2076.

The present invention is directed to a shopping cart collection vehicle for automating the collection, transportation, and storage of various types of shopping carts, carriers, or the like. The shopping cart collection vehicle is a manned vehicle which supports an operator, for example, in a seated position as shown in FIGS. 1–3 of the drawings. The shopping cart collection vehicle includes an articulated and extendable or retractable shopping cart support device (boom, arm, lift, cylinder, or shaft) adapted to be received through or under the shopping carts and which is adapted to be raised to raise the shopping carts up off the ground prior to transportation or movement of the carts from, for example, a parking lot to a store or building. Hence, the shopping cart collection vehicle of the present invention does more than just push a stack of nested shopping carts through a parking lot.

Also, the shopping cart collection vehicle of the present invention is designed to allow a single operator to efficiently and safely collect, transport, and/or store a plurality of shopping carts or the like utilizing one or more elongated shopping cart support devices, booms, arms, or the like which are adapted to receive the shopping carts, raise the shopping carts off the ground so that the wheels of the carts are not damaged or worn during transport, so that the carts are not jammed together and damaged during collection and movement, and are easy to separate after delivery to the store or building.

Also in accordance with the present invention, top or side rails may be used to prevent the carts from tipping from side to side while supported on the shopping cart support device.

Figure 102:
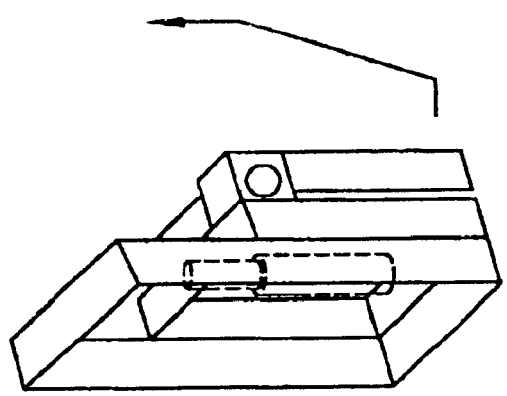
FIGS. 101 and 102 are respective schematic representations of the lift mechanism assemblies of the vehicle of FIG. 89.
Figure 101:
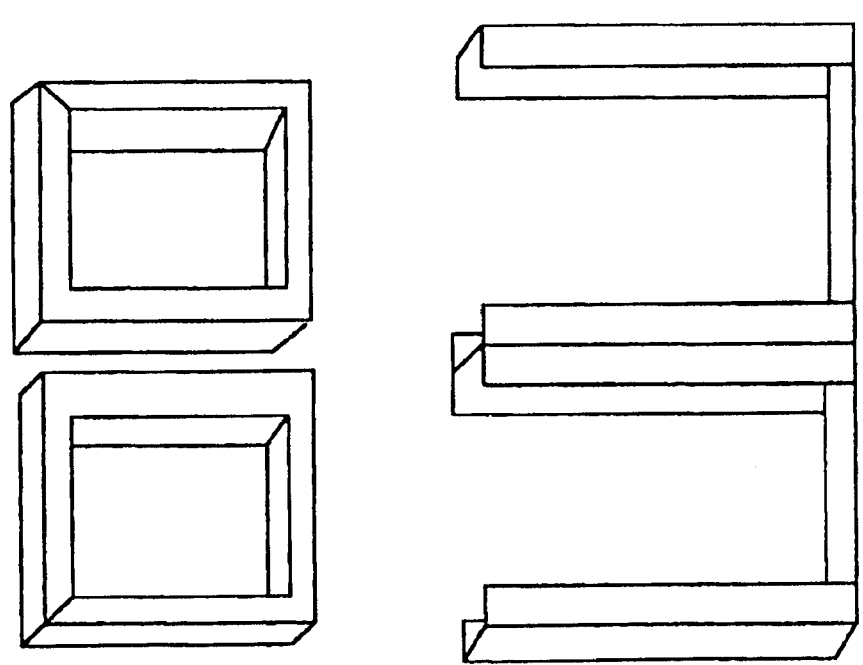
Figure 104:
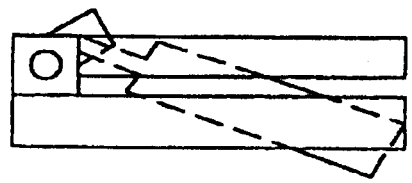
FIGS. 103 and 104 are respective schematic representations of the alternative lift mechanism assemblies of the vehicle of FIG. 89.
Figure 103:
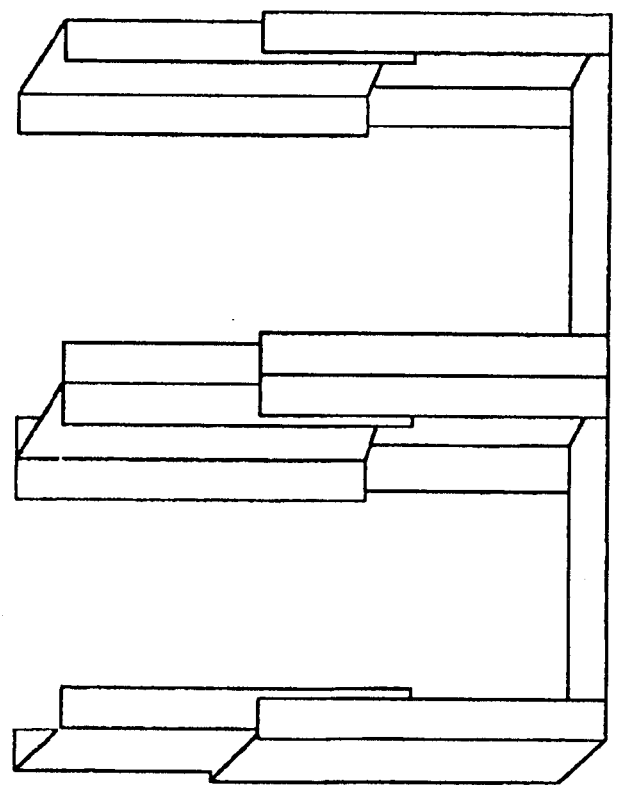
Figure 105:
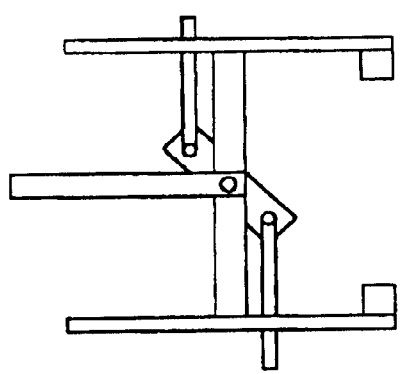
FIGS. 105 and 106 are respective front end and perspective views of the fork bar assemblies of an alternative embodiment of the vehicle of FIG. 89.
Figure 106:
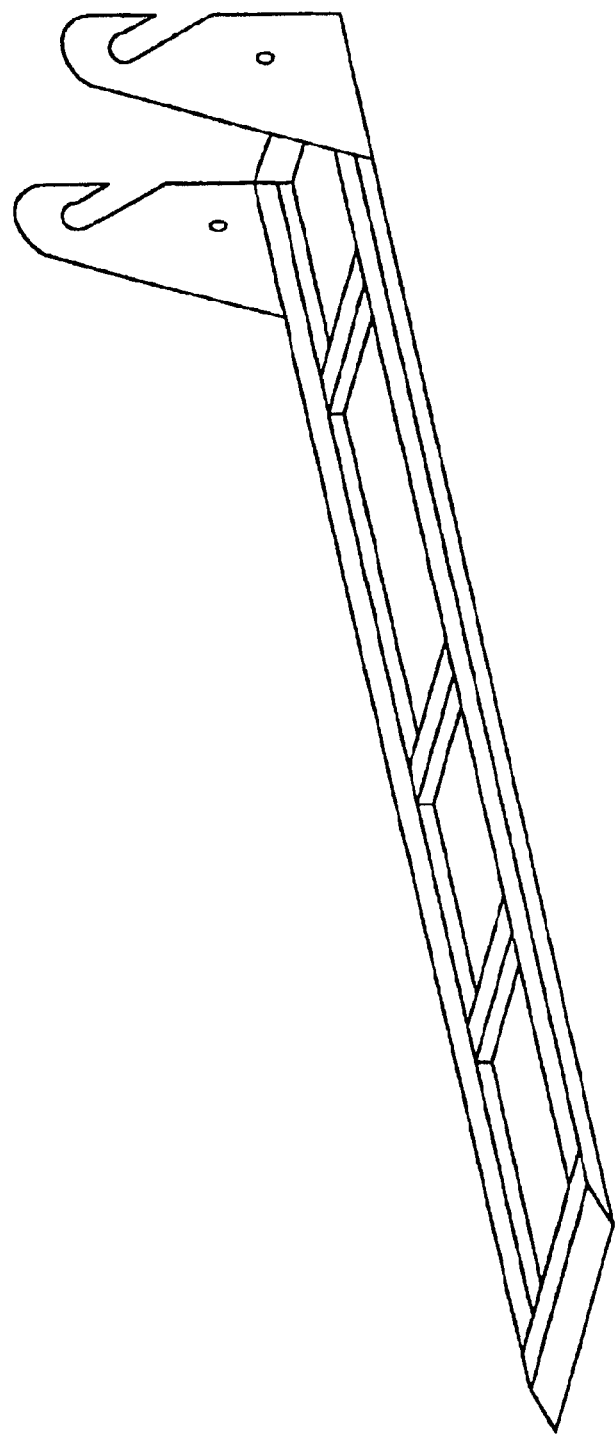
Figure 107A:
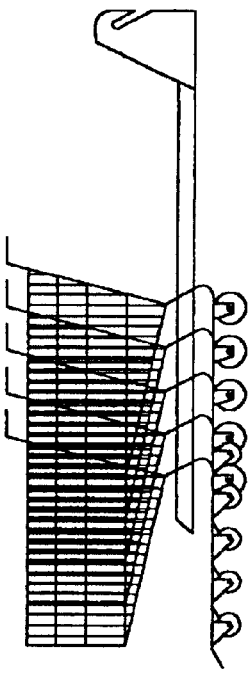
FIGS. 107a and 108a are side elevational view representations of the fork bar assemblies of an alternative embodiment of the vehicle of FIG. 89 showing operation.
Figure 107:
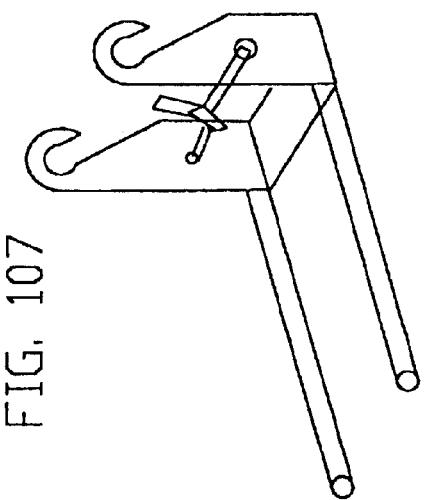
FIGS. 107 and 108 are respective perspective view representations of the fork bar assemblies of an alternative embodiment of the vehicle of FIG. 89.
Figure 108:
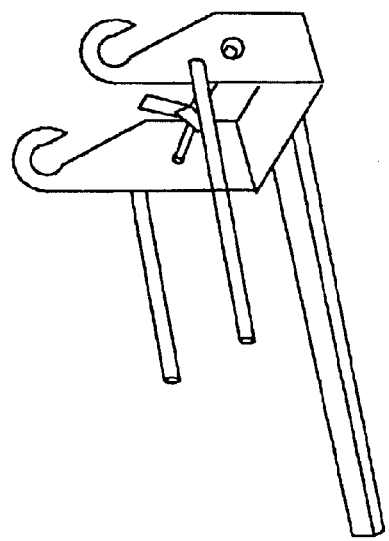
Figure 108A:
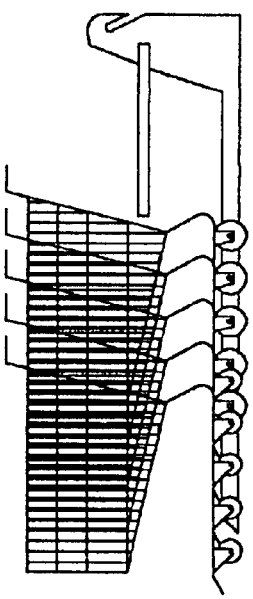
Figure 113:
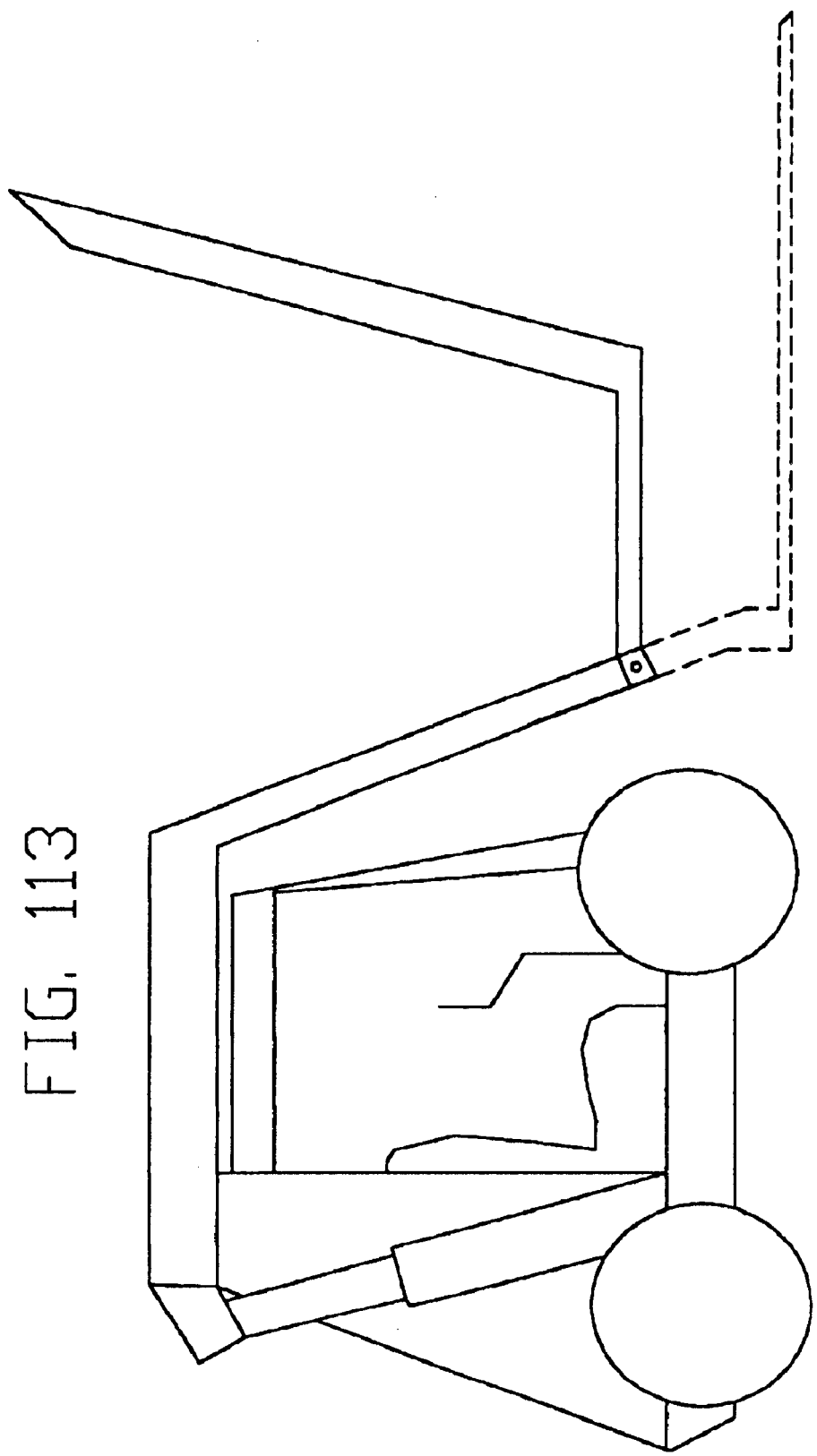
FIG. 113 is a side view representation of a shopping cart collection vehicle in accordance with another embodiment of the present invention.
Figure 114:
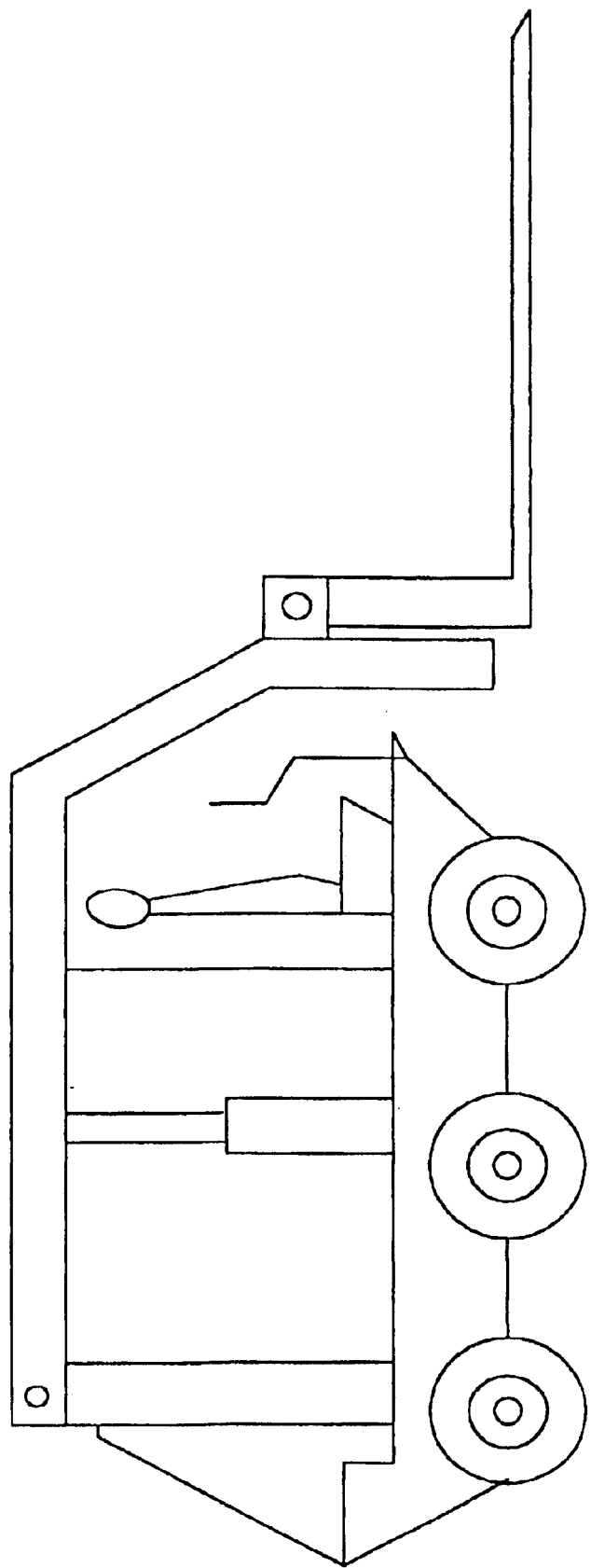
FIG. 114 is a side view representation of a shopping cart collection vehicle in accordance with another embodiment of the present invention.
Figure 115:
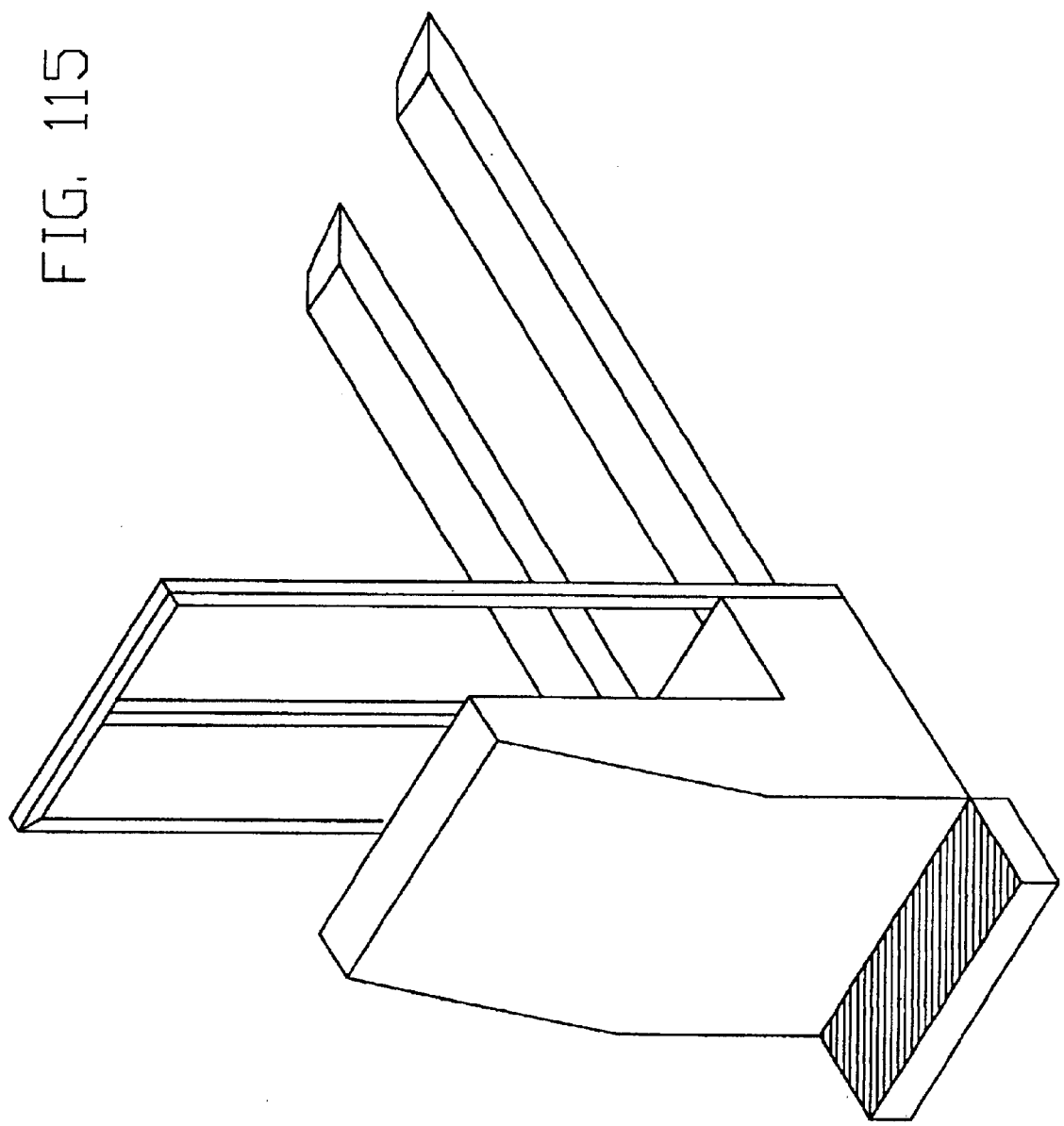
FIG. 115 is a side view representation of a partially fragmented shopping cart collection vehicle wherein the operator stands up during operation in accordance with another embodiment of the present invention.
Figure 116:
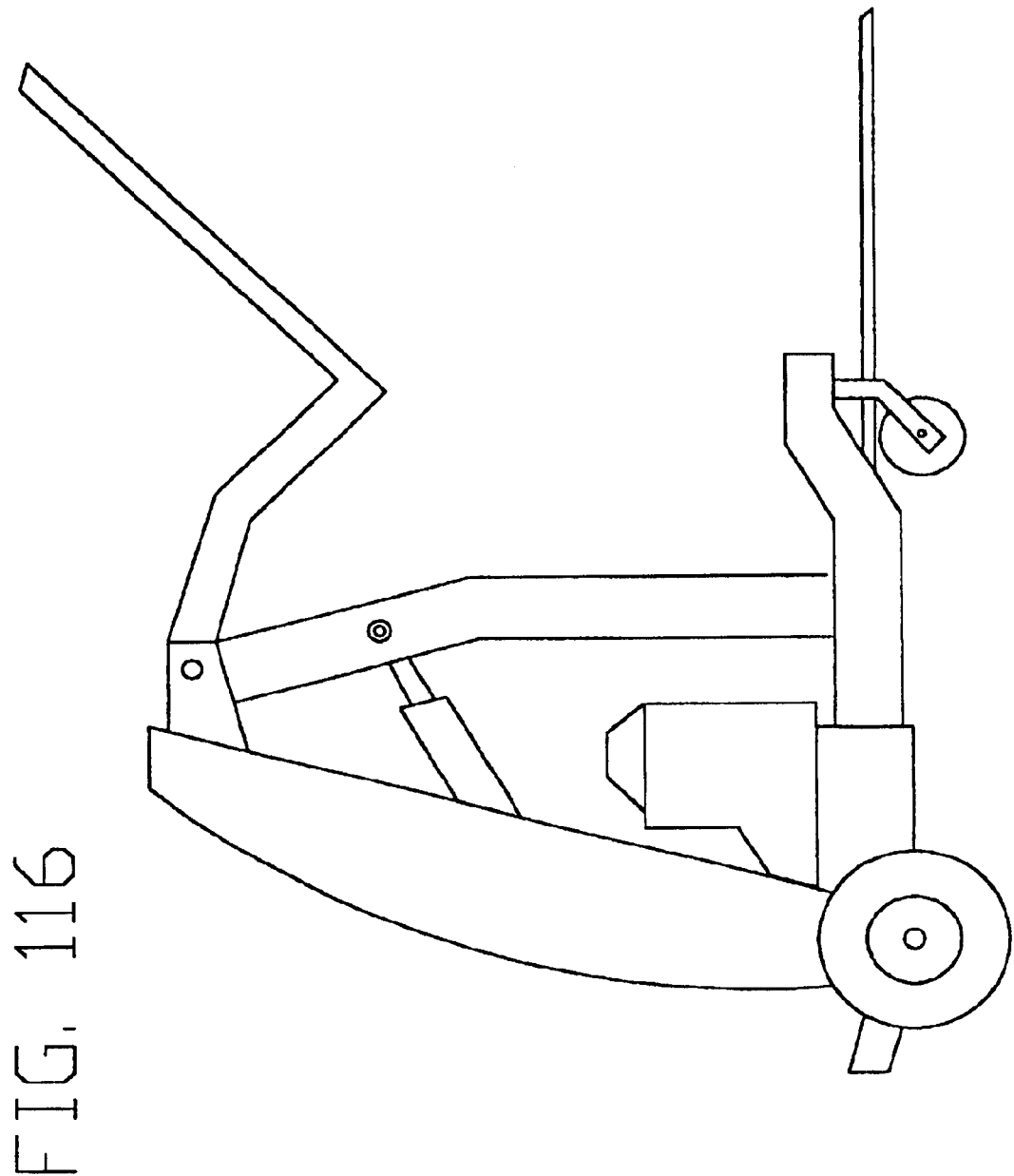
FIG. 116 is a side view representation of a shopping cart collection vehicle in accordance with another embodiment of the present invention.
Figure 117:
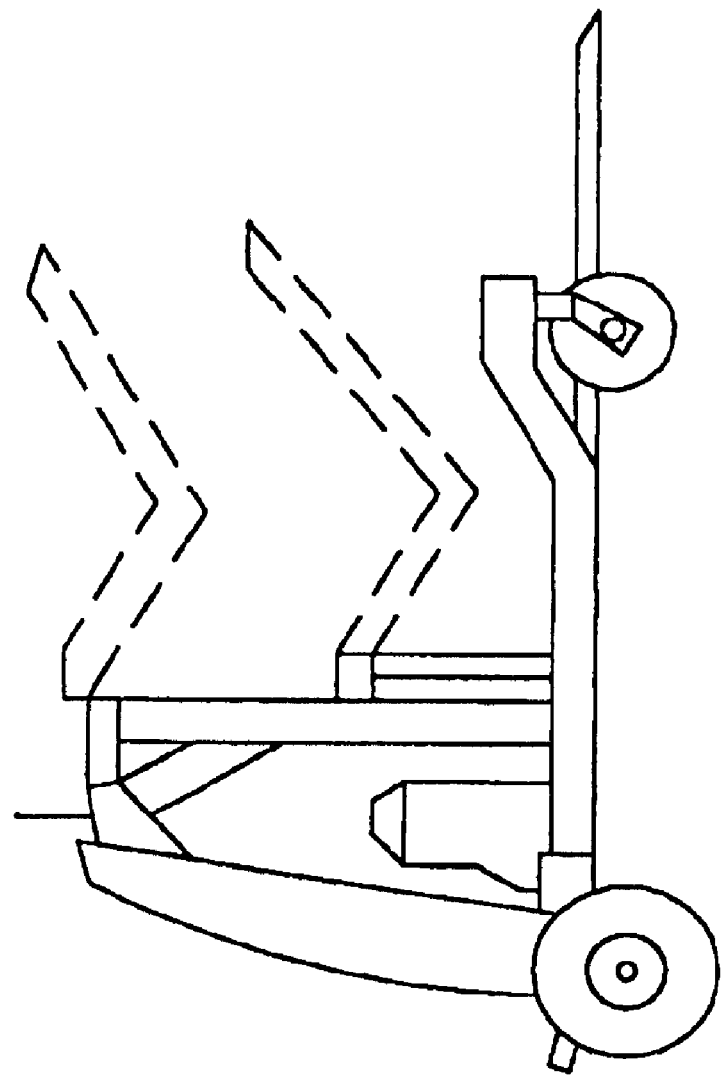
FIG. 117 is a side view representation of a shopping cart collection vehicle in accordance with another embodiment of the present invention.
Figure 119:
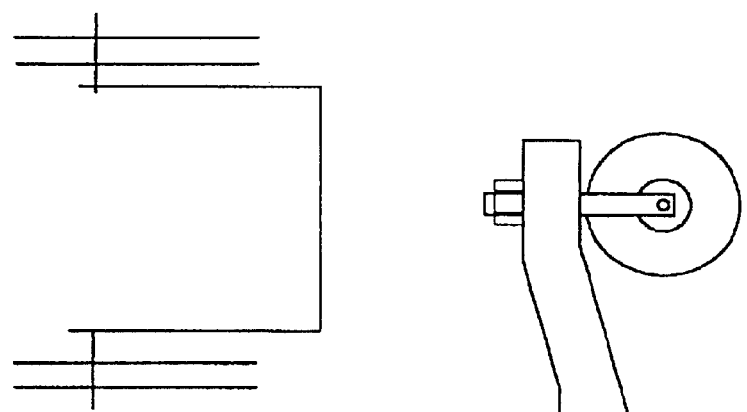
FIG. 119 is a partially fragmented top plan view thereof.
Figure 118:
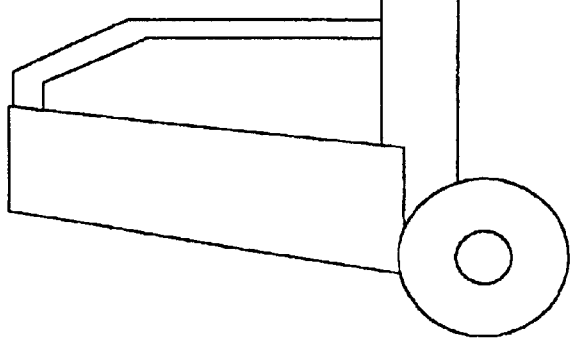
FIG. 118 is an enlarged partially fragmented views of an extendable mechanism for the front wheels.
Figure 120:
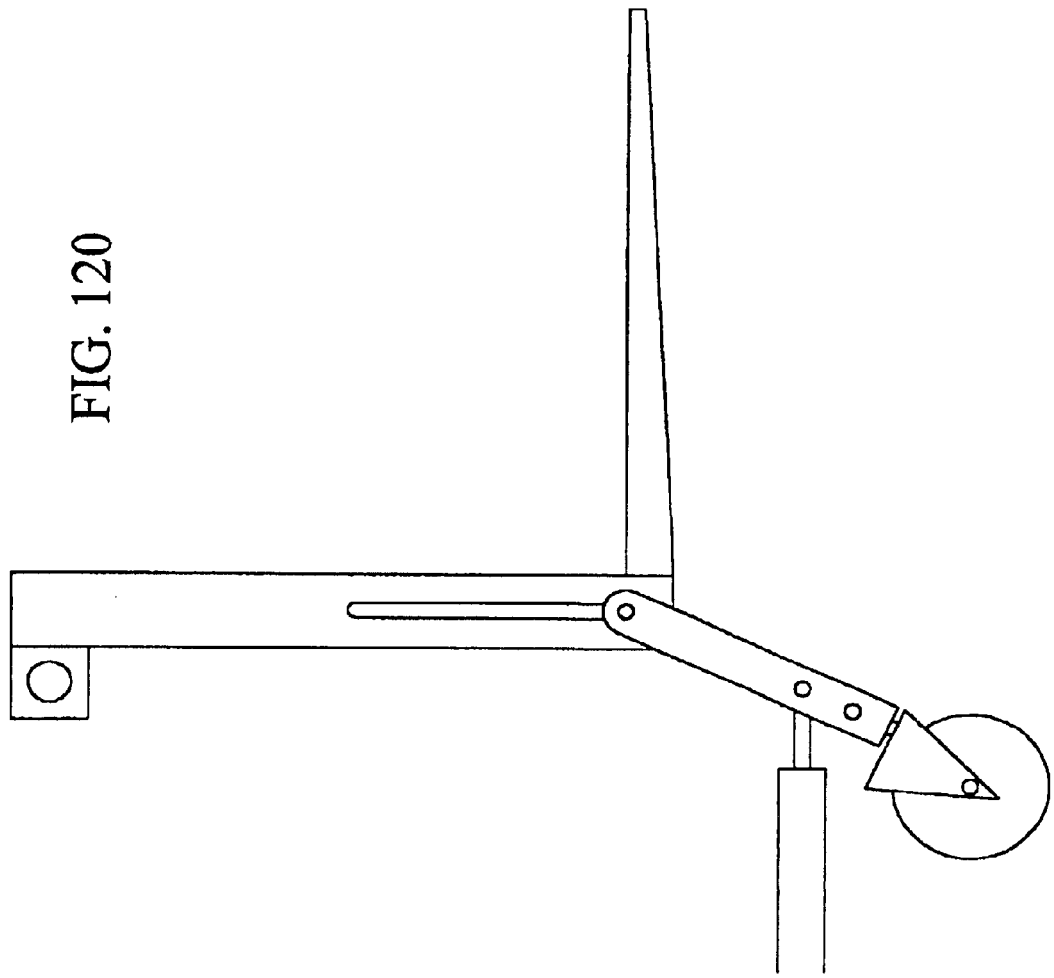
FIG. 120 is an enlarged partially fragmented views of an alternative lift mechanism for the front wheels.
Figure 121:
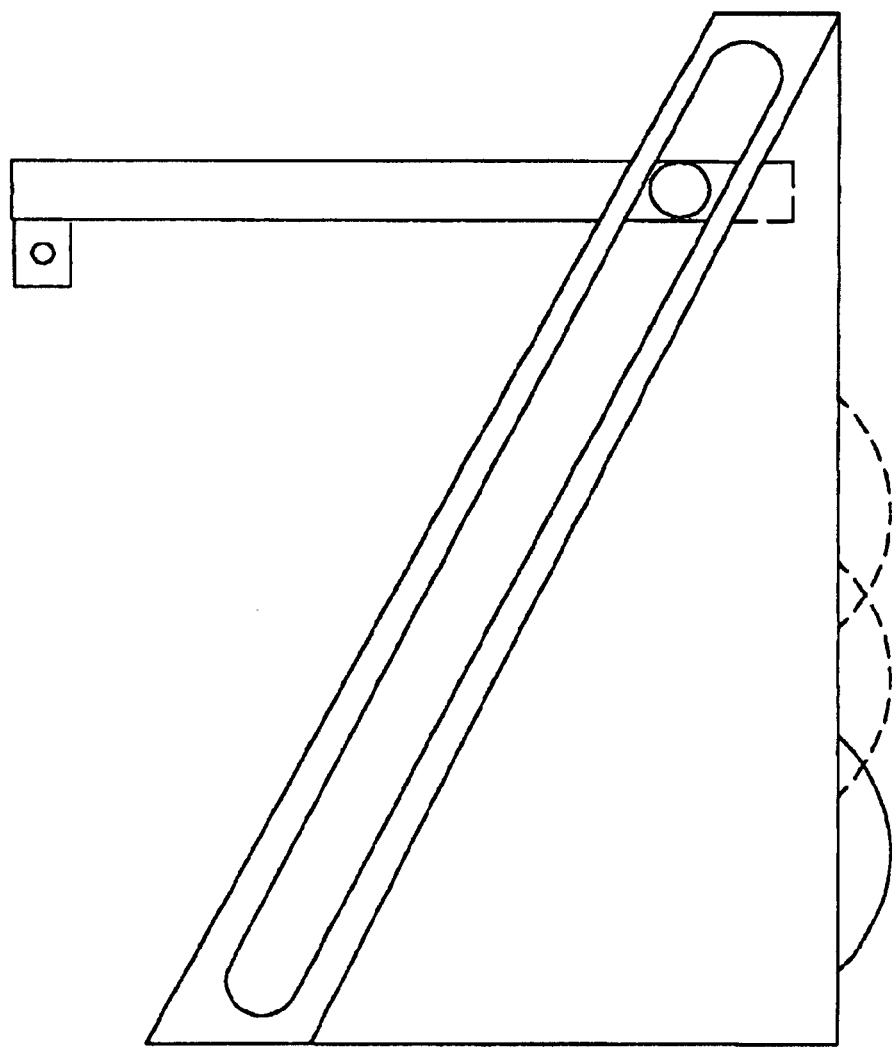
FIG. 121 is an enlarged partially fragmented views of an alternative lift mechanism for the front wheels.

In FIGS. 102, 104 and 106, in accordance with another embodiment of the present invention, a conventional forklift may be converted to a shopping cart collection vehicle by attaching a shopping cart collection system or adapter to the forklift in place of the regular forklift or forktruck forks. The adapter may either have a solid boom as shown with reference to FIGS. 101–104, 106, 109 and 110 of the drawings, in accordance with yet another embodiment of the present invention, a convertible shopping cart collection and forklift vehicle is shown having an extendable and angularly articulatable boom or ram which is lowered to serve as a shopping cart collection boom, arm or system (FIG. 110). The vehicle also includes a horizontal fork support member which is adapted to receive conventional forklift forks when the boom is in its raised vertical position and adapted to serve as the hydraulic element for lifting or raising the forks within a vertical frame mounted on the front of the vehicle (FIGS. 109 and 116). Hence, this convertible vehicle can be used as a relatively light duty forklift for, for example, moving pallets filled with goods around in a store, parking lot or garden area, and with the forklift forks removed can be used as a shopping cart collection vehicle.

The shopping cart collection vehicle of the present invention may have a covered or uncovered cab, a covered or uncovered shopping cart collection unit, a front and/or rear collection unit, four wheels, three wheels, or six wheels, a flashing or rotating light or beacon, a hydraulic, electric, or pneumatic telescoping or extending lift, boom, or arm, an articulated shopping cart collection unit, front steering, rear steering, front drive, rear drive, accordion, mesh, or screen sides to the collection unit, a separable collection unit or trailer, a fiberglass, metal, or cloth vehicle cover, side rails or top rails for supporting the collected shopping carts to prevent them from toppling from side to side, and single, dual, triple, or quad shopping collection units allowing side by side collection of rows of carts to increase the number of carts which may be collected, stored, transported, or the like.

Figure 122:
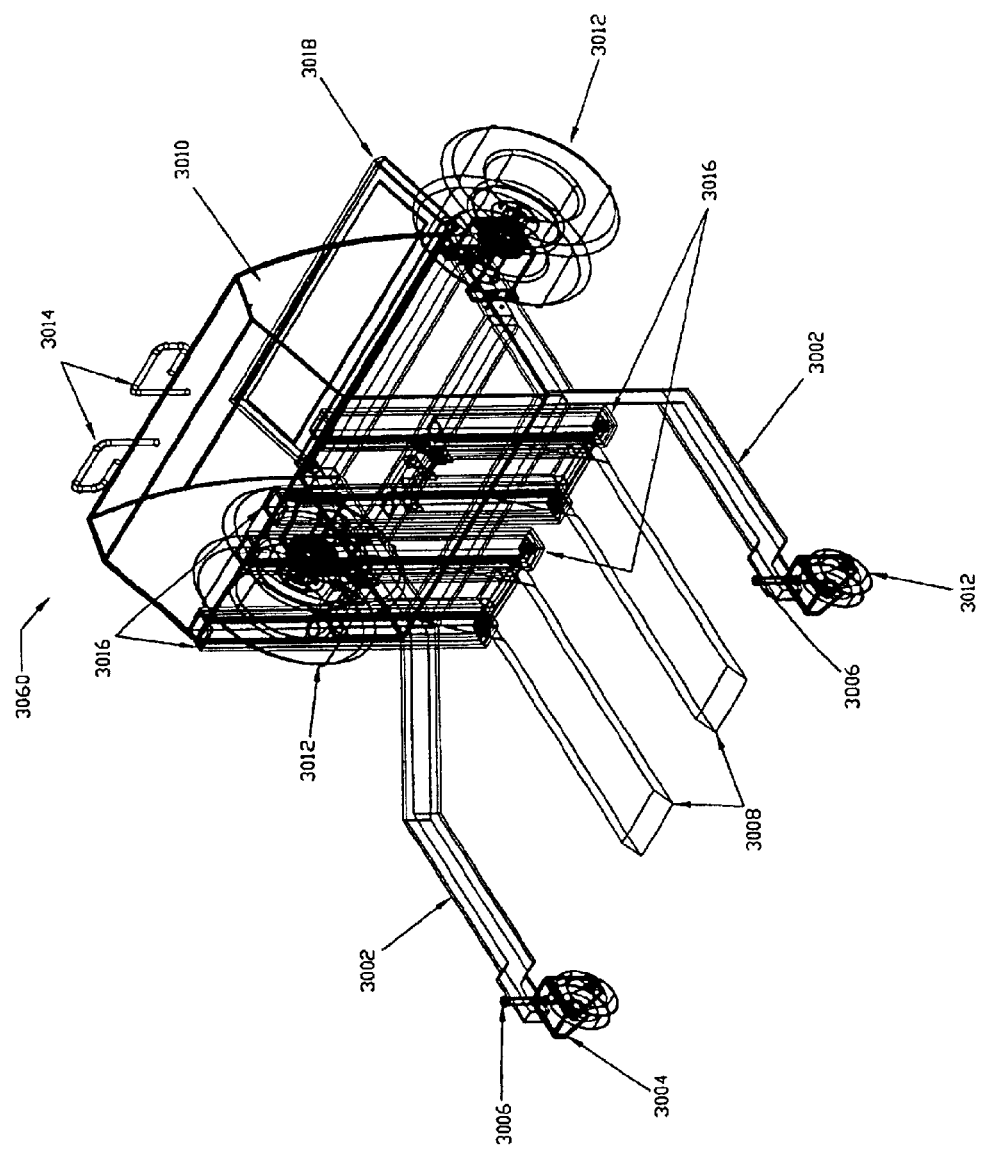
FIG. 122 is a diagrammatic perspective view of an alternative embodiment of the present invention.

FIG. 122 is a perspective, diagrammatic view of another embodiment of the present invention. Shopping cart collection device 3000 is similar to the devices disclosed in FIGS. 37, 38, 116 and 117. Collection device 3000 has a main body 3010 that houses a motor means not shown for clarity. As with other embodiments, this motor means may be comprised of gas, propane, electric or other types of engines. Operator platform 3018 is located in the rear of collection vehicle 3000. The operator of collection vehicle 3000 stands upon platform 3018 such that he may easily manipulate control levers 3014. Those skilled in the art will appreciate that operator platform 3018 may readily be replaced with a chair or bench on which an operator may sit. By manipulating the control levers 3014, the operator may cause the motor means located within body 3010 to actuate drive wheels 3012. Drive wheels 3012 may be made to rotate in either direction allowing for forward and reverse motion of the collection vehicle. Drive wheels 3012 may also be actuated so as to rotate in opposite directions, allowing collection vehicle 3000 to rotate. This provides for an extremely maneuverable collection vehicle, thereby allowing faster, more efficient collection of shopping carts or other objects. Those skilled in the art will appreciate the control 3014 may be replaced with other control devices such as joysticks, a steering wheel and/or control pedals.

A significant aspect of the embodiment disclosed in FIG. 122 is the use of side rails 3002 having front wheels 3004. Front wheels 3004 are rotatably attached to side rails 3002 by pivot pins 3006. Unlike the embodiments disclosed in FIGS. 37 and 38, front wheels 3004 may readily rotate about the axis of pivot pin 3006. This allows collection vehicle 3000 to rotate about a vertical access when drive wheels 3012 are actuated in opposite directions of rotation. As stated above, this greatly enhances the mobility of this particular embodiment.

It is also significant that in this particular embodiment, front wheels 3004 are located at the forward ends of side rails 3002. This greatly increases the devices leverage when lifting shopping carts. This also eliminates the danger of the collection vehicle tipping forward that is present in other embodiments. Because of this added leverage, smaller, more efficient collection vehicle may carry a greater amount of shopping carts and the like. Those skilled in the art will appreciate that forward wheels 3004 result in a greatly improved embodiment allowing for rotation of entire collection vehicle 3000 as well as increased leverage when lifting shopping carts.

Like many other embodiments disclosed herein, collection vehicle 3000 has two cart lifting booms 3008. They are actuated by hydraulic piston housings 3016. It is possible to provide only a single cart lifting boom, but a dual boom vehicle is preferred, cart lifting booms 3008 raise the collected carts above the ground. This not only decreases wear on the shopping carts, but allows for the rotation of the entire vehicle caused by opposite rotational actuation of drive wheels 3012. Without lifting the carts off of the ground, this type of rotation would either not be possible or would cause extremely excessive wear on the shopping carts. As with other embodiments, booms 3008 may be extendable and retractable. Each shopping cart boom may be actuated independently such that groups of shopping carts may be collected independently of one another.

Figure 123:
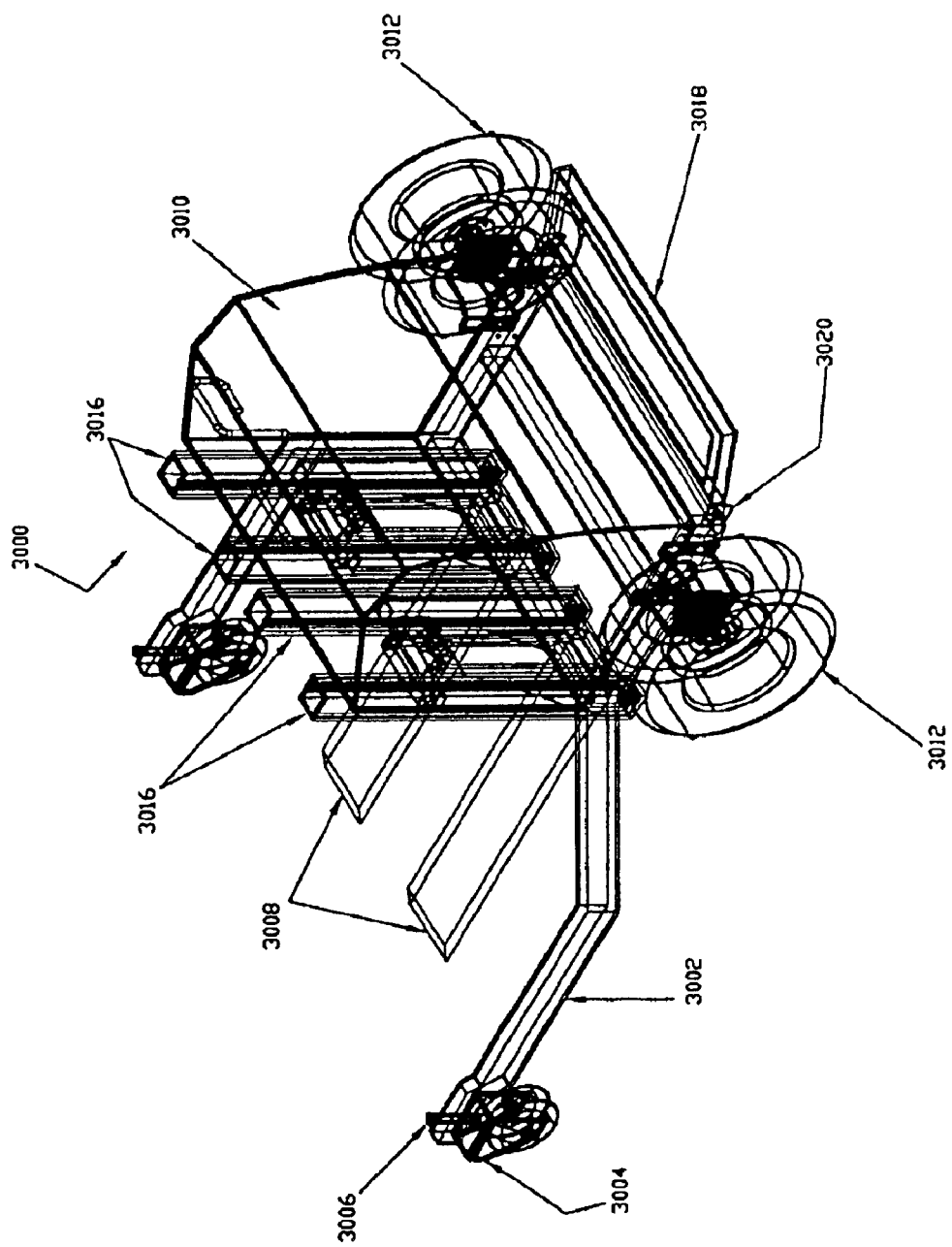
FIG. 123 is a diagrammatic perspective view of an alternative embodiment of the present invention.

FIG. 123 shows shopping cart collection vehicle 3000 from an alternative perspective view. From this view, pivot rod 3020 may be more clearly seen. Operator platform 3018 is attached to collection vehicle body 3010 by pivot rod 3020. Pivot rod 3020 allows operator platform 3018 to be folded upward when collection vehicle 3000 is not being used. This illustrates one of the advantages to utilizing an operator platform rather than an operator chair or bench. As mentioned above, front wheels 3004 rotatably attached by pivot pin 3006 to forward the forward end of side rails 3002 creates a significant amount of leverage for lifting shopping carts by booms 3008. This means that the body 3010 may actually weigh less than a full load of shopping carts without tipping over. Because body 3010 no longer needs to counterbalance shopping cart loads, it may be shorter and therefore maneuverable within smaller areas.

Figure 124:
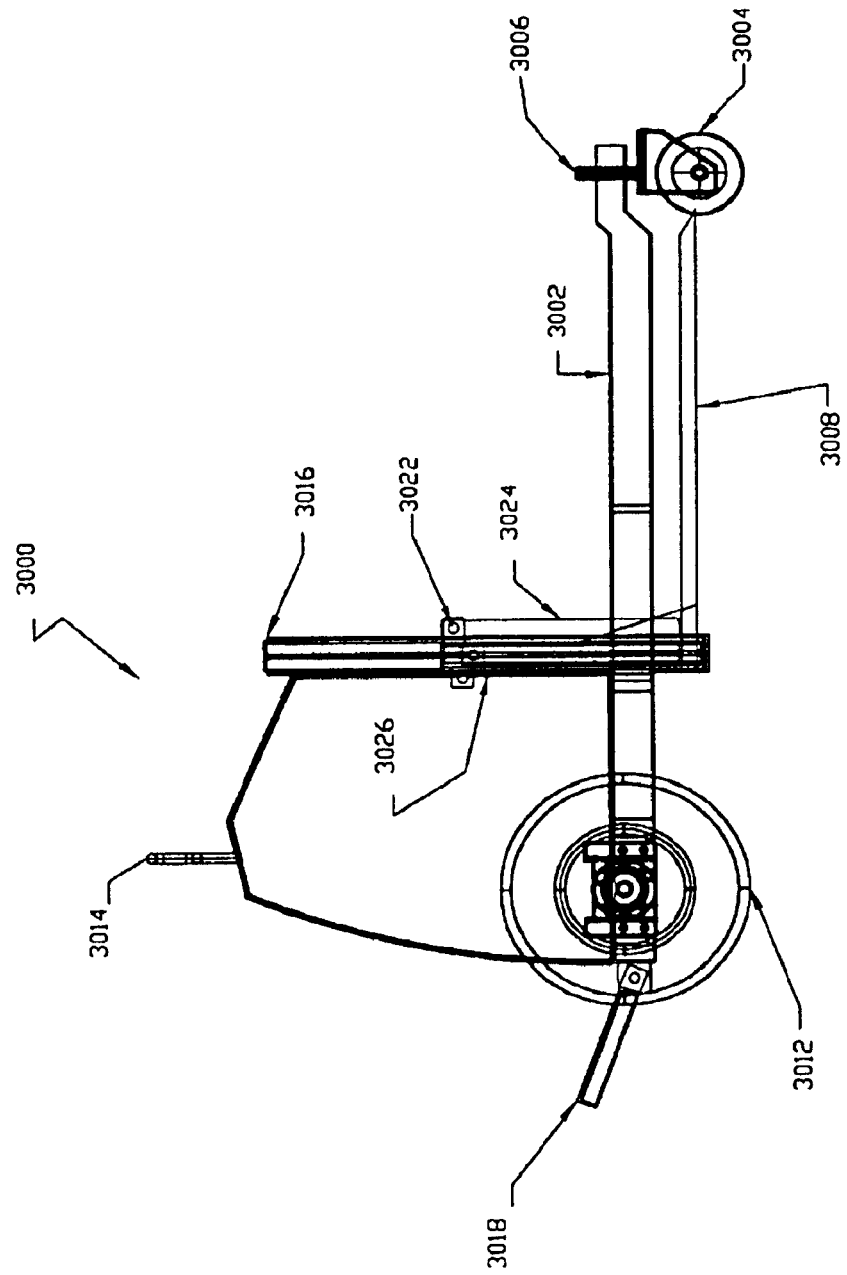
FIG. 124 is a diagrammatic side plan view of an alternative embodiment of the present invention.

FIG. 124 shows a side plane view of shopping cart collection vehicle 3000. In this illustration, the connection between hydraulic pistons 3016 and shopping cart boom 3008 may be seen. Hydraulic piston connector 3022 is attached to the top of hydraulic piston 3026 located within piston housing 3016. Hydraulic piston connector 3022 is attached to boom support arm 3024 is subsequently attached to shopping cart boom 3008. When hydraulic piston 3026 is actuated, it moves upward within hydraulic piston housing 3016. This action causes shopping cart boom 3008 to consequently move upward also. The weight of the shopping carts on boom 3008 is leveraged by means of side rails 3002 having front wheels 3004. These side rails and front wheels support practically all of the weight of the shopping cart load.

Figure 125:
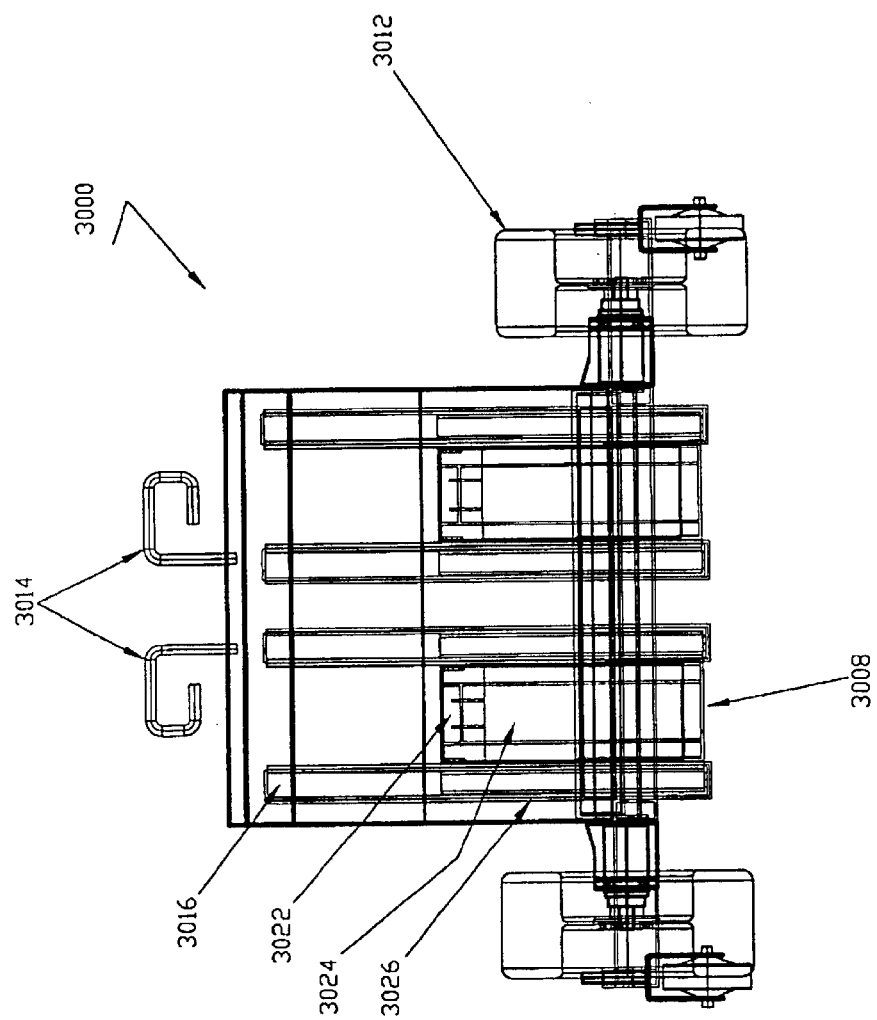
FIG. 125 is a diagrammatic front plan view of an alternative embodiment of the present invention.

FIG. 125 shows a front plan diagrammatic view of collection vehicle 3000. This illustration also shows the connection between shopping cart booms 3008 and hydraulic piston housings 3016. Hydraulic pistons 326 are attached to piston connector 3002 which is subsequently connected to boom support arm 3024. Boom support arm 3024 is then connected to shopping cart boom 3008. As mentioned above, each boom may be actuated independently. In this embodiment, there are two hydraulic pistons and piston housings for each boom. Those skilled in the art will appreciate that it is possible to utilize a single hydraulic piston for each boom. However, two pistons per boom are preferred to provide added stability.

Figure 126:
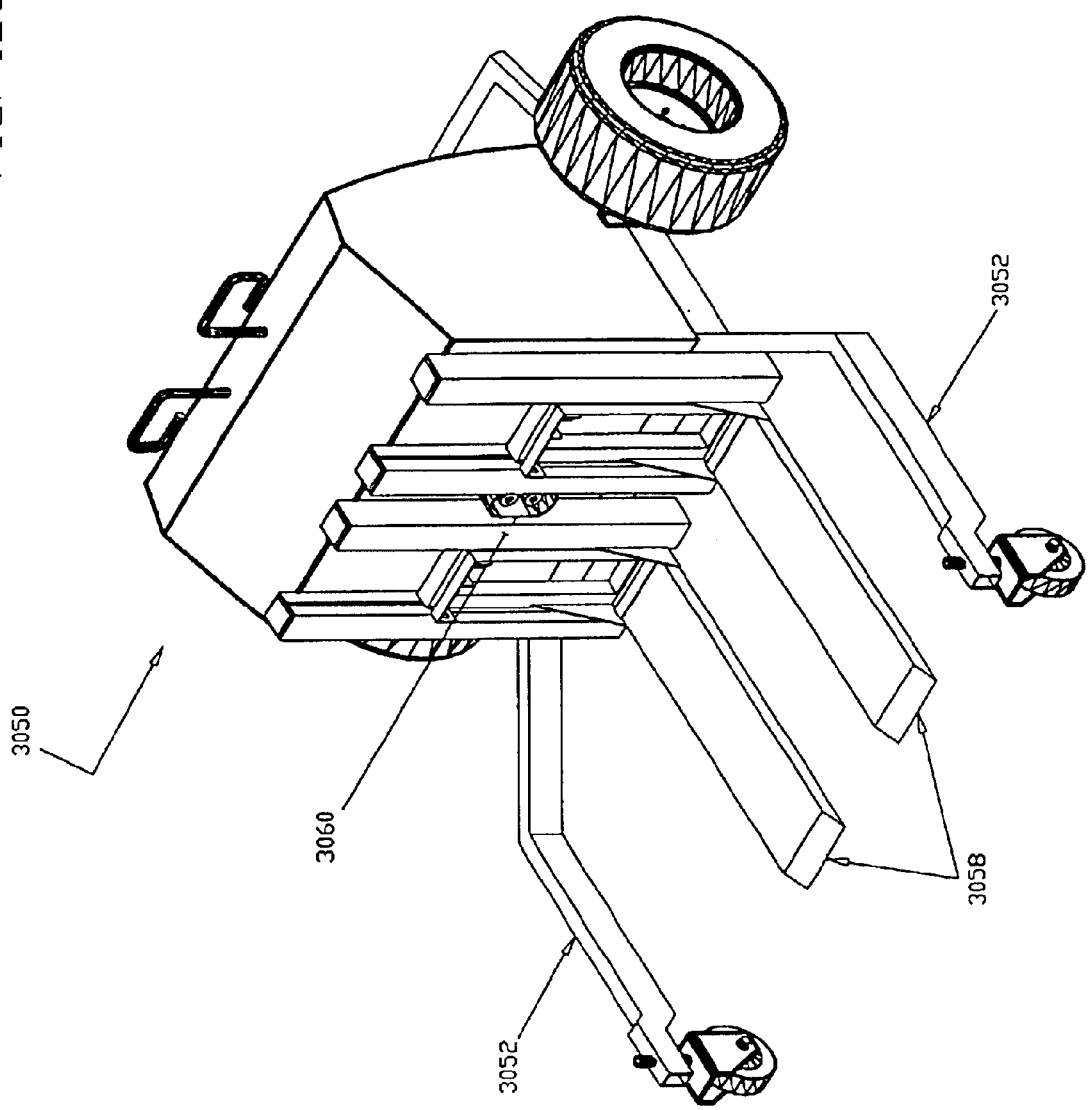
FIG. 126 is a perspective view of an alternative embodiment of the present invention.
Figure 127:
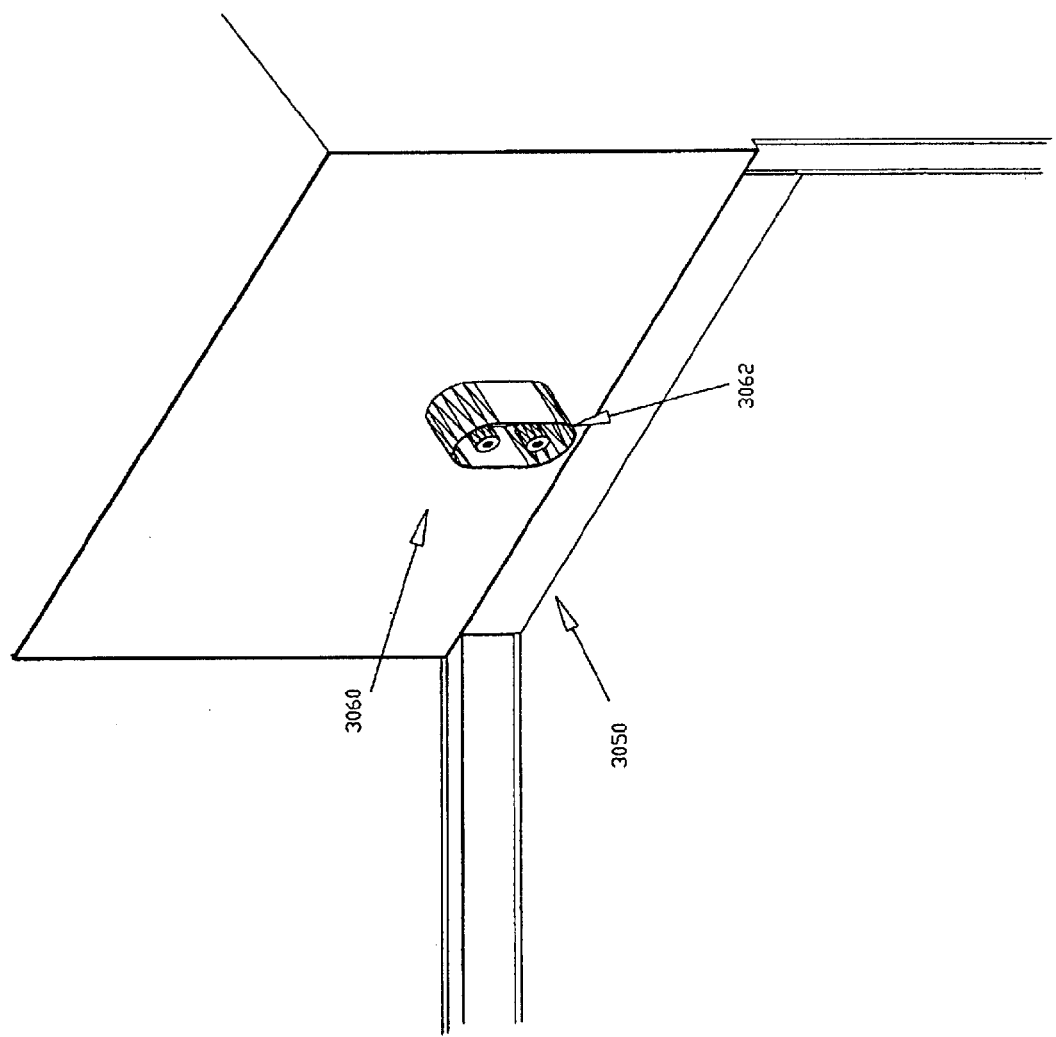
FIG. 127 is an enlarged view of the alternative embodiment of FIG. 126.

FIG. 126 shows a perspective view of an alternative embodiment of the present invention. Collection vehicle 3050 is very similar to the vehicle 3000 shown in FIGS. 122-124. It has support arms 3052 and collection booms 3058. The only difference between collection vehicle 3050 and collection vehicle 3000 is the addition of a hydraulic coupler 3060. Hydraulic coupler 3060 is located between collection booms 3058. Collection booms 3058 are removable in order to allow other devices to be attached to hydraulic coupler 3060 and operated with the collection vehicle. This greatly increases the versatility and value of the collection vehicle 3050. The hydraulic coupler 3060 may be used to power any of a number of devices, including, but not limited to, lawn mowers, sweepers, vacuums and snow blowers. FIG. 127 is a close up view of hydraulic couplers 3060 located on the forward end of collection vehicle 3050. Hydraulic couplers 3060 are surrounded by a cuff 3062. Cuff 3062 aids in the attachment of various devices to the collection vehicle. FIG. 127 shows collection vehicle 3050 with collection booms 3058 removed. This provides additional room in which a device attached to the hydraulic coupler may operate. Those skilled in the art will appreciate that it may be desirable to have various features in addition to or in place of cuffs 3062. Some devices may require more or different support than that provided by cuff 3062.

Figure 128:
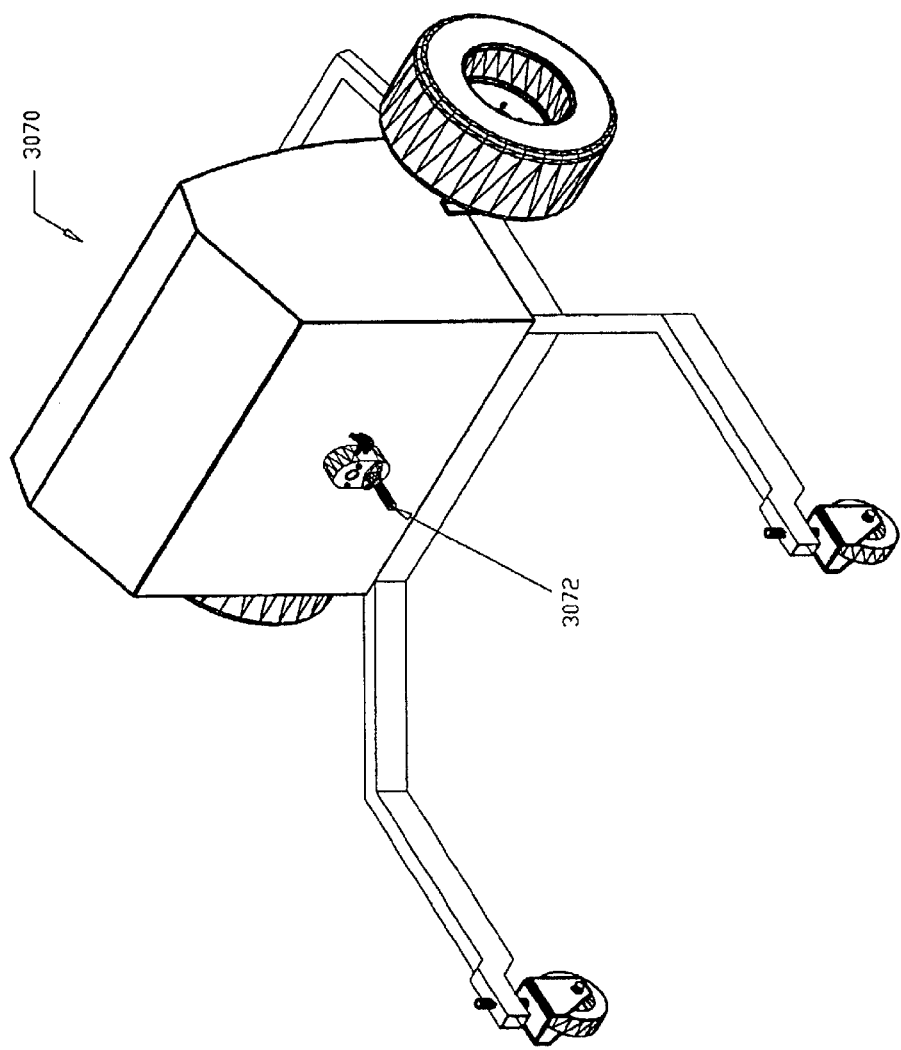
FIG. 128 is a perspective view of an alternative embodiment of the present invention.
Figure 129:
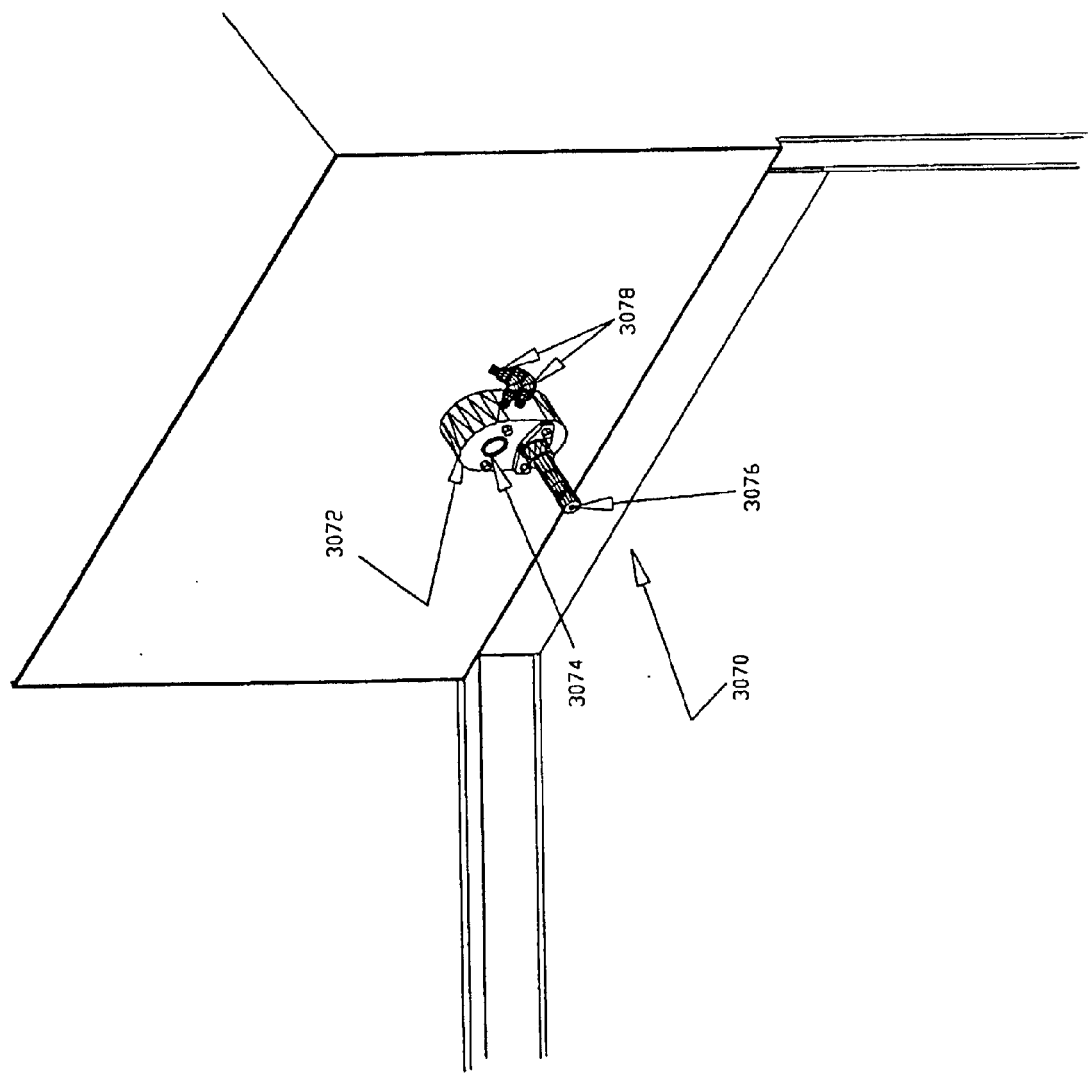
FIG. 129 is an enlarged view of the alternative embodiment of FIG. 128.

FIG. 128 shows another embodiment of the present invention. For clarity, collection vehicle 3070 has had the collection booms and related apparatuses removed. Collection vehicle 3070 has a drive shaft 3072 in place of hydraulic couplers for actuation of various devices that may be attached to the collection vehicle 3070. FIG. 129 shows an enlarged view of the drive shaft accessory 3072. Drive shaft 3076 protrudes outwardly from gear box 3074. In this particular embodiment, drive shaft 3076 is powered hydraulically by means of hydraulic tubes 3078. Hydraulic tubes 3078 feed a hydraulic liquid into gear box 3074. The hydraulic liquid actuates gears within gear box 3074 which subsequently actuates drive shaft 3076. Those skilled in the art will appreciate that hydraulic power is only one of many methods that may be utilized to actuate drive shaft 3076. It may also be powered by a belt drive, a chain drive, additional gearing or other methods known to those skilled in the art. It may be powered by gasoline, electric or propane motors. The motor may be the same one utilized to actuate the collection booms and the drive train of the collection vehicle or may be a separate motor.

Thus, it will be appreciated that as a result of the present invention, a highly effective, improved shopping cart collection vehicle, shopping cart collection trailer, shopping cart collection system or adapter, and convertible shopping cart collection and forklift vehicle is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. For example, a thin, long, conveyor belt arrangement may be used in place of boom 1076, to load, transport and unload shopping carts. If the conveyor belt is inclined, additional carts can be accommodated. Accordingly, it is expressly intended that the foregoing description and accompanying drawings are illustrative of preferred embodiments only, not limiting, and that the true spirit and scope of the present invention be determined by reference to the appended claims.

SEQUENCE LISTING

Not Applicable.

What is claimed is:

1. A shopping carts collection vehicle comprising:
a self propelled vehicle adapted to support an operator thereon and to be driven by an operator, and including frame means, motor means, drive means, wheel means, steering means, operator support means, and operator controls for selectively controlling the movement and direction of the vehicle;
at least one shopping cart support device selected from at least one of an arm, boom, lift, cylinder, and shaft extending from at least one of the front and rear of the vehicle and providing for the collection, storage and transport of a plurality of shopping carts thereon with each cart being supported above the ground by the shopping cart support device at least during transport; and,
at least two side arms having front wheels being capable of supporting substantially all of the weight of each of said carts being supported above the ground by the shopping carts support device;
device adjustment means for selectively raising and lowering at least one end of the device, wherein said at least one shopping cart support device is vertically adjustable to provide for the lowering of the device to sequentially collect each cart, and the raising of the device for storage and transportation of the carts;
device extending means for selectively extending and retracting at least a portion of the device wherein said vertically adjustable at least one shopping cart support device is also extendable to increase the effective length of the device and thereby provide for the collection, storage and transport of additional carts.

2. The shopping cart collection vehicle as recited in claim 1, wherein said vertically adjustable and extendable shopping cart support device is also articulated to provide for the raising of the device when not in use to at least shorten the overall length of the shopping cart collection vehicle and thereby provide for enhanced maneuverability thereof.

3. The shopping cart collection vehicle as recited in claim 2, wherein said articulated shopping cart support device is raised to a substantially vertical position within a frame member and thereafter extended and retracted to selectively raise and lower the frame member and thereby provide for a forklift type operation of a fork bar attached to the frame member using at least one forklift fork adapted to be attached to the fork bar attached to said frame member.

4. A shopping cart collection vehicle comprising:
a self propelled vehicle adapted to support an operator thereon and to be driven by an operator, and including frame means, motor means, drive means, wheel means, steering means, operator support means, and operator controls for selectively controlling the movement and direction of the vehicle;
at least one shopping cart support device selected from at least one of an arm, boom, lift, cylinder, and shaft extending from at least one of the front and rear of the vehicle and providing for the collection, storage and transport of a plurality of shopping carts thereon with each cart being supported above the around by the shopping cart support device at least during transport; and,
at least two side arms having front wheels being capable of supporting substantially all of the weight of each of said cart being supported above the around by the shopping cart support device;
wherein said shopping cart support device includes attachment means adapted to be selectively attached to a fork bar of a forklift, vertical support means extending from said attachment means for supporting a substantially horizontally extending shopping cart support arm, boom, lift, cylinder, or shaft, and at least one shopping cart stabilizer rod or shaft extending substantially horizontally from said vertical support means to facilitate and maintain upright positioning of one or more shopping carts during collection, storage, or transport thereof.

5. A shopping cart collection vehicle comprising:
a self propelled vehicle adapted to support an operator thereon and to be driven by an operator, and including frame means, motor means, drive means, wheel means, steering means, operator support means, and operator controls for selectively controlling the movement and direction of the vehicle,
at least one shopping cart support device selected from at least one of an arm, boom, lift, cylinder, and shaft extending from at least one of the front and rear of the vehicle and providing for the collection, storage and transport of a plurality of shopping carts thereon with each cart being supported above the around by the shopping cart support device at least during transport, and wherein said at least one shopping cart support device is vertically adjustable to provide for the lowering of the device to sequentially collect each cart, and the raisins of the device for storage and transportation of the carts;
device extending means for selectively extending and retracting at least a portion of the device;
device adjustment means for selectively raisins and lowering at least one end of the device, wherein said device adjustment means comprises at least one hydraulic cylinder; and,
at least two side arms having at least two front wheels and capable of supporting substantially all of the weight of each of said carts being supported above the ground; wherein said vertically adjustable at least one shopping cart support device is also extendable to increase the effective length of the device and thereby provide for the collection, storage and transport of additional carts.

6. The shopping cart collection vehicle as recited in claim 5, wherein said vertically adjustable and extendable shopping cart support device is also articulated to provide for the raising of the device when not in use to at least shorten the overall length of the shopping cart collection vehicle and thereby provide for enhanced maneuverability thereof.

7. The shopping cart collection vehicle as recited in claim 6, wherein said articulated shopping cart support device is raised to a substantially vertical position within a frame member and thereafter extended and retracted to selectively raise and lower the frame member and thereby provide for a forklift type operation of a fork bar attached to the frame member using at least one forklift fork adapted to be attached to the fork bar attached to said frame member.

8. A shopping cart collection vehicle comprising:
a self propelled vehicle adapted to support an operator thereon and to be driven by an operator, and including frame means, motor means, drive means, wheel means, steering means, operator support means, and operator controls for selectively controlling the movement and direction of the vehicle, at least one shoppina cart support device selected from at least one of an arm, boom, lift, cylinder, and shaft extending from at least one of the front and rear of the vehicle and providing for the collection, storage and transport of a plurality of shopping carts thereon with each cart being supported above the ground by the shopping cart support device at least during transport, and wherein said at least one shopping cart support device is vertically adjustable to provide for the lowering of the device to sequentially collect each cart, and the raising of the device for storage and transportation of the carts; and, device adjustment means for selectively raising and lowering at least one end of the device, wherein said device adjustment means comprises at least one hydraulic cylinder; and, at least two side arms having at least two front wheels and capable of supporting substantially all of the weight of each of said carts being supported above the ground; wherein said shopping cart support device includes attachment means adapted to be selectively attached to a fork bar of a forklift, vertical support means extending from said attachment means for supporting a substantially horizontally extending shopping cart support arm, boom, lift, cylinder, or shaft, and at least one shopping cart stabilizer rod or shaft extending substantially horizontally from said vertical support means to facilitate and maintain upright positioning of one or more shopping carts during collection, storage or transport thereof.

* * * * *